(12) United States Patent
Liu

(10) Patent No.: US 6,187,479 B1
(45) Date of Patent: Feb. 13, 2001

(54) AMBIENT TEMPERATURE, RECHARGEABLE CELLS WITH METAL SALT-BASED ELECTRODES AND A SYSTEM OF CELL COMPONENT MATERIALS FOR USE THEREIN

(76) Inventor: Changle Liu, 5105 Tucker St. #8, Midland, MI (US) 48640

(*) Notice: Under 35 U.S.C. 154(b), the term of this patent shall be extended for 0 days.

(21) Appl. No.: 09/036,145

(22) Filed: Mar. 6, 1998

(51) Int. Cl.[7] .............................. H01M 10/10; H01M 6/22
(52) U.S. Cl. .................... 429/300; 429/217; 429/218.1; 429/231.1; 429/231.8; 429/345
(58) Field of Search ..................... 429/344, 345, 429/300, 217, 232, 231.8, 231.1, 218.1

(56) References Cited

U.S. PATENT DOCUMENTS

| | | | |
|---|---|---|---|
| 3,573,986 | * | 4/1971 | Greenberg ............... 429/218.1 X |
| 3,891,457 | * | 6/1975 | Auborn ................. 429/218.1 X |
| 4,154,902 | | 5/1979 | Schwartz . |
| 4,279,973 | * | 7/1981 | Venkatasetty ............ 429/345 X |
| 4,375,502 | * | 3/1983 | Gabano ................ 429/345 X |
| 4,403,021 | * | 9/1983 | Domeniconi et al. ....... 429/345 X |
| 4,405,693 | * | 9/1983 | Doddapaneni ........... 429/345 X |
| 4,490,446 | * | 12/1984 | Ramsay et al. .......... 429/345 X |
| 4,513,067 | | 4/1985 | Kuo et al. . |
| 4,520,083 | | 5/1985 | Prater et al. . |
| 4,894,298 | | 1/1990 | Vukson et al. . |
| 5,182,177 | * | 1/1993 | Schlaikjer ............... 429/345 X |
| 5,260,148 | | 11/1993 | Idota . |
| 5,714,282 | * | 2/1998 | Tagawa ................. 429/231.8 X |

OTHER PUBLICATIONS

Derwent Abstract #1982–68695E (FOR FR 2,497,607 A) Jul. 1982.*
Derwent Abstract #1974–08739V (FOR SU 381,606 A) Aug. 1973.*
Weast, editor, *CRC Handbook of Chemistry and Physics* 53rd edition (1972–1973) Cleveland, Ohio, pp. B–63, B–64, B–76, B–77, B–78, B–79, B–105, B–106, B–107, B–135, B–136, B–137, B–138, B–139, B–140, B–141, 1972 (Month NA).*

* cited by examiner

*Primary Examiner*—Stephen Kalafut
(74) *Attorney, Agent, or Firm*—Reising, Ethington, Barnes, Kisselle, Learman & McCulloch, P.C.

(57) ABSTRACT

A rechargeable battery or cell is disclosed in which the electrode active material consists of at least one nonmetallic compound or salt of the electropositive species on which the cell is based, and the electrolyte or electrolyte solvent consists predominantly of a halogen-bearing or chalcogen-bearing covalent compound such as $SOCl_2$ or $SO_2Cl_2$. Also disclosed are cell component materials which include electrodes that consist primarily of salts of the cell electropositive species and chemically compatible electrolytes. These latter electrolytes include several newly discovered ambient temperature molten salt systems based on the $AlCl_3$—$PCl_5$ binary and the $AlCl_3$—$PCl_5$—$PCl_3$ ternaries.

65 Claims, 16 Drawing Sheets

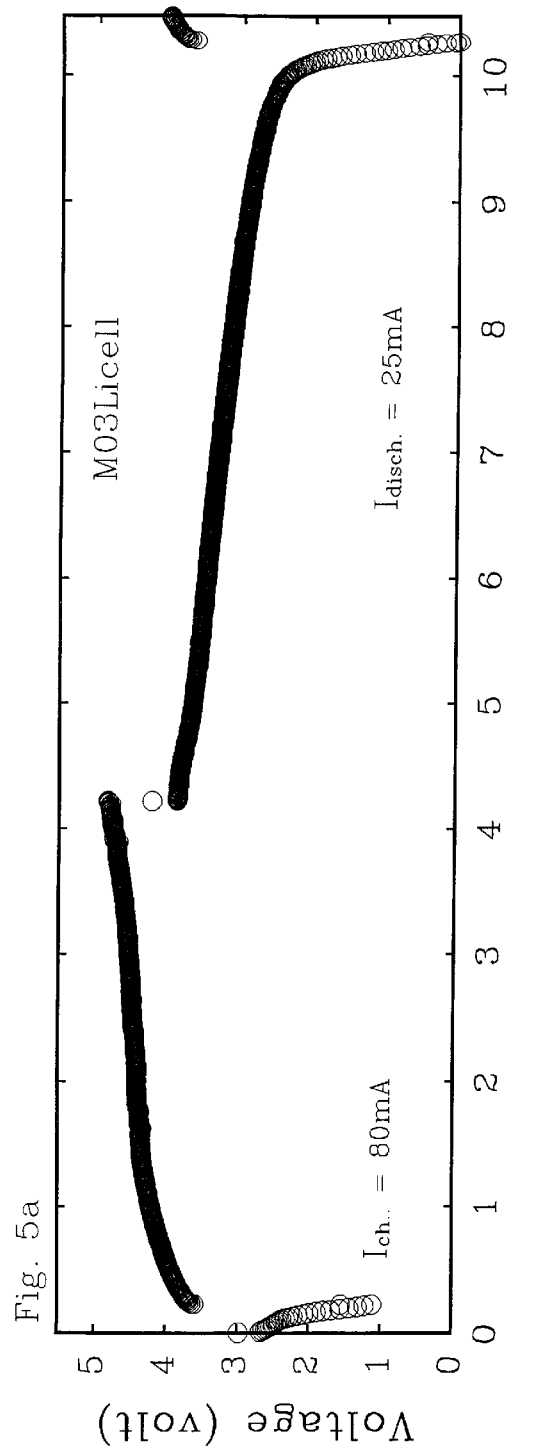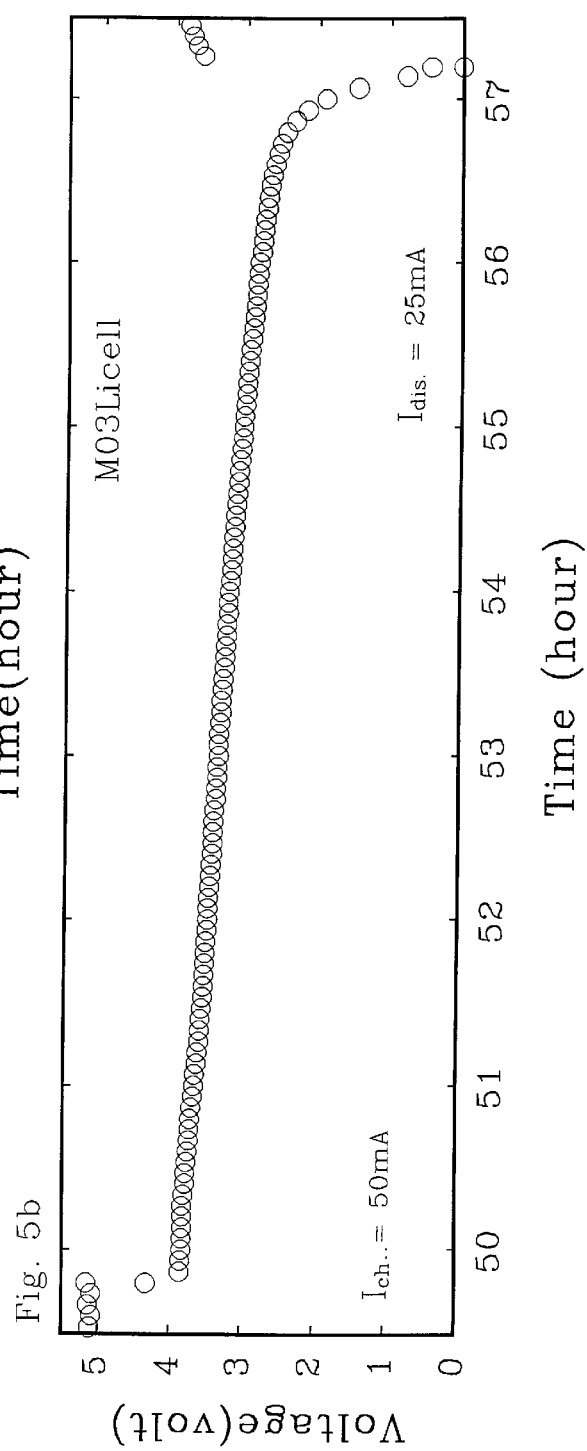

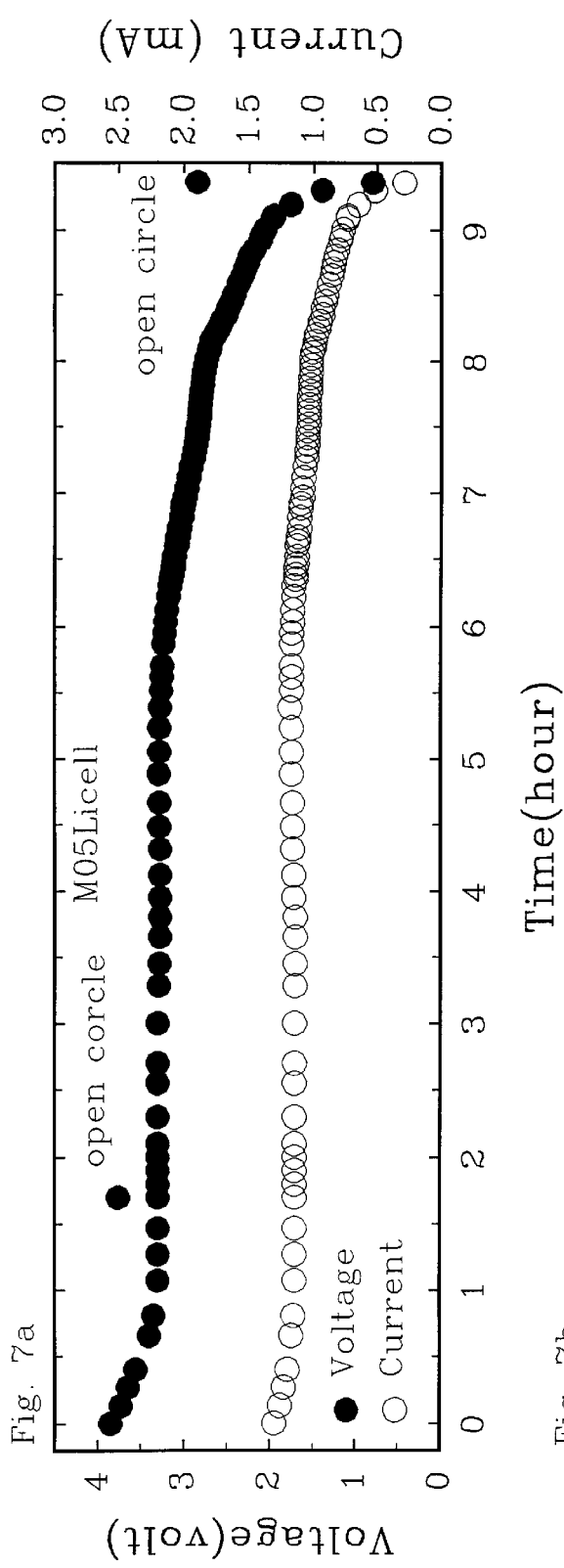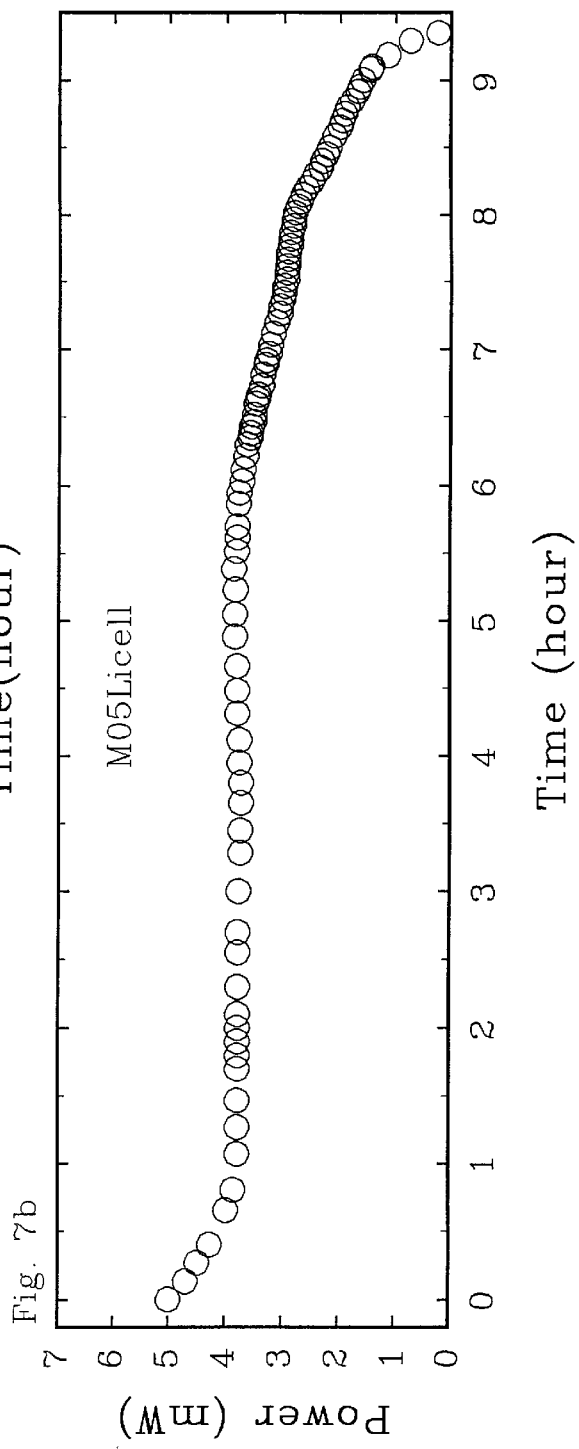
Fig. 7a
Fig. 7b

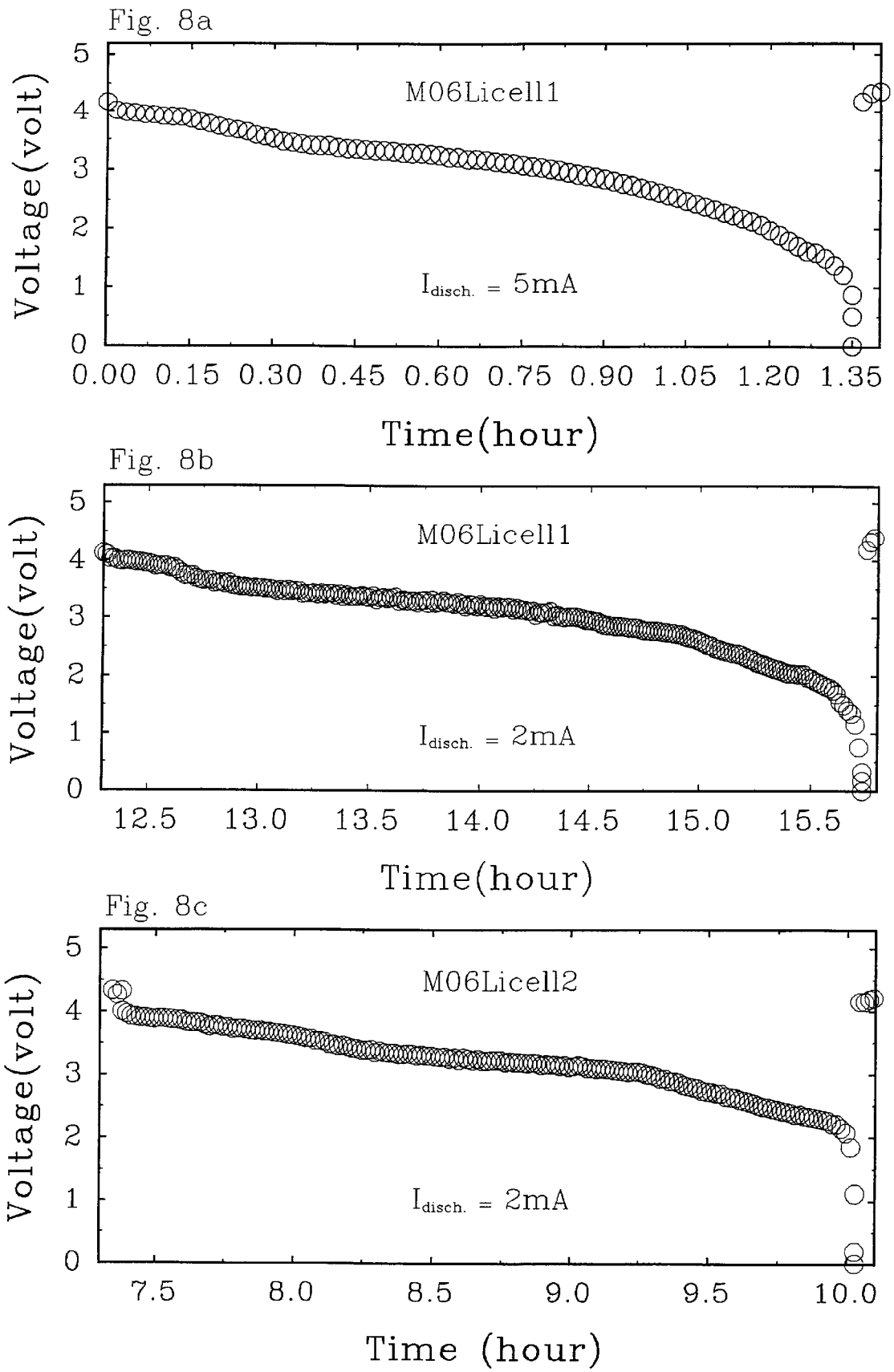

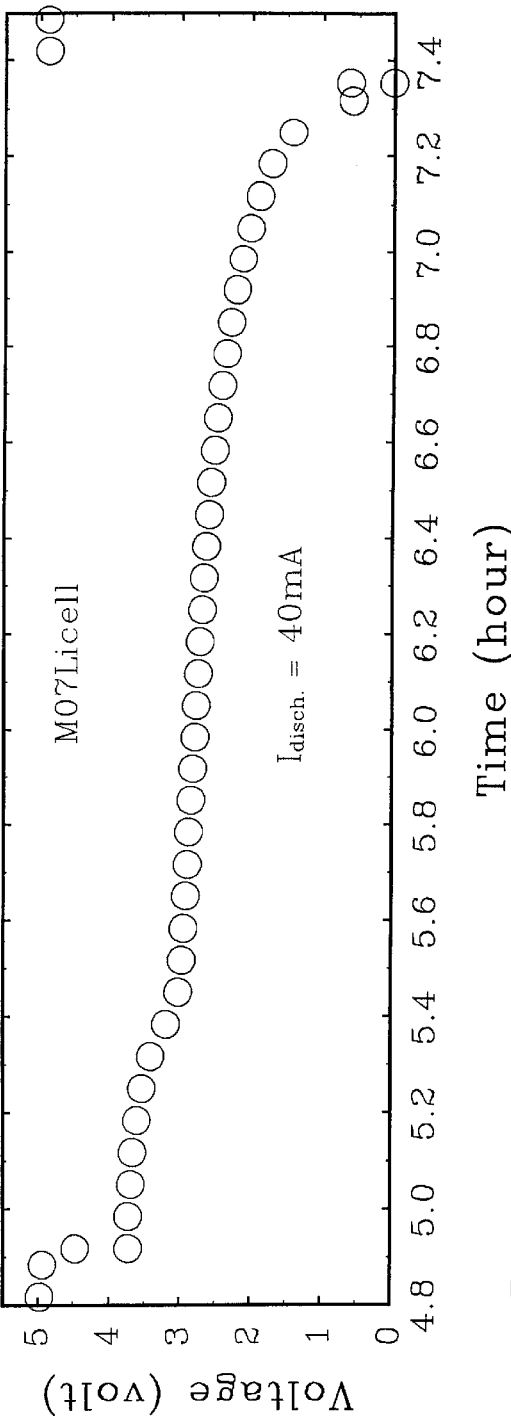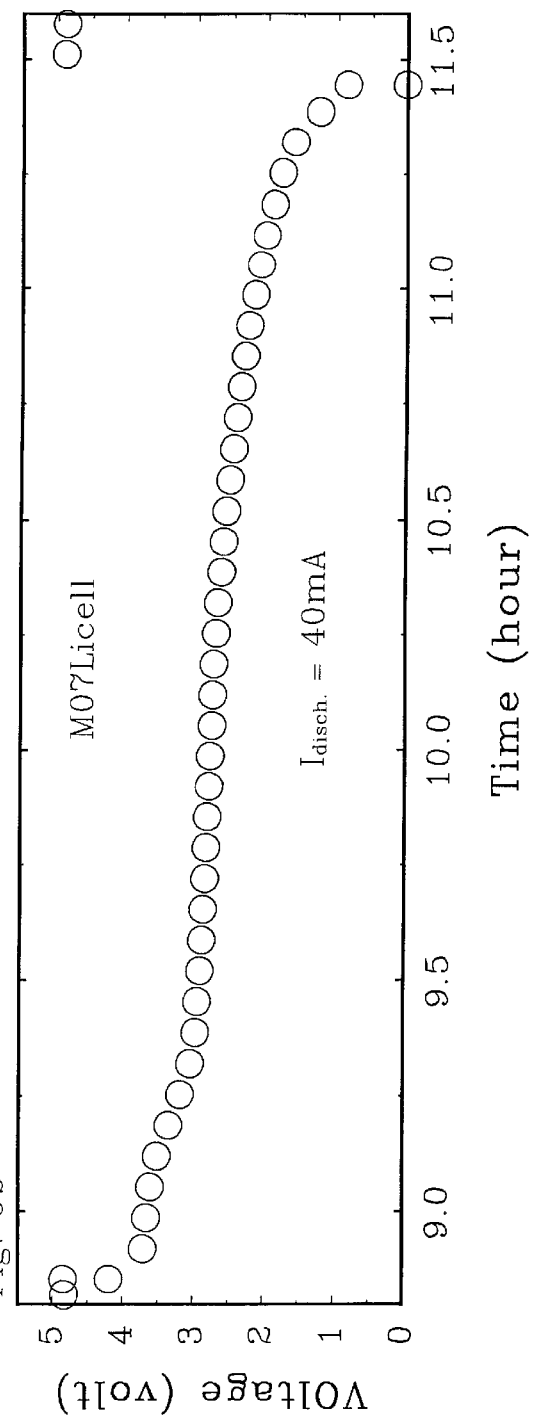

AMBIENT TEMPERATURE, RECHARGEABLE CELLS WITH METAL SALT-BASED ELECTRODES AND A SYSTEM OF CELL COMPONENT MATERIALS FOR USE THEREIN

A rechargeable battery or cell is disclosed in which the electrode active material consists of at least one nonmetallic compound or salt of the electropositive species on which the cell is based (e.g., $Li^+$, $Na^+$) and the electrolyte or electrolyte solvent consists predominantly of a halogen- and/or chalcogen-bearing covalent compound such as $SOCl_2$ or $SO_2Cl_2$. Also disclosed are cell component materials which include electrodes that consist primarily of salts of the cell electropositive species and chemically-compatible electrolytes. These latter electrolytes include several newly-discovered ambient temperature molten salt systems based on the $AlCl_3$—$PCl_5$ binary and the $AlCl_3$—$PCl_5$—$PCl_3$ ternaries.

BACKGROUND OF THE INVENTION

This invention relates to ambient temperature, rechargeable, non-aqueous, all-inorganic electrochemical cells. More specifically, this invention relates to such cells utilizing a new type of electrode in which the active material consists entirely of one or more nonmetallic compounds or salts of the electropositive species on which the cell is based (e.g., $Li^+$, $Na^+$), which is typically the same as that of the main charge-carrying species in the electrolyte. In addition, this invention relates to ambient temperature, non-aqueous, inorganic electrolytes for use in cells based on this new electrode type.

The ultimate goal of the research underlying the present invention is to develop improved rechargeable batteries operating at or near room temperature that provide high specific energy and power densities suitable for electric vehicles. To allow for a wide range of ambient conditions, the desired temperature range for electric vehicle batteries as envisioned in the long term by the U.S. Advanced Battery Consortium (USABC) is −40 to 85° C. At present, the lead-acid battery is the leading candidate for full-scale on-the-road electric vehicles due to its mature yet continually evolving technology and well-established manufacturing base. Its chief limitation, however, is a low specific energy which stems from a low cell voltage due to its use of aqueous electrolytes and the relatively high cell component material molecular or formula weights. Thus, worldwide efforts have been in progress to develop alternate battery chemistries that provide higher specific energy and power densities as required to insure the long term economic viability of electric vehicles.

Lithium is among the most promising of rechargeable battery electrode active materials because of its high standard potential and low electrochemical equivalent weight. For many years, ambient temperature rechargeable lithium batteries have been in an ongoing state of research and development to provide lightweight, economical power sources for a variety of applications ranging from notebook computers and heart pacemakers to full-scale aerospace and transportation needs. A recent review of all the different approaches taken to date in the design of ambient temperature rechargeable lithium batteries is provided by Hossain (Chap. 36 in *Handbook of Batteries*, 2nd ed., ed. by D. Linden, McGraw-Hill, Inc., 1995).

From a review of the patent literature and other published studies pertaining to advanced batteries considered for use in electric vehicles, it appears that the majority of research in ambient temperature lithium rechargeable batteries has been concentrated almost exclusively on two main types of cells which differ according to the form the lithium active material assumes during cell operation, i.e., i) those using lithium metal anodes, or ii) those using certain solid materials for both electrodes that can reversibly intercalate $Li^+$ cations. Both types of cells may utilize a variety of liquid or solid (e.g., polymer) electrolytes. In type (ii) cells, often referred to as Li-ion ("lion") cells, $Li^+$ cations are shuttled back and forth between the electrodes during charging and discharging, and no free lithium metal is present. Li-ion cells often utilize porous carbon at the anode and lithiated first row transition metal oxides (e.g., $Li_xMnO_2$) at the cathode, but many deviations from this basic design exist, e.g., certain lithiated transition metal compounds with potentials sufficiently close to that of metallic lithium (e.g., $Li_xWO_2$) may be used as anodes, or porous carbon electrodes may be used at both the cathode and anode, each differing in the amount of surface area. Much research has and continues to be devoted to the development of new (and/or to the improvement of existing) materials with enhanced $Li^+$ ion intercalation storage capabilities. At present, however, neither lithium metal anode nor Li-ion cells are sufficiently developed for large-scale commercial use in electric vehicle batteries. For lithium metal anode batteries, safety problems associated with metal dendrites abound, and for Li-ion-type batteries, current limitations regarding long-term storage and specific energy and power density need to be overcome.

The present invention, which makes use of all-metal salt electrodes, is a significant departure from conventional battery designs. A review of the prior art shows that there are relatively few designs using lithium and other lightweight, electropositive metals in which the electrode active metal assumes the form of a distinct salt phase during some stage of cell operation. U.S. Pat. No. 4,154,902 by Schwartz describes both primary and rechargeable ambient temperature, non-aqueous cells in which, during the charging stage, the electrode active material is in the form of a dithionite salt of an alkali or alkaline earth metal. In the cell design of Schwartz, the dithionite salt (e.g., $Li_2S_2O_4$) is dissolved in a suitable anhydrous solvent together with another salt of the same metal with a higher solubility (e.g., $LiClO_4$) to enhance the electrolyte metal cation conductivity, and $SO_2$ is usually added at saturation. During charging, the electrode active metal is deposited in metallic form at the anode and $SO_2$ is produced at the cathode. During discharging, the dithionite salt is reformed from metal cations produced at the anode by oxidation of the metal and $S_2O_4^{2-}$ anions produced at the cathode upon reduction of $SO_2$. Throughout cell operation, a steady supply of dithionite salt is provided by the battery design which employs a system for forced circulation of the electrolyte.

It is well known that in primary lithium metal anode cells employing $SO_2$ as the cathode active material, lithium dithionite salt, which has a low solubility in $SO_2$ as well as in most other electrolyte solvents, is typically formed during cell discharge and is deposited as an electronically insulating layer (but with some ionic conductivity) on the cathode current collector or substrate. Cell failure in such systems often occurs when the cathode current collector is entirely or almost entirely covered with solid $Li_2S_2O_4$. Under these conditions, further cell operation is not possible, and cells in which the cathode current collector is coated with solid $Li_2S_2O_4$ are generally not considered to be rechargeable.

Schwartz's invention is of interest in that it teaches that it is possible to utilize the reaction product of spent anode active metal and cathode depolarizer (i.e., dithionite salt) as an electrode active material in rechargeable cells, at least in some systems. However, Schwartz's invention differs fundamentally from the present invention in that the anode active metal is not always present in oxidized form but rather undergoes repeated oxidation and reduction during cell cycling (as in all metal anode cell designs). Also, the electrode active metal dithionite salt appears to be utilizable in Schwartz's cells only in the form of an electrolyte solute, and no dithionite (or other) salt phase is deposited in solid form at either electrode at any stage of cell operation.

Another important aspect in which the present invention differs from that of Schwartz is that, in the latter invention, the rechargeable version of Schwartz's cell is limited to only $SO_2$ since the cell chemistry is based on the use of dithionite salt as active material, whereas in the present invention, a wide variety of liquid cathode materials can be utilized, and in combination with a wide variety of electrode solid phase compositions which are generally not restricted or fixed by the chemical composition of the liquid cathode employed. As discussed in more detail below, it is far more difficult, both in theory and in practice, to utilize an oxychloride as the cathode active material in rechargeable cells than it is to use $SO_2$. Hence, in that connection, it should be noted that it is only in the primary versions of Schwartz's cell design (wherein temporary use is also made of dithionite, but only as a precursor to the formation of lithium metal anodes in situ) that $SOCl_2$ and other oxychlorides can be used as cathode depolarizers; such substances are not an integral part of any of Schwartz's rechargeable cells.

U.S. Pat. No. 4,520,083 by Prater et al. describes an ambient temperature, non-aqueous, rechargeable cell having a reactive metal anode of the second kind, i.e., one that forms an insoluble product upon discharge in combination with a suitable electrolyte. In the cell design described therein, $M^+$ cations (where M is the electrode active metal, e.g., Li) are expelled from the metal anode during discharging, and they immediately react with $X^-$ anions which are present in the electrolyte at a concentration much greater than that of $M^+$ cations to form an insoluble metal salt, MX, which precipitates or deposits back on the anode. The electrolyte of this invention generally also contains a cathode depolarizer such as $SO_2$. At the positive electrode, the cathode depolarizer is reduced to a product which can be either soluble or insoluble in the electrolyte. During charging, the slightly soluble active metal salt on the anode (MX) redissolves, the $X^-$ anions return to the electrolyte solution, and the active metal cation $M^+$ is reduced back to metal form at the anode. At the positive electrode, the reduction product is reoxidized back to the original cathode depolarizer. As discussed by Prater et al., a low solubility in the electrolyte of both $M^+$ cations and MX salt is believed to be necessary for this type of cell to work as effectively as possible. This condition is met by preparing electrolyte solutions which are at or near saturation in both $M^+$ and MX. A large concentration of $X^-$ relative to $M^+$ is provided for by adding another supporting salt, RX (wherein R is different from M), which is substantially more soluble in the electrolyte than MX. To bring $M^+$ to saturation, a salt of M may be added to the electrolyte.

The cells of Prater et al. make use primarily of lithium (as well as other alkali and also alkaline earth metals) as the anode active material and multi-component electrolyte solvents consisting primarily of inorganic or organic compounds consisting of Group IIIA, IVA, VA, and VI elements, e.g., nitriles, ethers, cyclic ethers, sulfur oxides, and sulfur oxyhalides. For the cathode depolarizer, a number of possible redox couples were mentioned in the disclosure, e.g., $Ag^+/Ag$, $X_2/X^-$ (where X is a halogen), $Fe(CN)_6^{3-}/Fe(CN)_6^{4-}$, and thianthrene cation/thianthrene, but the Examples employ only $SO_2$ as a cathode depolarizer which was cited as being the most preferred.

The invention of Prater et al. differs fundamentally from the present invention in that the anode active metal species, M, undergoes repeated oxidation and reduction during discharging and charging, as in conventional cells; hence, the anode active metal is not in the form of a solid salt phase at both electrodes during any stage of cell operation. Also, the present invention and that of Prater et al. differ in the type of predominant ionic charge carrier in the electrolyte; in the latter invention, $M^+$ cations are not transported back and forth between the electrodes. Finally, it appears that Prater's invention is restricted to simple and demonstrably reversible redox couples such as, e.g., $X_n/X^{m-}$ or $X/X_n^{m-}$ (where m and n are integers), in contrast to the present invention.

It is well known that not only sulfur dioxide ($SO_2$) but also thionyl chloride ($SOCl_2$) and sulfuryl chloride ($SO_2Cl_2$), have long been used as liquid cathodes in lithium primary batteries designed for very high specific energy and power density applications. In the development of improved electric vehicle batteries that can meet future energy and power requirements, it would be highly desirable to be able to exploit the promising properties of such cathode active materials in ambient temperature, rechargeable cells. Of these three liquid cathodes, the oxychlorides, i.e., $SOCl_2$ and $SO_2Cl_2$, are more preferred since they provide the highest cell voltages, but up until now, their use has been limited almost exclusively to primary cells. Sulfur dioxide ($SO_2$) is the only one of these liquid cathodes that has been utilized to any significant degree in lithium and other anode active metal rechargeable batteries; this is most likely due to the much higher degree of reversibility of its redox couple. Besides those designs described above, rechargeable cells using a lithium metal anode, a catholyte of $SO_2$ containing a salt such as $LiAlCl_4$ added to impart a high $Li^+$ conductivity, and carbon as cathode current collector are also known, e.g., the system described in U.S. Pat. No. 4,513.067 by Kuo et al.

U.S. Pat. No. 5,260,148 by Idota describes and ambient temperature rechargeable battery in which the anode active material consists of one or more lithium compounds or salts, $Li_pX$, which are substantially insoluble in the electrolyte based on organic solvent. Here, X is an anion which may be either singly atomic or polyatomic and p is the anion valence of X. The electrolyte consists of an organic solvent containing a compound, $A_qY_r$, where A is a cation which may be either singly atomic or polyatomic, and Y is an anion which may be either identical with or different from X provided that the lithium salt of Y is substantially insoluble in the electrolyte. The cathode active material consists of an anion-doped compound or compound containing a cation which is the same as A of the compound $A_qY_r$ in the electrolyte. In the Examples provided, A is a polyatomic organic cation such as tetrabutylammonium, tetraethylammonium, tetrapentylammonium, tetrabutylphosphonium, N-methylpyridinium, and N-methylpicolinium When A is Li, there are two possibilities for an inorganic Li-containing cathode material according to Idota's disclosure, i.e., it may consist of a Li-doped transition metal chalcogenide such as $Li_xMn_2O_4$ or $Li_xCoO_2$, or "a cathode material mixture may be prepared from the cathode active material by mixing it with the same ingredients as those used for preparing the anode material mixture." For A=Li, however, this implies that the electrolyte conductivity cannot be made very high, since the main claim specifies that the lithium salt of Y must have a low solubility in the electrolyte. Specific examples of cells in which A is Li were not provided, but in the disclosure, Idota states that for such cells, the electrolyte "is preferably based on a combination of the lithium compound and an inorganic lithium solid electrolyte. Further, lithium may be used therewith in such an amount that it dissolves slightly."

Idota's invention differs fundamentally from the present invention in several key aspects. Idota's invention for anode active material is restricted to organic solvent electrolytes. As will be shown, the present invention provides a wide variety of recipes for the electrode salt mixtures, far more than envisioned by Idota. Whereas Idota's invention is restricted to the use of Li as the anode active metal species, the present invention has been demonstrated on a wide variety of anode active metal species. Also, various additives such as, e.g., aliovalent salts that give rise to substantially improved electrode properties were discovered and developed, and are disclosed herein. The optimization of multi-component all-metal salt electrode compositions for A=Li is not considered in Idota's invention.

The present invention also makes advantageous use of certain liquid cathode materials which participate in a key way in the electrode half cell reactions, whereas Idota's invention is restricted to organic solvent electrolytes. These liquid cathodes include those for which the half cell reactions are highly irreversible, i.e., the sulfur oxychlorides $SOCl_2$ and $SO_2Cl_2$, and hence not amenable to conventional rechargeable cell designs. Such liquid cathodes would also be utilizable in Idota's invention for A=Li with either of the two possible types of inorganic cathode materials mentioned above, but that possibility was not mentioned in Idota's disclosure.

The present invention also addresses the problem of electrode-electrolyte compatibility, whereby for a given electrode material, suitable electrolytes are used so that high exchange current densities at the electrode-electrolyte interface can be realized. The exchange current density provides a measure of how quickly the determining half-cell reactions can take place, and thus, high exchange currents are well known to be necessary for achieving high current carrying capabilites and high power capacities in electrochemical cells. The present invention utilizes a variety of inorganic electrolytes which give rise to highly promising cell properties believed to arise from high exchange current densities. As will be shown, these electrolytes include not only the sulfur oxychlorides, for which such high exchange currents have previously been manifested by the high performance capabilities of Li primary batteries, but also certain newly-discovered ambient temperature molten salt electrolytes disclosed herein. Thus, another key aspect of the present invention is the discovery and development of compatible electrolytes for the metal salt electrodes suitable for larger size, high energy and power density rechargeable cells, a problem which Idota's invention does not address.

In contrast to $SO_2$, the oxyhalide solvents, particularly $SOCl_2$, have rarely been used in rechargeable batteries. This is because their practical use in such systems has generally been precluded by the high degree of irreversibility of the electroreduction reaction, which makes the in situ regeneration of any spent liquid cathode solvent impracticable. For primary lithium metal anode-$SOCl_2$ cathode cells, the overall electroreduction reaction is

$$4Li + 2SOCl_2 \rightarrow 4LiCl + S + SO_2 \quad (1)$$

where the LiCl is deposited at the positive electrode current collector (typically porous carbon). A prerequisite for the use of either $SO_2Cl_2$ or $SOCl_2$ as a liquid cathode in any rechargeable cell is that some mechanism be provided for the facile regeneration of spent cathode from the electroreduction products. For $SOCl_2$, a mechanism would have to be provided for the recombination and re-reaction of three distinct chemical species, i.e., S, $SO_2$, and $Cl_2$. For $SO_2Cl_2$, the only electroreduction products are $SO_2$ and $Cl_2$, and hence, the reformation of $SO_2Cl_2$ is a more straightforward process than that of $SOCl_2$ because only two species are involved. Also, the $SO_2Cl_2$ reformation reaction is known to be catalyzable by carbon.

Even for $SO_2Cl_2$, however, very few studies have been published on the use of such liquid cathodes in rechargeable cells. In one study by by Smith et al. (*J. Electrochem. Soc.*, 137, 602 [1990]), the rechargeability of the Li—$SO_2Cl_2$ couple was demonstrated at room temperature on small prototype cells with lithium metal anodes and carbon cathodes and test cells with all-lithium reference, test, and counter electrodes using 1.5 M $LiAlCl_4$—$SO_2Cl_2$ as the catholyte. Both types of cells were found to exhibit moderately good rechargeability and efficiency, but in all cases, the number of cycles was generally limited to well below 60 due to cell failure. As discussed by Smith et al. and shown by the data, there appear to be two main causes of failure in Li—$SO_2Cl_2$ cells, i.e., lithium metal dendrite formation, and a slow rate of regeneration of spent $SO_2Cl_2$ from $Cl_2$ and $SO_2$. The latter phenomenon may occur in conjunction with certain deleterious side reactions such as $Cl_2$ attack of Li, resulting in a gradual depletion of $SO_2Cl_2$ from the cell. Whichever mode of failure predominates appears to be dependent on a number of interrelated factors, including the prior state of cell charge, the inter-electrode separation distance, and whether the cell is anode- or cathode-limited.

In the Smith et al. study, the effects of changes in catholyte composition were studied for the small prototype cells. Increasing the $LiAlCl_4$ concentration from 1.5 to 3.0 M was found to double the cathode cycle life, which was attributed to a faster dissolution of lithium dendrites in the more corrosive 3.0 M electrolyte. Adding $SO_2$ was found to have no effect on the cathode efficiency, but the discharge voltage regulation was greatly improved. This improvement was attributed to the suppression of $SO_2Cl_2$ dissociation by $SO_2$ which eliminates dissolved $Cl_2$ from the catholyte, thus restricting the cathode reduction reaction to $SO_2Cl_2$ alone rather than a mixture of $Cl_2$ and $SO_2Cl_2$. Adding $Cl_2$ and/or $SOCl_2$ to this system failed to regulate the discharge voltage and degraded cathode cycling efficiency to half the baseline electrolyte value. This undesirable effect might be due to the type of anodes used in the cells of the Smith et al. study, i.e., metallic lithium, which may act more as chlorine scavengers rather than as promoters of the in situ regeneration of the $SO_2Cl_2$ cathode.

U.S. Pat. No. 4,894,298 by Vukson et al. describes a high temperature alkali metal plus halide rechargeable cell with $SO_2Cl_2$ catholyte. The most typical version of this cell consists of a negative electrode of sodium metal and a positive electrode which includes a solid NaCl and $SO_2Cl_2$ catholyte to which $NaAlCl_4$ and $AlCl_3$ are usually added to impart a high $Na^+$ ionic conductivity. During charging, $Na^+$ cations are released from the NaCl at the positive electrode and are reduced at the negative electrode to metallic form. Also, a volatile reaction product is produced which is believed to consist mostly of $Cl_2$ gas formed at the positive electrode by anodic oxidation of the $Cl^-$ anions from the NaCl. During discharging, the sodium metal at the negative electrode is oxidized to $Na^+$ cations which migrate to the positive electrode wherein $SO_2Cl_2$ is reduced to $Cl^-$ anions and $SO_2$, the latter of which is believed to constitute most of the volatile reaction product that is a part of the discharging reaction. The $Cl^-$ anions combine with $Na^+$ cations to reform NaCl at the positive electrode.

As Vukson et al. also teach, the ability to regenerate spent $SO_2Cl_2$ catholyte in situ is essential to the rechargeability of any cell incorporating such material. Vukson et al. provide a physical means in the cell design whereby gaseous $SO_2$ and $Cl_2$ generated at the positive electrode during charging and discharging, respectively, can be stored and later recombined as necessary to regenerate the $SO_2Cl_2$ catholyte. In that way, rechargeability of a cell utilizing $SO_2Cl_2$ as a catholyte is made possible even though the types of electrode active materials employed in designs of the type utilized by Vukson et al. make it infeasible to generate $SO_2$ and $Cl_2$ simultaneously during cell operation. The invention of Vukson et al. is illustrative of the types of elaborate means that sometimes have to be employed to make it feasible for $SO_2$ and $Cl_2$ to recombine to reform $SO_2Cl_2$.

As will be shown, an important aspect of the present invention is that it is now possible to utilize fully such high performance liquid cathodes as $SOCl_2$ and $SO_2Cl_2$ in ambient temperature rechargeable batteries. This aspect stems from the discovery that certain all-metal salt electrode compositions were found to work quite well with both $SOCl_2$ and $SO_2Cl_2$. Possible theories and chemical mechanisms underlying this discovery are given below (see "Summary of Invention"). The present invention is the first known wherein cathode redox couples more complex that those of type $X_n/X^{m-}$ or $X/X_n^{m-}$ can be utilized in rechargeable cells.

Besides those electrolytes based on $SOCl_2$ and $SO_2Cl_2$, the author also discovered several new families of ambient temperature, all-inorganic molten salt electrolytes that work well with many of the all-metal salt electrode compositions which are disclosed herein. These molten salts are based on the low-melting binary, $AlCl_3$—$PCl_5$, to which either $PCl_3$, $POCl_3$, or $PSCl_3$ may be added. The synergistic effects of combining all-metal salt electrodes with these electrolytes are believed to stem from higher exchange current densities at the electrode-electrolyte interface. Also, depending on the metal salts comprising the electrode solid phases, these molten salt electrolytes may also serves as liquid electrodes (usually cathodes) since they all contain components that may undergo a variety of redox reactions involving either the uptake or liberation of $Cl^-$ ions from the phosphorus-containing components (i.e., $PCl_5$, $PCl_3$, $POCl_3$, and/or $PSCl_3$). Such redox reactions are also considerably more complex than those of type $X_n/X^{m-}$ or $X/X_n^{m-}$.

It is the principle object of the present invention to provide an alternative approach to the development of high specific energy and power density rechargeable batteries that are potentially suitable for electric vehicle applications. This objective is accomplished by the use of a new electrode design together with supporting all-inorganic cell component materials, and a demonstration of the viability of said electrode design and cell component materials in larger-size prototype cells.

It is a further object to provide a wide range of rechargeable cell component materials for the construction of batteries based on the new electrode design. These materials include not only new electrode compositions utilizing metal salts as the principle electrode active material, but also new ambient temperature molten salt electrolytes that possess all the desired materials properties and appear to work synergistically with most of the electrode compositions developed herein.

It is a further object to provide means, utilizing the new electrode design described herein, for the use of promising and complex liquid or soluble electrodes in a rechargeable cell. In particular, it is a further object to provide means for the exploitation of both $SOCl_2$ and $SO_2Cl_2$ as liquid cathodes for high specific energy and power density cells. This is accomplished by the development of compatible all-metal salt electrodes of suitable chemical composition, as well as the discovery of an electrochemical "pre-treatment" of the catholyte that further improves the cell performance.

It is a further object to provide fabrication procedures for the construction of larger-size cell prototypes that effectively utilize the most promising cell materials discovered to date.

Other objects and advantages of the invention will become apparent from the following description and examples thereof.

SUMMARY OF INVENTION

The present invention consists of a new type of rechargeable cell in which the electrode active material is in the form of a metal salt throughout all stages of cell operation. In the all-metal salt electrodes described herein, the active electrode material consists entirely of one or more metal salts wherein typically, the metal is the same as that of the main charge-carrying species in the electrolyte (e.g., $Li^+$). In cells based on the new design, the positive and negative electrodes each consist of a metal salt or salt mixture with or without other additives that enhance the cell performance. The physicochemical processes that occur at the electrodes during charging and discharging may be described (e.g., for the negative electrode) as an electrolysis or dissociation of the electrode active metal salt to its cations and anions during discharging, and a redeposition or "plating out" of the solid metal salt layer during charging. (A reversal of these processes occurs at the positive electrode.)

To achieve a high cycling number, the electrodes should consist primarily of one or more salts which are substantially insoluble in the electrolyte. In practice, however, it was found that in general, small amounts of salts which are more soluble improve the overall performance of the cell and thus, they are also a preferred minor constituent of the electrode salt mixture. Preferably, all electrode active metal salts should have as low a molecular weight as possible to achieve the highest possible specific energy density.

In this invention, the electrodes are supported as coatings or films on a suitable substrate or support material. The substrate materials are chosen such that they may somehow promote the half-cell reactions involving the metal salt anions described below that are believed to be involved in the power generation of the cell. A number of electrode and substrate compositions, all suitable for use at ambient temperature and many optimized for high energy and power density applications with extra additives (e.g., metal oxides or halides wherein the metal differs from that of the main cation charge carrier) have been developed and are described herein.

To realize the full potential of this invention, these all-metal salt electrodes should be used with chemically-compatible electrolytes to achieve the highest possible specific power density and cycle number. By "chemically-compatible" it is meant that while the electrode is substantially insoluble in the electrolyte, the exchange current density is made as high as possible by suitable adjustments in the electrolyte (or catholyte) chemical composition. Although the mechanism(s) by which the latter process may be realized in practice are not well understood for cells employing the new electrode design, one possibility is that certain additives or components of the electrolytes disclosed herein may play the role of a catalyst for the electrolysis or dissociation of the metal salt electrode, e.g., as believed to occur during discharging at the negative electrode. Such chemically-compatible electrolytes are also a key aspect of this invention.

The electrode design of the present invention makes possible, for the first time, the effective utilization of oxychloride liquid cathodes in ambient temperature, rechargeable cells. The oxychlorides that have been demonstrated to be useable in this invention include thionyl chloride ($SOCl_2$) which, as far as the author is aware, has never been utilized as a cathode active material in any rechargeable cell of any kind. The utilization of such oxyhalides as cathodes (usually in the form of catholytes) is made possible by the discovery of a family of suitable chemical compositions for the salt mixtures that constitute the solid portions of the electrodes. As explained in more detail below, the fact that $SO_2Cl_2$ and especially $SOCl_2$ can now be used in rechargeable cells based on the new electrode design is attributed to the simultaneous generation of $SO_2$ and $Cl_2$, produced at the cathode and anode, respectively, during both charging and discharging, which in turn results from the introduction of extra nonmetallic electrode active material (i.e., chlorine) to the system Also disclosed herein are new all-inorganic, ionic complex liquid electrolytes which are based on the ambient temperature molten salt ternaries, $AlCl_3$—$PCl_5$—$PCl_3$, $AlCl_3$—$PCl_5$—$POCl_3$, and $AlCl_3$—$PCl_5$—$PSCl_3$. These new electrolytes lend themselves very well to practical applications because of their high ionic conductivities, low vapor pressures, wide liquid temperature ranges, and good chemical compatibilities with a variety of electrode salts. In addition, they may participate in a variety of redox reactions which may also enable them to act as a liquid electrode, depending on the chemical compositions of the electrode solid phases present.

In cells utilizing all-metal salt electrodes, the electrode physicochemical processes that occur during charging and discharging as outline above are consistent with the phenomenon of metal cations of the electrode active metal salts being transported or "shuttled" back and forth between electrodes during cell operation while maintaining substantially the same positive charge throughout. This is because both electrodes start out in metal salt form and thus, metal salt anionic species are always available at each electrode site to "meet up with" and reform the metal salt during charging and discharging. That such a transport process for the electrode active metal species occurs in cells of the present design is manifested by the absence or near-absence of metal layers during the electrode plating out process.

Whereas the metal cations are shuttled back and forth between electrodes and do not participate in any redox reactions, the metal salt anions are believed to partake in a variety of half-cell reactions that essentially determine the cell voltage and also enable them to act as "hosts" for the metal cations at each electrode. Although not completely understood for each cell chemistry type described herein, these half-cell reactions or processes are believed to fall into one of three categories. During anodic oxidation, these reactions are believed to occur as follows: i) the anion may intercalate into some host material that is a part of the electrode substrate (e.g., carbon), the redox equilibria involving only the donation of an electron from the host material valence band to the external circuit; ii) the anion may react with some chemical component (e.g., a metal or a transition metal compound) in the electrode or substrate thereof to form an insoluble compound, the redox equilibria involving both a chemical reaction and electron transfer to the electrode current collector and iii) the anion may reform, by anodic oxidation, a chemical species that is a necessary reactant for the in situ reformation or regeneration of a spent liquid cathode from some of its electroreduction products wherein again, an electron is donated or transferred to the electrode current collector. During cathodic reduction, half-cell reactions (i)–(iii) are reversed.

It should be noted that is possible for two or more half-cell reaction types as outlined above to occur in the same cell; each reaction will occur to a degree that depends on the particular cell chemistry and state of charge. Also, since metal cations do not undergo reduction, they may either recombine with anions to form or reform a solid metal salt phase, and/or they may intercalate or otherwise somehow be incorporated in one or more solid phases in the electrode, e.g., carbon, a first row transition metal oxide (e.g., $MnO_2$), or some electrode active metal salt. It is all these phenomena, which are additive, that are, when taken in combination, believed to be the origin of the high practical cathode capacities attainable using electrodes of this type.

The following cases (i)–(iii), describe by illustration the three different types of electrode processes involving metal salt anions that are believed to occur in the cells described herein. Simplified, and in some cases somewhat idealized, hypothetical cells based on the new electrode design, but with chemical components that are typical of the Examples disclosed herein, are used as the models for these cases. The numbering of these three cases (i.e., [i]–[iii]) corresponds to the order of the numbering of the three processes as given above. While each case is focused mainly on one electrode process, it should be noted that since these cells are generally complex, multi-component systems, it is highly likely that more than one type of process may occur, as discussed below.

(i): Intercalation

In this cell, the electrodes each consist of $LiCl$—$CaCl_2$ mixtures (with $CaCl_2$ present, e.g., at a concentration of 20 ml %) coated on carbon. The electrolyte may be either solvent- or molten salt-based. The $LiCl$—$CaCl_2$ mixtures are processed such that they form solid solutions wherein the Ca is believed to be incorporated substitutionally on lithium sites in the LiCl crystal structure, with the formation of compensating lithium vacancy point defects.

During discharge, the $Cl^-$ anions released at the $LiCl$—$CaCl_2$ negative electrode either may be incorporated into the $LiCl$—$CaCl_2$ coating or, more probably, may intercalate into the carbon support, while $Li^+$ cations are expelled into the electrolyte and migrate towards the positive electrode. In the latter case, one electron per $Cl^-$ anion that undergoes this process is released from the carbon valence band to the external circuit. (Alternatively, the electron released to the external circuit may come from the $Cl^-$ anion, the latter forming a neutral Cl atom which then acts as an electron acceptor for carbon.)

At the positive electrode, there are three possibilities for incoming $Li^+$ cations, i.e., i) they may be incorporated into the $LiCl$—$CaCl_2$ coating, ii) they may be intercalated into the carbon substrate, or iii) they may combine with intercalated Cl which is already present at the positive electrode from a previous cell charging to form (or reform) LiCl. For possibility (i), it is believed that $Li^+$ cations may be incorporated within the $LiCl$—$CaCl_2$ coating on the lithium vacancies formed originally upon introduction of Ca into the LiCl crystal structure. In the process, one point defect annihilates the other on the lithium sublattice in crystalline LiCl, and to preserve electroneutrality, some species within the positive electrode must undergo reduction (i.e., by accepting an electron from the external circuit). For possibility (ii), this process is well known from the literature on battery intercalation materials to be accompanied by the acceptance of one electron per $Li^+$ cation from the external circuit by the carbon host material conduction band. If possibility (iii) occurs, then the most likely species for reduction is the neutral intercalated Cl atoms which become negatively ionized and then combine with $Li^+$ cations to form (or reform) electrically neutral LiCl.

rechargeability of $SOCl_2$-based cells is made feasible by the ability of spent $SOCl_2$ to be regenerated. The latter process, in turn, is made possible by the formation of $Cl^-$ anions during LiCl dissociation or electrolysis and concomitant formation of $Cl_2$ gas, the latter of which is believed to react with S and $SO_2$ in solution to form $SCl_2$ and $SO_2Cl_2$ which are reaction intermediates for $SOCl_2$.

In its simplest configuration, the $SOCl_2$-based rechargeable cell is an all-chloride system consisting of pure LiCl electrodes and $SOCl_2$—$LiAlCl_4$ catholyte. During discharging, the half cell reactions that are believed to occur at the electrodes are as follows:

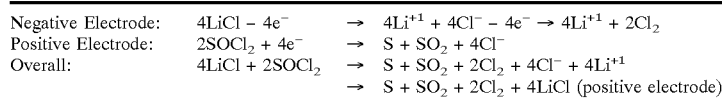

(ii): Solid Phase Formation at an Electrode

In this cell, the electrodes each consist of a metal halide or metal halide mixture coated on a support containing nickel or copper. For metal chloride-based electrodes, the $Cl^-$ anions formed, e.g., at the negative electrode during cell discharge, may react with the metal in the electrode substrate or support to form the corresponding metal chloride, i.e., $CuCl_2$ and $NiCl_2$, for copper and nickel metal supports, respectively. In the process, one electron per $Cl^-$ anion that undergoes said chemical reaction is released to the external circuit.

In another cell that operates on the same principle, the electrodes consist of mixtures of one or more metal halides and a transition metal compound such as CuCl, $FeCl_2$, $CoO_2$, or $MnO_2$ coated on a carbon or carbon-on-metal substrate. For metal chloride-containing electrodes, the $Cl^-$ anions formed upon discharge at the negative electrode may react with the transition metal compound to form a compound of higher metal oxidation state. For example, $Cl^-$ may react with CuCl or $FeCl_2$ to form, respectively, $CuCl_2$ or $FeCl_3$, with an attendant release of electrons to the external circuit (i.e., one per $Cl^-$ anion involved).

(iii): Liquid Cathode Regeneration

A. Thionyl Chloride ($SOCl_2$)

In this cell, the positive and negative electrodes each consist of a LiCl or LiCl-containing salt mixture coated on carbon, and the catholyte consists of $LiAlCl_4$ (which is present, e.g., at a concentration of 1.5 M) dissolved in $SOCl_2$.

The ability of the $SOCl_2$-based cells described herein to be recharged when metal salt electrodes of a suitable chemical composition are used is one manifestation of the novelty of the new cell design described herein which makes possible certain half-cell reactions that help to regenerate the $SOCl_2$ solvent that are not possible in other cell designs. During charging, $Cl_2$ gas is formed by the oxidation of $Cl^-$ anions which are, in turn, formed upon dissociation or electrolysis of LiCl. The latter process is catalyzed by a Lewis acid such as $AlCl_3$ which is typically added to $SOCl_2$ to increase the $Li^+$ solubility. Since the solubility of $Cl_2$ in $SOCl_2$ is relatively low, most of the $Cl_2$ gas is believed to be adsorbed on the carbon supports. During $SOCl_2$ electroreduction, $SO_2$, S, and $Cl^-$ anions are formed, and in conventional Li battery designs, this process is normally irreversible, as discussed above and shown in reaction (1). In the new electrode design disclosed herein, however, the The newly-formed LiCl at the positive electrode is made from $Li^{+1}$ cations generated by dissociation or electrolysis of LiCl at the negative electrode which combine with $Cl^-$ anions produced by electroreduction of $SOCl_2$ at the positive electrode substrate. From the above reactions, it can readily be seen that one mole of LiCl is deposited at the positive electrode for every mole of LiCl that is electrolyzed at the negative electrode during discharging.

As shown above on the right hand side of the overall cell reaction, S, $SO_2$, and anodically-produced $Cl_2$ are produced during discharging. In order to achieve a steady state catholyte composition during discharging, one that is also suitable for reuse in rechargeable batteries, it is necessary for the reformation reaction for $SOCl_2$ to occur at a rate comparable to that of the $SOCl_2$ electroreduction reaction. The simplest possible, and also most likely, reaction scheme for the in situ reformation of $SOCl_2$ is the oxidation of $SCl_2$ by $SO_2Cl_2$, i.e., $$SO_2Cl_2 + SCl_2 \rightarrow 2SOCl_2 \tag{2}$$

where the $SO_2Cl_2$ and $SCl_2$ reaction intermediates are believed to be produced from S, $SO_2$ and $Cl_2$ according to $$SO_2 + Cl_2 \rightarrow SO_2Cl_2 \tag{3}$$

$$S + Cl_2 \rightarrow SCl_2 \tag{4}$$

Reaction (2), which is known to be catalyzable by charcoal, has long been used in the industrial preparation of $SOCl_2$. Also, this reaction appears to be quite kinetically uncomplicated; all that would be required is for one of the oxygen atoms on the (slightly distorted) S-centered $SO_2Cl_2$ tetrahedron to first bond with the S atom on a nearby $SCl_2$ molecule then break away from the S atom on the $SO_2Cl_2$ molecule. Note that reaction (2) is not important in conventional Li—$SOCl_2$ primary batteries because, in these systems, the free $Cl_2$ content in the catholyte is not continuously replenished by anodic oxidation of any $Cl^-$-bearing species and thus, $SO_2Cl_2$ and $SCl_2$ are not formed in sufficient concentrations from the $SOCl_2$ electroreduction byproducts. This may explain, at least in part, why $SOCl_2$-based cells such as the one described herein are rechargeable, whereas conventional $SOCl_2$-based cells wherein $SOCl_2$ is the cathode active material are generally not.

In the above discussion, it is assumed that the cell current density is sufficiently low such that any $Cl_2$ that is produced by anodic oxidation may be consumed quickly enough in the $SOCl_2$ regeneration reactions so that there is no $Cl_2$ pressure buildup. In practice, such problems may occur in certain cells, because the solubility of $Cl_2$ in $SOCl_2$ (and also $SO_2Cl_2$) catholytes is low, and it is also well below that of $SO_2$.

B. Sulfuryl Chloride ($SO_2Cl_2$)

In this cell, the positive and negative electrodes each consist of a LiCl or LiCl-containing salt mixture coated on carbon, and the catholyte consists of $LiAlCl_4$ (which is present, e.g., at a concentration of 1.5 M) dissolved in $SO_2Cl_2$.

In conventional Li metal/$SO_2Cl_2$ primary batteries, the overall cell discharge reaction is $$2Li+SO_2Cl_2 \rightarrow 2Li^{+1}+2Cl^-+SO_2 \rightarrow 2LiCl+SO_2 \tag{5}$$

where the LiCl formed is deposited at the positive electrode substrate. The rechargeable $SO_2Cl_2$ cells described herein differ fundamentally from conventional designs in that the starting negative electrode material is a salt; in the simplest cell configuration, each electrode consists of LiCl supported on a substrate such as carbon. Since the Li in LiCl is already in the +1 state, no further oxidation of Li at the anode is possible. During discharging, however, some other chemical species at the negative electrode must undergo oxidation while $SO_2Cl_2$ is being reduced in order to preserve the overall charge neutrality in the cell and complete the electrical circuit. In this cell, the most likely candidate species for oxidation is the $Cl^-$ in LiCl.

Thus, for rechargeable LiCl/$SO_2Cl_2$ cells based on the new design, the following reactions are believed to take place during discharging:

NaCl. During discharging, two half cell reactions are possible at the negative electrode, i.e., $$2Cl^- - 2e^- \rightarrow Cl_2 \tag{7}$$

$$PCl_3 + 2Cl^- - 2e^- \rightarrow PCl_5 \tag{8}$$

At the positive electrode, dissolved $Cl_2$ generated at the negative electrode may undergo reduction according to $$Cl_2 + 2e^- \rightarrow 2Cl^- \tag{9}$$

However, given the expected low solubility of $Cl_2$ in $AlCl_3$—$PCl_5$—$PCl_3$ mixtures, as well as the expected $PCl_5$ regeneration reaction, i.e., $$Cl_2 + PCl_3 \rightarrow PCl_5 \tag{10}$$

the more likely predominant reaction is the reduction of $PCl_5$ to $Cl^-$ and $PCl_3$ i.e., $$PCl_5 + 2e^- \rightarrow PCl_3 + 2Cl^- \tag{11}$$

where the $Cl^-$ anions combine with metal cations to plate out metal salt at the positive electrode and $PCl_3$ stays in the electrolyte solution. Thus, in cells utilizing $AlCl_3$—$PCl_5$—$PCl_3$ mixtures, $PCl_3$ and $PCl_5$ may, respectively, act as liquid anode and cathode components, respectively, depending on the state of cell charge. During cell operation, the $PCl_5$:$PCl_3$ ratio may undergo momentary fluctuations if any of the above reactions are kinetically limiting.

Assuming reactions (7) and (11) are predominant, i.e., by analogy with $SOCl_2$ and $SO_2Cl_2$ discussed above, the overall cell reaction is $$PCl_5 + 2Cl^- \rightarrow PCl_3 + Cl_2 + 2Cl^- \tag{12}$$

| Negative Electrode: | $2LiCl - 2e^-$ | $\rightarrow$ | $2Li^{+1} + 2Cl^- - 2e^- \rightarrow 2Li^{+1} + Cl_2$ |
|---|---|---|---|
| Positive Electrode: | $SOCl_2 + 2e^-$ | $\rightarrow$ | $SO_2 + 2Cl^-$ |
| Overall: | $2LiCl + SO_2Cl_2$ | $\rightarrow$ | $SO_2 + 2Cl_2 + 2Li^{+1} + Cl_2$ |
| | | $\rightarrow$ | $SO_2 + Cl_2 + 2LiCl$ (positive electrode) |

The mode of regeneration of the $SO_2Cl_2$ catholyte in these cells is expected to be simpler than that believed to take place in $SOCl_2$-based cells, i.e., the $SO_2$ and $Cl_2$ formed upon discharging can reform $SO_2Cl_2$ in one step according to $$SO_2 + Cl_2 \rightarrow SO_2Cl_2 \tag{6}$$

Reaction (6), which is thermodynamically favored at room temperature, is also known to be catalyzable by charcoal.

C. $AlCl_3$—$PCl_5$—$PCl_3$

In the ternary systems, $AlCl_3$—$PCl_5$—R, where R=$PCl_3$, $POCl_3$, or $PSCl_3$, the phosphorus-containing components may all play the role of an electrode active component because the valence of P may assume either +3 or +5, depending on the chemical environment. The simplest redox reactions involving phosphorus in these ternaries are believed to occur in the $AlCl_3$—$PCl_5$—$PCl_3$ system, wherein $Cl_2$, $PCl_x$ groups and $Cl^-$ anions are the only chemical species involved.

In this cell, the electrolyte consists of an equimolar mixture of $AlCl_3$ and $PCl_5$ with $PCl_3$ present at its saturation concentration such that $AlCl_3$, $PCl_5$, and $PCl_3$ are present at about a 10:10:3 molar ratio. The electrode active material solid phase consists of a metal chloride such as LiCl or wherein during this process, one mole of $M^+$ cations is expelled into the electrolyte and one mole of MCl is plated out at the positive electrode for every mole of MCl dissociated at the negative electrode. If reaction (10) takes place sufficiently quickly, then the $PCl_5$:$PCl_3$ ratio stays constant and there is no buildup of $PCl_3$ or $Cl_2$ during discharging.

DESCRIPTION OF THE DRAWINGS

FIG. 5a is a plot of the charging-discharging curve during the fourth cycle for Cell G of Example #4. FIG. 5b is a plot of the mid-cycle charging-discharging curve for the same cell.

FIG. 7a shows the cell voltage versus time during discharging for for Cell A of Example #6. FIG. 7b shows the cell output power versus time during discharging for the same cell.

FIGS. 8a and b show the cell voltage versus time during discharging for discharging currents of 5 mA and 2 mA, respectively, for Cell B of Example #6. FIG. 8c shows the cell voltage versus time during discharging for Cell C of Example #6.

FIGS. 9a and b show the cell voltage versus time during discharging during the second and third cycles for Cell D of Example #6.

DETAILED DESCRIPTION OF THE INVENTION

Figure 1:
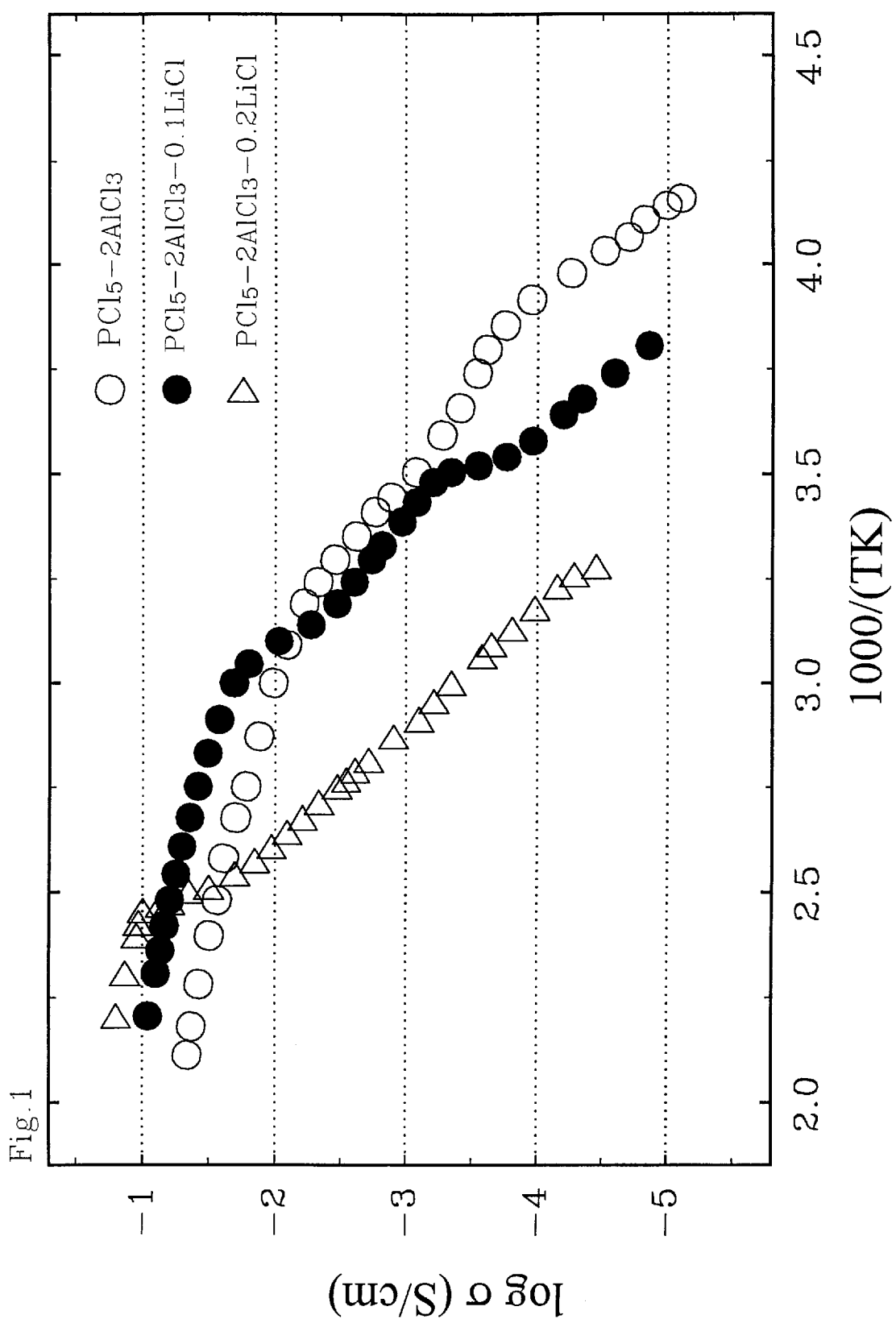
FIG. 1 shows the ionic conductivity vs. reciprocal temperature from −20° C. to 120° C. of $2AlCl_3$—$PCl_5$ with LiCl additions of 0, 10, and 20 m %.

In the all-metal salt electrodes, the electrode active material consists entirely of one or more metal salts. Typically, the anode active metal is the same as that of the main charge-carrying species in the electrolyte, but cells of this invention may utilize a variety of electrolytes, including those in which metal cations of the main anode active metal are not present. Although metal salt electrode active materials are the main focus of the present work, it should be noted that the new cell concept introduced herein is not necessarily restricted to electrodes based solely on metal cations. Any compound that, upon dissociation, is capable of forming anion-cation pairs, including those in which the cation is nonmetallic (e.g., $NH_4^+$, $B^{3+}$), may be used to construct a cell based on the principles described herein by suitable combinations of cell component materials without departing from the spirit and scope of this invention. All-metal salt electrodes in which the electrode active metal is a Group IA, IIA or IIIA element have been demonstrated herein to work quite well in ambient temperature, rechargeable cells as shown in the Examples below, but to achieve the highest possible specific energy densities, the lightest and most electropositive metals, e.g., Li, are generally most preferred.

In the context of this disclosure, the term "metal salt" is used as a shorthand expression to refer to any compound that, upon dissociation, is capable of yielding metal cations and single atomic or complex anions. The metal compounds that have been found to be the most useful for the present application are those that are inorganic, largely ionic substances which are true salts in the conventional sense, e.g., the metal halides, pseudohalides, and certain oxyanion compounds. The term "pseudohalide" refers to any monovalent, polyatomic anion with chemical and electronic properties very similar to those of the halides, e.g., $CN^-$, $SCN^-$, $OCN^-$, and $SeCN^-$. Examples of pseudohalide salts are the alkali metal cyanides (MCN), thiocyanates (MSCN), and cyanates (MOCN), where M is an alkali metal, and the alkaline earth metal cyanides (M'(CN)$_2$), thiocyanates (M'(SCN)$_2$), and cyanates (M'(OCN)$_2$), where M' is an alkaline earth metal. The term "oxyanion" refers to any anion complex with oxygen anions as ligands. Examples of oxyanion salts are the alkali metal sulfates ($M_2SO_4$), nitrates ($MNO_3$), perchlorates ($MClO_4$), and phosphates ($M_3PO_4$), where M is an alkali metal, and the alkaline earth metal sulfates (M'SO$_4$), nitrates (M'(NO$_3$)$_2$), perchlorates (M'(ClO$_4$)$_2$), and phosphates (M'$_3$(PO$_4$)$_2$), where M' is an alkali metal. The term "metal salt" as used herein may also include other inorganic substances not commonly referred to as salts such as the metal oxides, e.g., $Li_2O$, and metal sulfides, e.g., $Na_2S$. As the principle electrically-active electrode chemical species, many of these latter compounds have also been shown to result in promising cell properties.

In the design of all-metal salt electrodes for high specific energy and power density batteries, one important consideration is that the theoretical charge storage or current capacities of each metal salt in the electrode be as high as possible. For the lighter metal elements such as Li, Na, Ca, and Mg, the theoretical storage capacities of many of their salts well exceed those of most other cathode and anode materials currently in use with the exception of metallic lithium (e.g., the theoretical storage capacity of $Li_2O$ is 1794 Ah/kg). Other examples of high capacity metal salts are $Li_2S$, LiF, LiCl, $Li_2CO_3$, and $CaCl_2$. Generally, metal salts with larger anion atomic or molecular weights (e.g., those containing the heavier halogens or chalcogens) are less preferred, all other considerations being more or less equal.

The cell capacity that can be attained in practical cells is determined by the number of metal salt cations that can be transferred from the positive to the negative electrode during charging (i.e., the cathode capacity). That quantity, in turn, is believed to be determined by the degree to which the metal salt anions can participate in one or more cell reactions as outlined above that will enable them to be in temporary storage until they are able to recombine with the metal cations to reform the metal salt electrode, e.g., at the positive electrode during discharging. The degree to which an anion can participate in any given half-cell reaction is governed not only by thermodynamic but also by kinetic considerations.

Two main types of metal salts may be utilized in the present invention, i.e., those that are substantially insoluble in the electrolyte, and those that are somewhat soluble. To achieve a high cycling number, it has been found that in general, the electrodes should consist mainly of insoluble salts (e.g., metal oxides, carbonates, sulfates). Too high a salt solubility presents problems, because for every ion pair that is dissolved in the electrolyte, that is one less metal cation available for the storage of electrical energy in the cell (or alternatively, one less anion that can act as host for the arrival of some metal cation in some future cycle). In practice, however, minor amounts (~10–20 m %) of the more soluble salts (e.g., metal halides) have been found to improve cell performance for reasons that are not completely understood, and they are therefore considered to be are a preferred minor ingredient in the electrode salt mixture. It has been found that the optimal proportions of different salts added to a given electrode mixture vary from one cell to the next and may change as the cell is scaled up in size. This optimization process is attainable to anyone skilled in the art of battery development.

A variety of other substances may be added, usually in small amounts (i.e., ~1–10 m %), to the electrodes to enhance the cell performance. These additives include other metal salts containing the main charge carrying species (e.g., carbonates, sulfates, nitrates, phosphates, and other oxyanion compounds) as well as various metal oxides (e.g., $Al_2O_3$), nonmetal oxides, intercalation materials (e.g., carbon or transition metal oxides and sulfides), and aliovalent metal salts. Examples of the latter type of additive include $CaCl_2$ in LiCl-based electrodes and $BaCl_2$ in NaCl-based electrodes. The beneficial effects of such aliovalent metal chlorides are believed to be due to an enhancement in the bulk alkali metal cation conductivity due to the creation of metal cation vacancies in the host metal salt crystal structure. For NaCl-based electrodes, another additive that was found to greatly enhance electrode performance is $Al_2O_3$. This latter additive is also believed to enhance the bulk cationic conductivity and therefore this additive is, along with $BaCl_2$, a preferred ingredient in NaCl-based electrodes.

The electrodes are preferably supported as coatings on a suitable support or substrate such as carbon, a metal, a metal-carbon composite, or an intercalation compound. Other materials that may be included as an integral part of the substrate that are beneficial to the cell performance are silicon, boron, and multi-component compounds or alloys containing carbon, silicon, boron, and/or nitrogen (e.g., BN, $BC_x$, and $BC_xN$, where $x \geq 1$). Anodes are typically supported on carbon, a metal such as nickel or copper, or a metal-carbon composite, whereas cathodes may be supported on carbon or some other electronically-conducting material that has good intercalation properties, e.g., $MnO_2$ or $CoO_2$. Although most of the Examples described herein employ carbon-on-metal substrates for both electrodes, it should be noted that a wide variety of electrode configurations are possible in this invention. For example, both the anode and cathode may consist of metal salt-coated carbon electrodes, or the anode may consist of metal salt-coated carbon while the cathode consists of a metal salt-coated first-row transition metal oxide or some other material with a sufficiently high charge storage capacity. Another possibility is that one or more electrode metal salts may be mixed with a substance capable of intercalation (e.g., carbon), and this mixture may be supported on a metal or carbon substrate.

In addition, to achieve the highest possible specific power density and cycle number, these all-metal salt electrodes should be used with chemically-compatible electrolytes. In this invention, two types of electrolytes are employed, i.e., solvent-based and ambient temperature molten salt-based. The former are made using well-known battery electrolyte fabrication techniques by adding a metal salt containing the main charge-carrying metal cation species to the desired host solvent, preferably one with a wide electrochemical window. Electrolyte solvents that meet these and numerous other requirements are thionyl chloride ($SOCl_2$) and sulfuryl chloride ($SO_2Cl_2$); in addition, since these solvents are reducible, they often play a dual role as cathode active material, as discussed above. In solvents such as these, it is well known that the addition of a third component with Lewis acid character such as $AlCl_3$ is generally necessary to increase the solubility of the metal salt (which is normally basic) so that the electrolyte conductivity can be made sufficiently high. Well-known examples of metal salts that contain the metal cation of interest that can also be made to have a good solubility by adding Lewis acid salts as third components are the alkali halides (e.g., LiCl). The Lewis acid salt and metal salt are typically added in a nearly 1:1 molar ratio (e.g., as $LiAlCl_4$ salt for LiCl and $AlCl_3$), but deviations from this composition are possible and some cases may be desirable to optimize cell behavior.

The (Lewis base) metal salts for the inorganic solvent-based catholytes of this invention are chosen mainly from the metal halides, but other types of electrolyte salts (e.g., metal pseudo halides) are possible, and they are given in the Examples. For the present applications, $AlCl_3$ is the preferred Lewis acid salt and is used almost exclusively in those Examples that utilized solvent-based catholytes. This preference of $AlCl_3$ over other salts with Lewis acid character stems from a number of practical considerations; namely, $AlCl_3$ is relatively inexpensive, nontoxic, easy to purify (or obtain in sufficiently purified form), and has a fairly low molecular weight. In addition, the solution chemistry of $AlCl_3$ in oxychloride solvents has been well characterized and documented in the research literature. It should be noted, however, that other slats with Lewis acid character such as $PF_6$ and $AsF_6$, many of which are well known and in common use in the battery industry, can be used in place of $AlCl_3$ with comparable results, and without departing in any way from the spirit and scope of this invention.

For high energy and power density batteries, the sulfur oxychlorides are the most preferred of all the known reducible inorganic halogen- and chalcogen-containing solvents because of their high cell potentials with respect to lithium as well as the high exchange current densities that they yield. It should be noted, however, that any electrolyte containing one or more oxidizable or reducible halogen- and/or chalgogen-bearing compounds may be utilized in cells of the design described herein without departing from the spirit and scope of this invention. Examples of such include those with the general formulas, $M_pX_n$ or $M_pZ_mX_n$, where M is either a metal (e.g., Ti, V), sulfur, or phosphorus, Z is a chalcogen, and X is a halogen. In addition, interhalogens, $X_mX'_n$ (e.g., $ICl_3$), and the sulfur oxides, $SO_2$ and $SO_3$, may be utilized in a similar capacity. The redox reactions of most of these compounds are very similar to those of the sulfur oxychlorides and phosphorus chlorides, i.e., these reactions generally involve the uptake or liberation of halide or chalcogen anions, $X^-$ and $Z^{2-}$, with the formation of one or more neutral elements or molecules upon electroreduction. Also, most of these compounds are molecular liquids at room temperature, and their liquid structures and solution chemical equilibria with Lewis acid and base salts are known to be very similar to those of the sulfur oxychlorides; these attributes make them well suited as electrolyte solvents for rechargeable cells. Moreover, the ability of many of these compounds to act as a liquid cathode active material in electrochemical cells has been previously demonstrated. U.S. Pat. Nos. 3,926,669, 3,953,229, 3,953, 233, 4,012,564, and 4,400,453 describe the use of a wide variety of covalent oxyhalide and thiohalide solvents as cathodes in lithium primary cells.

Several families of low-melting molten salt systems based on $AlCl_3$ and $PCl_5$ disclosed herein have been discovered that are promising electrolyte solvents for high energy and power density rechargeable cells employing the new electrode design. The liquid structures of these molten salts consist mainly of ionic complexes, $AlCl_4^-$ and $PCl_4^+$, which are formed by a Lewis acid-base reaction between $AlCl_3$ and $PCl_5$. This ionic complex liquid structure is believed to be the origin of the low melting points, low vapor pressures, and wide liquid temperature ranges, which make them extremely stable solvents for a wide variety of electrode salts and well suited for room temperature applications. In the $AlCl_3$—$PCl_5$ binary, a low-melting eutectic occurs at ~67 m % $AlCl_3$ at 25° C. A number of related ternaries based on the $AlCl_3$—$PCl_5$ binary have also been developed as electrolyte solvents which include $AlCl_3$—$PCl_5$—$PCl_3$, $AlCl_3$—$PCl_5$—$POCl_3$, and $AlCl_3$—$PCl_5$—$PSCl_3$. These ternaries form stable liquids at room temperature over a wide range of mixture composition. The third components (i.e., $PCl_3$, $POCl_3$, and $PSCl_3$), which serve to lower the melting point even further, are typically added at a amount<40 m % so that the mixture is a single phase liquid. These ternaries, which are also believed to consist primarily of ionic complexes, can be made ionically conducting in the cation of the electrode active metal of the cell by adding salts containing the desired metal cation, e.g., LiCl and $LiAlCl_4$. Electrical conductivity data are presented below in Example #1.

In addition, these ambient temperature molten salt electrolytes may, depending on the compounds comprising the electrode solid phases, also function as liquid electrodes since the phosphorus-containing components are capable of being oxidized and reduced during cell operation. For example, in the $AlCl_3$—$PCl_5$—$PCl_3$ ternary, whereas $AlCl_3$ is more highly stable with respect to oxidation and reduction during normal cell operation, $PCl_3$ may reversibly uptake (and/or $PCl_5$ may release) chlorine during the discharging and charging of a metal chloride-containing electrode, as discussed above ("Summary of Invention"). Thus, when the cell chemistry is such that it can also act as an electrode, the $AlCl_3$—$PCl_5$—$PCl_3$ ternary may be regarded as a chlorine reservoir enabling the reversible dissociation and reformation of solid metal salt electrodes containing metal chloride. Also, the $POCl_3$ and $PSCl_3$ components, which, as noted above, have been previously utilized in primary cells as liquid cathodes, may also assume a similar function in cells employing the new electrode design, depending on the electrode composition and state of cell charge.

Promising families of cell component material compositions discovered in the course of this investigation that yield potentially high storage capacity and high specific energy and power density rechargeable batteries are summarized in the Claims; more specific examples are given within this disclosure in the Examples. Although the materials listed in the Claims and Examples provide a good overview of the different types of chemistries that can be employed in ambient-temperature rechargeable batteries based on the new cell design, they should not be considered to be exhaustive.

The overall cell fabrication process from start to finish generally consisted of five stages, i.e., I. Starting Materials Preparations, II. Electrolyte Preparations, III. Electrode Substrate Preparations, IV. Electrode Coating Preparations, and V. Cell Assembly. For each stage, those experimental procedures and materials most commonly employed herein are described below in detail. They will henceforth be referred to throughout the Examples for brevity, and any deviations therefrom will be noted as appropriate.

I. Starting Materials Preparations

In all cases, the water used in the preparation of the cells from start through finish was purified in the usual manner by deionization and distillation.

All inorganic compounds (e.g., salts) and solvents (e.g., actonitrile) other than water employed herein were reagent grade of 98%–99.9% purity and purchased from Alfa/Johnson Matthey unless noted otherwise.

Since most of the substances used herein are hygroscopic, most materials handling procedures were carried out in a dry box, usually in the course of preparing the cell component materials (i.e., electrodes and electrolyte). Commonly-used materials handling procedures included the grinding of solid materials to fine powders with a mortar and pestle.

A number of ternary and quaternary salt compounds were fabricated herein for use as electrolyte additives to impart a high ionic conductivity. All fabrication procedures were carried out in an argon-filled dry box unless noted otherwise. Care was taken to insure that the starting salts were thoroughly dried prior to mixing. Also, all starting salts were ground to fine powders with a mortar and pestle. The fabrication procedures for four multi-component salt compounds are given as follows.

$LiAlCl_4$ was prepared by combining 4.2 g LiCl with 13.3 g $AlCl_3$ in a covered glass bottle and heating the powder mixture first to 150° C., where it was held for 30 minutes, then to 200° C. where it was held until all the solids had reacted to form a single compound (i.e., $LiAlCl_4$). Heating was performed from start to finish using a hot plate.

$NaAlCl_4$ was prepared by combining 5.8 g NaCl and 13.3 g $AlCl_3$ in a covered glass bottle and heating to about 250° C. on a hot plate until a homogeneous single phase liquid had formed. The liquid mixture was cooled to room temperature, and the resulting solid (i.e., $NaAlCl_4$) was crushed to a fine powder with a mortar and pestle.

$NaAl(OCN)Cl_3$ and $NaAl(SCN)Cl_3$ were prepared in the same manner as described above for $NaAlCl_4$ starting with, respectively, 6.5 g NaOCN and 13.3 g $AlCl_3$, and 8.1 g NaSCN and 13.3 g $AlCl_3$.

In many of the cells, carbon was used as an integral electrode component, e.g., as a substrate or as an electrode active material. Unless stated otherwise, this carbon was in the form of fiber cluster and was manufactured by Hercules, Inc. (Type AS4-6-3K). In all cases, the fibers were cleaned prior to use by soaking them in concentrated $H_2SO_4$ followed by a thorough rinsing with water.

For all the carbon-on-nickel substrates, nickel metal supports were cut from nickel net with a thickness of about 0.003 mm which was woven from 0.17 mm diameter wires. This nickel net was manufactured by Exmet Corp. (Mesh 3NI5.5-4/0A). In all cases, the nickel net was cleaned prior to use by soaking in dilute $HNO_3$ followed by a thorough rinsing with water.

II. Electrolyte Preparations

The electrolytes were prepared from start to finish in a dry box with an argon atmosphere unless stated otherwise. Two main types of electrolytes were employed, i.e., solvent-based and molten-salt based. Their common preparation procedures are described below.

A. Solvent-Based

The solvent-based electrolytes used either $SOCl_2$ or $SO_2Cl_2$ as the solvent. These solvent-based electrolytes were made by dissolving stoichiometric amounts of the desired solutes in the specified nominal concentrations (by mole fraction) into the solvent. The ingredients were combined at room temperature unless stated otherwise. Both $SOCl_2$- and $SO_2Cl_2$-based electrolytes were typically made in ~1 mole lots (by solvent). The exact recipes varied from one cell to the next and are given in the Examples.

B. Molten Salt-Based

The molten salt electrolytes are based on the ternaries, $AlCl_3$-$PCl_5$-$PCl_3$, $AlCl_3$-$PCl_5$-$POCl_3$, and $AlCl_3$-$PCl_5$-$PSCl_3$. The preparation procedures for those that were most commonly employed are given below:

i) $AlCl_3$-$PCl_5$-0.3 $PCl_3$

A molten salt mixture with the above nominal composition was made as follows. Small lots (~38 g) were prepared by combining 13.3 g $AlCl_3$ with 20.8 g $PCl_5$ in a covered glass bottle and heating to 170° C. using a hot plate until the mixture became homogeneous. This mixture was then cooled to about 40° C. and 50 g $PCl_3$ was added. These ingredients were mixed, heated to 50° C., and held for two hours. After this mixture was allowed to equilibrate, it was found that a liquid consisting of two distinct phases had formed. The top liquid consisted mostly of undissolved $PCl_3$ and was removed entirely by skimming it off the top. The liquid that had settled to the bottom consisted of $AlCl_3$ and $PCl_5$ present at a 1:1 molar ratio in which $PCl_3$ was present at saturation, giving a molar ratio of $AlCl_3$, $PCl_5$, and $PCl_3$ estimated at about 10:10:3 based on the amount of $PCl_3$ in the top liquid. This bottom liquid constituted the $AlCl_3$-$PCl_5$-0.3 $PCl_3$ solvent.

This molten salt mixture was used either alone or as an electrolyte solvent for a variety of solutes, e.g., $LiAlCl_4$ and $NaAlCl_4$. Larger lots (~200–250 g) of $AlCl_3$-$PCl_5$-0.3 $PCl_3$ solvent were prepared as necessary in a manner very similar to that described above by proportionally scaling up the quantities of all the starting ingredients.

Throughout the Examples, this electrolyte solvent, prepared as described above, will be referred to as "$AlCl_3$-$PCl_5$-0.3 $PCl_3$."

ii) $AlCl_3$-$PCl_5$-0.3 R(R=$POCl_3$ or $PSCl_3$)

These molten salt mixtures with the nominal composition given above were prepared in lots of ~39 g each as described above for $AlCl_3$-$PCl_5$-$PCl_3$ except that either $POCl_3$ or $PSCl_3$ was substituted for $PCl_3$.

The phase equilibria of these ternaries appear to be similar to that of $AlCl_3$-$PCl_5$-$PCl_3$; adding an excess of either $POCl_3$ or $PSCl_3$ to mixtures of $AlCl_3$ and $PCl_5$ also results in the formation of a two-phase mixture, the bottom liquid consisting of $AlCl_3$ and $PCl_5$ present at a 1:1 molar ratio, with $POCl_3$ or $PSCl_3$ present at saturation. The amount of $POCl_3$ and $PSCl_3$ present at saturation in these mixtures is uncertain but was estimated at around 30 m % (±3 m %) based on the amount of top liquid. In both cases, the bottom liquid constituted the $AlCl_3$-$PCl_5$-0.3 R solvent.

Throughout the Examples, these electrolyte solvents, prepared as described above, will be referred to as "$AlCl_3$-$PCl_5$-0.3 $POCl_3$" and "$AlCl_3$-$PCl_5$-0.3 $POCl_3$."

III. Electrode Substrate Preparations

Most of the substrates were of the carbon-on-metal type, and the metal support material was typically nickel. Five main methods were developed herein for the application of carbon to a metal support. In the first method (Type I), carbon fiber cluster are wound around the metal support so that it is completely covered from both sides (0.020–0.025 g/cm$^2$). In the second method (Type II), the carbon is applied to the metal support (0.010–0.012 g/cm$^2$) by using a carbon fiber powder-Teflon paste. In the third method (Type III), the carbon is applied to the metal support (0.010–0.012 g/cm$^2$) by using a carbon fiber powder-polypropylene oxide (PPO) paste. In the fourth method (Type IV), the carbon is dispersed as a thin layer of short carbon fibers by applying them to the metal support (0.027 g/cm$^2$) by using a carbon fiber-PPO-acetonitrile slurry. In the fifth method (Type V), the carbon is applied to the metal as a slurry of carbon powder-PPO-acetonitrile.

It should be noted that in the Type II through V methods described herein, the amounts of carbon applied to the metal supports can be further reduced as necessary and desired from those given in the recipes provided herein by process optimization. Substrate fabrication procedures such as Types II through V are therefore generally more preferred for the design of larger prototype cells or batteries for electric vehicle battery applications in which a reduction in weight of all electrode active materials is crucial.

The above-described methods were the primary ones employed herein for the application of carbon to electrode assemblages as a distinct substrate phase. Other methods were also devised for the application of finely-dispersed carbon to electrode assemblages; in these methods, the carbon was made into a paste by mixing it with both a binder and an electrode active metal salt. These methods are described in more detail in the Examples.

Unless stated otherwise, all substrate preparations were carried out in air except for those treatments carried out above room temperature such as drying and annealing. Detailed descriptions of the preparation procedures for the most commonly used substrates are given below.

A. Carbon-on-nickel, 4×10 mm, Type I (wound carbon fibers)

This carbon-on-nickel substrate was prepared as follows. First, the nickel for the substrate and lead to the external circuit was cut in one continuous piece from nickel net; a 4×10 mm section formed the substrate, and a thinner rectangular "tail" 2 mm wide was centered on one of the 4 mm edges. The tail was used as the lead; about 10 mm of the tail was left as net, and thereafter, nickel wires for use as connections to the external circuitry were freed from the net by removing the cross wires. The carbon was applied by densely winding carbon fibers around the 4×10 mm nickel net rectangle, making certain that each side was thoroughly covered with carbon fiber so that the nickel metal would never be exposed to the electrolyte during cell operation. A carbon fiber was also wound around enough of the thin rectangle comprising the lead so as to protect all parts of the lead that would be in the cell housing from possible exposure to the electrolyte. The total weight of wound carbon fibers on each substrate typically was 0.008–0.010 g, i.e., (0.02–0.025 g)/cm$^2$.

Throughout the Examples, this substrate type, prepared as described above, will be referred to as "carbon-on-nickel substrate, 4×10 mm, Type I (wound carbon fiber)."

B. Carbon-on-platinum, 4×10 mm, Type I (wound carbon fibers)

This carbon-on-platinum substrate was prepared as follows. A 4×10 mm piece of Pt foil was used as the substrate; a 10 mm long Pt wire (0.4 mm diameter) was used as the lead. This lead was spot welded onto the center of one of the 4 mm edges. The carbon fiber was applied by densely winding carbon fibers around the 4×10 mm Pt foil rectangle using exactly the same procedure as described above for the carbon-on-nickel substrate, 4×10 mm, Type I. The total weight of wound carbon fibers on each substrate was typically about 0.008–0.010 g, i.e., (0.02–0.025)g/cm$^2$.

Throughout the Examples, this substrate type, prepared as described above, will be referred to as "carbon-on-platinum substrate, 4×10 mm, Type I (wound carbon fibers)."

C. Carbon-on-nickel, 4×10 mm, Type II (carbon-Teflon paste)

This carbon-on-nickel substrate was prepared as follows. About 10 g of carbon fibers were cut to 5 mm lengths which were then combined with 0.5 g LiCl and 10 ml water. This mixture was heated in air at a rate of about 5° C./minute from 50° C. to 250° C., held for two hours, and cooled to room temperature. Afterwards, this mixture, which consisted mostly of carbon and LiCl, was heated to about 1000° C. with a propane flame, cooled to room temperature, and then crushed to a fine powder. The excess LiCl was washed away with water, and the remaining material, which consisted mostly of carbon, was mixed thoroughly with a Teflon-water paste containing about 0.2 g Teflon.

A 4×10 mm nickel net was prepared as described above for the carbon-on-nickel substrate, 4×10 mm, Type I. About 0.006–0.01 g of the paste prepared as described above was applied evenly to both sides of the nickel net then smoothed by squeezing between a glass roller and glass plate. This carbon-on-nickel substrate assemblage was heated in air to 150° C. and held for two hours, heated thereafter in vacuum to 200° C. and held for two hours, cooled to room temperature, placed in a vacuum-sealed Pyrex glass tube, and given a final heat treatment at 500° C. for one hour. The total amount of carbon on the substrate once all the preparations were complete was about 0.004–0.008 g, i.e., (0.01–0.02 g)/cm$^2$.

Throughout the Examples, this substrate type, prepared as described above, will be referred to as "carbon-on-nickel substrate, 4×10 mm, Type II (carbon-Teflon paste)."

D. Carbon-on-nickel, 4×10 mm, Type III (carbon-polypropylene oxide paste)

This carbon-on-nickel substrate was prepared as follows. Carbon fiber powder was prepared in a lot of about 10 g as described above for the carbon-on-nickel substrate, 4×10 mm, Type II. After the excess LiCl was removed in the final step, the remaining material, which consisted mostly of carbon, was allowed to dry under ambient conditions. A paste was made by combining 5.0 g of the carbon fiber powder with 2.0 g of a binder which consisted of one part by weight of polypropylene oxide with a molecular weight of about 8,000,000 g/mole (i.e., $PPO_{8,000,000}$) and one part by weight of acetonitrile. (The binder was made in 100 g lots by combining 50 g $PPO_{8,000,000}$ with 100 g acetonitrile, allowing the $PPO_{8,000,000}$ to dissolve completely, then evaporating 50 g of the acetonitrile solvent.)

A 4×10 mm nickel net was prepared as described above for the carbon-on-nickel substrate, 4×10 mm, Type I. About 0.006–0.01 g of the paste prepared as described above was applied evenly to both sides of the nickel net then smoothed by squeezing between a glass roller and glass plate. This carbon-on-nickel substrate assemblage was heated in vacuum to 150° C., held for about four hours, cooled to room temperature, placed in a vacuum-sealed Pyrex glass tube, heated slowly from 100° C. to 500° C., and held for four hours. The total amount of carbon on the substrate once all the preparations were complete was about 0.004–0.008 i.e., (0.010–0.020 g)/cm$^2$.

Throughout the Examples, the substrate type, prepared as described above, will be referred to as "carbon-on-nickel substrate, 4×10 mm, Type III (carbon-PPO paste)."

E. Carbon-on-nickel, 50×70 mm, Type IV (carbon-acetonitrile-polypropylene oxide slurry)

This carbon-on-nickel substrate was used in the jelly-roll test cell (see below) and was prepared as follows. First, the nickel for the substrate and leads to the external circuit was cut in one continuous piece from nickel net; a 50×70 mm section formed the substrate, and 5 rectangular "tails" about 2 mm wide were evenly distributed along the entire length of one of the 50 mm edges from one end to the other. Five nickel wires spaced about 12–13 mm apart for use as connections to the external circuitry were freed from the net by removing the cross wires from the tails. This nickel net was coated evenly on both sides with a carbon-PPO-acetonitrile mixture which was prepared as follows.

Ten grams of carbon fibers were cut to 1 mm lengths and mixed with 40 g PPO-acetonitrile binder which was prepared in ~100 g lots by combining 5 g $PPO_{8,000,000}$ with 100 g acetonitrile. This mixture, which was in the form of a thin slurry, was applied to the nickel net by immersing it until thoroughly covered and allowing it to dry under ambient conditions for a few minutes. This process was repeated several times until the amount of carbon deposited on the net was about 1.0 g. This carbon-on-nickel substrate assemblage was dried in air for about 2 hours then heated in vacuum for 4 hours at 150° C. This assemblage was cooled to room temperature, placed in a quartz tube stuffed at the open end with glass paste paper, and placed in a furnace. A nitrogen atmosphere was introduced, and the assemblage was heated at 5° C./minute from 100° C. to 300° C., held for 2 hours, heated at 5° C./minute to 600° C., and held for 5 hours. Afterwards, the assemblage was cooled slowly to room temperature in nitrogen.

The above-described procedure for applying the carbon to the nickel nets was devised for this substrate to minimize the total amount of material deposited on the nickel nets so that the final electrode assemblages would be as flexible as possible and therefore easier to wind into a jelly-roll.

Throughout the Examples, this substrate type, prepared as described above, will be referred to as "carbon-on-nickel substrate, 50×70 mm, Type IV (carbon-acetonitrile-PPO slurry)."

F. Carbon-on-nickel, 50×70 mm, Type V (carbon-acetonitrile-polypropylene oxide slurry)

This carbon-on-nickel substrate, which consists mostly of carbon fabric, was also used in the jelly-roll test cell (see below) and was prepared as follows. First, a 50×70 mm rectangle of carbon fabric, 0.95 g, i.e., 0.027 g/cm$^2$ (Zoltek, Inc., Panex®30 fabric Pw06) was cleaned by soaking it in concentrated $H_2SO_4$ for about 10 hours and rinsing it thoroughly with water. This carbon fabric rectangle was treated further by heating it with a propane flame to around 1200° C.; this treatment served to drive off impurities and also smoothed the surfaces of the carbon fabric by burning off all the tiny fibers sticking out of the surface.

Five nickel wires which served as the leads to the external circuit were affixed to the carbon fabric as follows. These wires, which were arranged in parallel and spaced about 8 mm apart with the first and fifth wires each about 9 mm away from the nearest edge, were tightly sewn or woven into the carbon fabric rectangle along its length (i.e., 70 mm) starting from one 50 mm edge and ending at the other. From the latter 50 mm edge, at least 10 cm of free nickel wire was left for each lead to be used for connections to the external circuitry. During the weaving process, great care was taken to insure that the carbon fabric and nickel wires made excellent contact. To further improve the electrical connections and to prevent the nickel wires from being exposed to the electrolyte in the cell, all nickel wires surfaces and gaps between the nickel wires and carbon fabric were covered or filled in with a carbon-PPO-acetonitrile slurry which was prepared as follows.

The carbon, which was in the form of a powder, was prepared in a lot of about 10 g as described above in Part C for the carbon-on-nickel substrate, 4×10 mm, Type II. After the excess LiCl was removed in the final step, the remaining material, which consisted mostly of carbon, was allowed to dry under ambient conditions. A paste was made by combining 5.0 g of the carbon fiber powder with 5.0 g of an acetonitrile-polypropylene binder which was prepared in ~110 g lots by combining 100 g acetonitrile with 10 g $PPO_{8,000,000}$. The mixture, which was in the form of a thin slurry, was applied to all exposed nickel wire surfaces and gaps between the nickel wires and carbon fabric as described above. The total amount of slurry applied to the substrate was about 0.5 g.

Once the slurry was allowed to dry, the substrate assemblage was heated in vacuum to 150° C. and held for two hours. This assemblage was cooled to room temperature, placed in a vacuum-sealed quartz tube, heated at 5° C./minute from 50° C. to 550° C., held for 5 hours, and cooled slowly to room temperature.

Throughout the Examples, this substrate type, prepared as described above, will be referred to as "carbon-on-nickel substrate, 50×70 mm, Type V (carbon-acetonitrile-PPO slurry)."

IV. Electrode Coating Preparations

The processing procedures are highly dependent on the types of electrode active materials employed, but most of them fall into one of two main categories, i.e., i) deposition from solution and ii) paste. These procedures are described in more detail below. Unless stated otherwise, all electrode processing procedures were carried out in a dry box with an argon atmosphere except for those treatments carried out above room temperature such as drying and annealing.

A. Solution Deposition

In this technique, a substrate is coated to the desired total weight of a given salt mixture (e.g., 0.2 LiCl-0.8 $CaCl_2$) by repeatedly immersing it into a solution containing the salts in the specified proportions and baking it between immersions. For most of the Examples described herein using solution deposition, the solvent was water, but occasionally, other solvents such as acetonitrile were used, depending on the compositions of the electrode active materials.

The common procedures used for the preparation of electrode coatings using solution deposition are as follows. First, a starting solution of the salts was prepared. (The starting solution compositions varied with both substrate size and electrode active material composition and are given in the Examples.) The immersion procedure consisted of holding one or both sides of the substrate in the solution, removing it from the solution, and allowing it to dry under ambient conditions. The amount of salt deposited during an immersion, which generally increases with solution concentration, was controlled by adjusting the concentration of the salts in the starting solution. Typically, for the first immersion, the substrate was totally covered with the starting solution and held for a few seconds. For later immersions, the amount of salt deposited on the substrate was "fine tuned" by diluting the solution as necessary at each stage. As the coating was being built up on the substrate, however, care had to be taken to prevent the already-deposited salt from re-dissolving in solution; this phenomenon was especially problematic at later stage immersions because the starting solution had been diluted to well below its original concentration. Therefore, for later stage immersions using highly diluted salt solutions, only the corners of the substrate (or tips in the case of carbon fiber substrates) were immersed in the solution, and natural capillary action was relied upon to draw the solution to the other regions of the substrate.

After each immersion, the substrate was baked. This baking procedure was necessary to insure that all the solvent had been driven off and to monitor the amount of material deposited at a given stage. The baking procedure performed after each immersion typically consisted of heating the coated substrate in air or in vacuum to drive off the solvent and, in some cases, to effect a desired chemical reaction (e.g., see electrode (ii) below). The baking times and temperatures varied with the types of coating and substrate materials used and are given in the Examples.

The immersion-baking cycle was repeated as necessary until the desired total weight of the salt mixture on the substrate was reached. Unless stated otherwise, the salt mixture was coated evenly on both sides of the substrate; for carbon fiber substrates, the salt coating was applied evenly around the circumference along the length of the fiber. Once the salt mixture had been built up to its desired amount, the coated substrate was typically given a final baking as described in more detail in the Examples. Also, it was generally given a final higher-temperature annealing to make certain that the coating was homogeneous in both thickness and composition and that a good bond had formed between the coating and the substrate. The final baking and annealing schedules are given in the Examples.

The preparation procedures for a number of commonly-used electrodes prepared by solution deposition are given below. These preparation procedures apply to all 4×10 mm carbon-on-nickel substrates (i.e., Type I through IV).

i) 0.2 LiCl-0.8 $CaCl_2$, 4×10 mm, carbon-on-nickel

For this electrode, a 4×10 mm carbon-on-nickel substrate was coated to the desired total weight of LiCl and $CaCl_2$ by the solution technique described above. The starting solution consisted of LiCl and $CaCl_2$ present at a molar ratio of about 1:4 which was prepared by dissolving 2.52 g LiCl and 26.6 g $CaCl_2$ in 50 ml water. The baking procedure performed after each immersion consisted of heating the coated substrate in air at a rate of about 5° C./minute from 50° C. to 150° C., holding it for two hours, drawing a vacuum, heating it to 200° C., holding it for two hours, then cooling it back to room temperature. This baking procedure was necessary to insure that all the water had been driven off and was such that the nickel would not be attacked by oxygen. The immersion-baking procedure was repeated as necessary until the total weight of the LiCl-$CaCl_2$ salt mixture on the substrate was about 0.02 g. For the final baking, the electrode assemblage was inserted into a Pyrex test tube in an argon-filled dry box and glass paste paper was tightly stuffed into the open end.

As a final step, the electrode assemblage prepared as described above was inserted into a Pyrex glass tube, and care was taken to insure that it did not touch the glass walls. The tube was vacuum-sealed and heated to 250° C., heated thereafter at a rate of 5° C./minute up to 500° C., and held for 30 minutes. This step was necessary to make certain that the coating was homogeneous in both thickness and composition and that a good bond had formed between the coating and the substrate.

Throughout the Examples, this electrode, prepared as described above, will be referred to as "electrode type 0.2 LiCl-0.8 $CaCl_2$, 4×10 mm, carbon-on-nickel."

ii) 0.5 NaCl-0.25 $Al_2O_3$-0.25 $BaCl_2$, 4×10 mm, carbon-on-nickel

An electrode with the nominal composition given above was prepared as follows. NaCl, $AlCl_3$, and $BaCl_2$ were combined in a 2:2:1 molar ratio by dissolving 5.8 g NaCl, 13.3 g $AlCl_3$, and 10.4 g $BaCl_2$ in water as a saturated solution at 40° C. (To make this solution, water was added to the salt mixture while stirring with a magnetic stirrer on a hot plate until all the solids had dissolved.) This salt mixture was deposited from solution as a coating on a 4×10 mm carbon-on-nickel substrate using the solution technique described above. The baking procedure performed after each immersion consisted of first drying the coated substrate by heating in air at a rate of about 5° C./minute from 50° C. to 100° C. and holding for one hour. Then, the coated substrate was heated to 190° C., held for two hours, heated thereafter at a rate of 10° C./minute to 850° C. and held for 30 minutes. This baking procedure served to drive off all the water and also insured the complete conversion of $AlCl_3$ to $Al_2O_3$. The immersion-baking procedure was repeated as necessary until the total weight of the salt coating was about 0.025 g.

Throughout the Examples, this electrode, prepared as described above, will be referred to as "electrode type 0.5 NaCl-0.25 $Al_2O_3$-0.25 $BaCl_2$, 4×10 mm, carbon-on-nickel".

B. Paste

For some of the cells, the electrode coatings were applied as pastes. This technique was most often used for water-insoluble electrode active materials (e.g., metal fluorides, transition metal oxides, and carbon). The recipes for the pastes varied widely with electrode active material composition, but typically, they were made by combining fine powders of the metal salts and other solid phase (e.g., carbon) present in the specified proportions with small amounts of a binder or vehicle.

The most commonly used binder was one part by weight polypropylene oxide with a molecular weight of about 8,000,000 g/mole (i.e., $PPO_{8,000,000}$) dissolved in 100 parts by weight acetonitrile. This binder was produced in ~100 g lots by combining 1 g $PPO_{8,000,000}$ with 100 g acetonitrile. Unless stated otherwise, this binder was used for the fabrication of electrode active material pastes and will be referred to as "acetonitrile-01 $PPO_{8,000,000}$ binder."

Unless stated otherwise, the paste was applied evenly on both sides of the substrate; for carbon fiber substrates, the paste was applied evenly around the circumference along the length of the fiber. For all substrates except carbon fibers, the paste was smoothed by squeezing the coated substrate between a glass roller and a glass plate. The electrode assemblage was then given a final heat treatment which typically consisted of a drying procedure followed by a higher-temperature anneal. These final heat treatments varied with the types of materials in the electrode assemblage and are given in the Examples.

The preparation procedures for a number of commonly-used electrodes prepared as paste coatings are given below. These preparation procedures apply to all 4×10 mm carbon-on-nickel substrates (i.e., Type I through IV).

i) 0.8 $Li_2O$-0.2 $Li_2CO_3$, 4×10 mm, carbon-on-nickel

A mixture of $Li_2O$ and $Li_2CO_3$ with the nominal composition given above was prepared by partially decomposing 14.2 g $Li_2CO_3$ as follows. 14.2 g $Li_2CO_3$ was placed in a quartz test tube, heated in air to 500° C., and held for about 5 hours. Then, the temperature was increased to 1310° C. (the decomposition temperature of $Li_2CO_3$) and the $Li_2CO_3$ was held for a time sufficient to drive off enough $CO_2$ so that the desired mole fraction of $Li_2O$ (i.e., y=0.8) would be obtained. At this temperature, the rate of $Li_2CO_3$ decomposition to $Li_2O$ and $CO_2$ is sufficiently high, and the amount of $CO_2$ driven off as a function of heating time determines the relative amounts of $Li_2O$ and $Li_2CO_3$ present in the mixture. For the $Li_2O$-$Li_2CO_3$-containing electrodes used in this study, heating times on the order of 30 to 120 minutes were used. For this electrode salt mixture, the starting $Li_2CO_3$ was held at 1310° C. for a total heating time of one hour giving a mixture of about 2.84 g. $Li_2CO_3$ and 4.6 g $Li_2O$ as calculated from the weight loss (i.e., 6.8 g).

After the $Li_2O$-$Li_2CO_3$ mixture had cooled to room temperature, it was transferred to a dry box, crushed to a fine powder with a mortar and pestle, and combined with 1.0 g of the acetonitrile-01 $PPO_{8,000,000}$ binder prepared as described above in this section. Approximately equal amounts of this paste were applied evenly to each side of a 4×10 mm carbon-on-nickel substrate; the total amount ranged from about 0.001 g to 0.02 g, depending on the cell. The paste was smoothed by squeezing between a glass roller and a glass plate. The electrode assemblage was heated to 150° C. in air, held for two hours, cooled to room temperature, placed in a large Pyrex tube which was vacuum-sealed, heated to 600° C., held for two hours, and cooled to room temperature.

Throughout the Examples, this electrode, prepared as described above, will be referred to as "electrode type 0.8 $Li_2O$-0.02 $Li_2CO_3$, 4×10 mm, carbon-on-nickel."

ii) 0.4 LiCl-0.48 $Li_2O$-0.012 $Li_2CO_3$, 4×10 mm, carbon-on-nickel

This electrode consists of a salt mixture in which the LiCl is present at 40 m % and the salt mixture, 0.8 $Li_2O$-0.2 $Li_2CO_3$, is present at 60 m %. The starting 0.8 $Li_2O$-0.02 $Li_2CO_3$ mixture was prepared by decomposing 14.2 g $Li_2CO_3$ as described above for the electrode type 0.8 $Li_2O$-0.2 $Li_2CO_3$, 4×10 mm, carbon-on-nickel. After it had cooled to room temperature, it was transferred to a dry box, crushed to a fine powder with a mortar and pestle, and combined with 5.43 g LiCl. A paste was made with this 0.4 LiCl-0.48 $Li_2O$-0.12 $Li_2CO_3$ powder mixture by adding 1.0 g of the acetonitrile-01 $PPO_{8,000,000}$ binder. Approximately equal amounts of this paste were applied evenly to each side of a 4×10 mm carbon-on-nickel substrate; the total amount ranged from about 0.01 g to 0.03 g, depending on the cell. The paste was smoothed by squeezing between a glass roller and a glass plate and given the same final heat treatment as described above for the electrode type 0.8 $Li_2O$-0.2 $Li_2CO_3$, 4×10 mm, carbon-on-nickel.

Throughout the Examples, this electrode, prepared as described above, will be referred to as "electrode type 0.4 LiCl-0.48 $Li_2O$-0.12 $Li_2CO_3$, 4×10 mm, carbon-on-nickel."

V. Cell Assembly

Several types of testing or prototype cells were employed in this study which differ according to their size and shape. The test cell designs employed herein are all parallel plate-type (including the Tiny Cell design described below) except for one larger cell which is a jelly-roll type. A wide range of cell sizes was employed with electrode cross sectional areas ranging from about 0.1 to 35 $cm^2$. This size range enabled an assessment of the ability of certain promising cell material compositions to be scaled up to larger cell sizes, but it should be noted that these test cells were designed primarily for a preliminary evaluation of cell component materials properties in rechargeable cells. These test cell designs were not optimized as far as packaging weight, and volume are concerned. For example, in most of the cell designs, the amount of electrolyte added far exceeds the actual amount between the electrodes; hence, for each Example, the amount of working electrolyte between the electrodes is listed to provide an estimate of the minimum amount necessary to construct a rechargeable cell of a given size with given amounts of electrode active materials. Although cell assembly was not the main concern, it can be readily appreciated that the full consideration thereof by those skilled in the art of battery construction can be easily and fruitfully applied to the construction of batteries based on the new types of cell component materials disclosed herein.

For all the parallel plate designs, the working electrode active material was considered to be all anode and/or cathode active material present between the electrodes; for each electrode, this amount was generally about half the total material applied to the substrate. For the jelly-roll design, the total working electrode active material included all electrode active material applied to both sides of the substrates. These assumptions were made both in the calculations of discharging Coulombic capacity given in some of the Examples and in the amounts of working anode and cathode active materials listed in all the Examples.

The physical characteristics and fabrication procedures of the cell designs most commonly used in this study are described below. The cells were housed in Pyrex glass tubes which were found to be more than satisfactory as they could withstand the moderate gas pressure buildup that sometimes occurred for cell designs employing $SOCl_2$ and $SO_2Cl_2$ catholytes. Unless noted otherwise, all cell assembly procedures were carried out in an argon-filled dry box except for those treatments carried out above room temperature such as drying and annealing.

A. Tiny Cell (10 mm carbon fiber cluster substrate)

For this cell, a substrate-lead assemblage was constructed for each electrode as follows. A 50 mm long Pt wire 0.4 mm in diameter was joined to a 20 mm long carbon fiber cluster about 1–2 mm in diameter. This joining operation was performed by placing one end of the Pt wire next to one end of the carbon fiber cluster with an overlap length of about 10 mm. A piece of Pt wire 0.1 mm in diameter was tightly wrapped and twist tightened around the two materials along the 10 mm region of contact. The Pt wire-carbon fiber cluster assemblage was inserted into a thin glass tube about 10 mm long with an inner diameter of about 2 mm. The region of contact between the Pt wire and carbon fiber cluster was covered by the glass tubing, and the remaining 10 mm of carbon fiber bunch was uncovered. At the other end, a glass-to-metal seal was made between the glass tube and Pt wire by heating the glass until molten with an oxygen-acetylene flame. In order to bridge all fine carbon fibers, the 10 mm carbon fiber cluster was immersed into the $PPO_{8,000,000}$-acetonitrile (1:10) solution and dried about 2 hours in air, then heated by an oxygen-acetylene flame (~700° C.) a few minutes.

Substrate-lead assemblages fabricated as described above were used for both electrodes. The entire 10 mm length of uncovered carbon fibers sticking out of the glass tube was used as the electrode substrate. Electrode coatings were more often applied as salt solutions but were applied as pastes when necessary, depending on the chemical compositions of the electrode active materials. For the solution deposition method, the desired weight of salt was built up by repeated immersion-baking steps; if, at any stage of deposition, the amount of salt exceeded the desired weight, the electrode assemblage was discarded and the deposition process was started over again on a new substrate-lead assemblage.

The cell was assembled as follows. The two electrode assemblages prepared as described above were joined at the bottom near the carbon-platinum contact by heating the glass tubes until softened with an oxygen-acetylene flame and affixing them along their entire lengths by joining them at the top with a metal or carbon clamp. This operation was carried out so that the two carbon fibers would be parallel to one another with a gap greater than about 0.5 mm but not exceeding 1 mm. The two electrode assemblages were placed into a 100 mm long Pyrex glass tube closed at one end with a 6 mm inner diameter so that the carbon fiber tips were about 10 mm from the bottom of the tube. An oxygen-acetylene flame was used to heat all the glass tubes until they were softened so that they would be joined along their entire lengths and the positions of the electrode tubes would be permanently fixed within the cell. This arrangement left openings at the top and conduits along the sides of the Pyrex tube leading to the bottom which were sufficiently wide so that electrolyte could be easily injected inside the cell at a later stage. Afterwards, the clamp was removed and the entire cell assemblage was annealed by heating in air from 200° C. to 500° C. at a rate of 10° C./minute, held for two hours, then slowly vacuum-cooled to room temperature. As a final step, the electrolyte was injected into the cell from a top opening, the cell was shaken until the electrolyte had settled to the bottom so that the gap between the two electrodes was completely filled with electrolyte, and all top openings were sealed with an oxygen-acetylene flame. The amount of electrolyte injected into the cell was typically about 1.0 g; the amount of electrolyte that settled between the electrodes was estimated at about 0.005–0.006 g.

Throughout the Examples, this cell type, prepared as described above, will be referred to as "Tiny Cell."

B. Parallel Plate, 4×10 mm

This cell was assembled as follows. A Pyrex glass tube with an inner diameter of 5 mm was used to house the cell. Two holes were made on opposite sides of the tube. The anode and cathode assemblages were supported on 4×10 mm substrates. Depending on their chemical compositions, the electrode active materials were applied either as salt solutions or as pastes. The electrode assemblages were carefully inserted into the tube. Care was taken to insure that the two electrodes were parallel to one another with a gap of about 1 mm. The leads on each electrode were threaded through the two holes to the outside of the glass tube. The two holes were sealed in a manner that depended on the type of metal used. For substrate-lead metals such as nickel or copper, the holes were sealed with epoxy which was allowed to set for two hours. For platinum, the holes were sealed by heating the area with an oxygen-acetylene flame until molten to form a glass-to-metal seal. One end of the glass tube was sealed at a distance of about 15 mm from the electrodes. The electrolyte was injected into the tube and as a final step, the entire cell assemblage was sealed at the top. The amount of electrolyte injected into the cell was typically about 1.0 g; the amount of electrolyte that settled between the electrodes was estimated at about 0.05–0.06 g.

Throughout the Examples, this cell type, prepared as described above, will be referred to as "Parallel Plate, 4×10 mm."

C. Parallel plate, 30×70 mm

This cell was assembled using procedures similar to those of the 4×10 mm parallel plate cell described above. A 150 mm long Pyrex glass tube with an inner diameter of 50 mm was used to house the cell. One end of the tube was sealed with an oxygen-acetylene flame, and two holes were made on opposite sides of the tube 10 mm from the sealed end. Anode and cathode assemblages were prepared from substrates with cross sectional areas of 30×70 mm. Electrode coatings were applied either from solution or as pastes. A sandwich was made by inserting between the electrodes three pieces of glass paste paper about 0.12 mm thick which served as a separator. This sandwich was covered with two glass slides, and the entire ensemble was affixed by wrapping it tightly with a glass fiber. The glass paste paper and glass slide parts were all cut to the same cross sectional area as the electrodes (i.e., 30×70 mm).

The electrode sandwich was carefully inserted into the glass tube cell housing and the nickel leads on each electrode were threaded through the two holes to the outside. The cell was placed in a horizontal position such that one hole was on top and the other was on the bottom. In this horizontal position, the sandwich was placed as close to the bottom as possible, taking care that is was parallel to the tube side walls. The cell was annealed by heating it slowly in a nitrogen atmosphere from 50° C. to 450° C., holding it for five hours, then cooling it slowly to room temperature. The two holes were sealed with epoxy which was allowed to set for two hours. About 25 g of electrolyte was carefully injected into the tube from the open end, taking care to keep the neck of the tube as clean and unclogged as possible. As a final step, the glass tube cell housing was trimmed down to about 100 mm, and the entire cell assemblage was sealed at the open end an oxygen-acetylene flame. The cell was kept in a horizontal position so that the entire space between the electrodes inside the sandwich would always be filled with electrolyte.

Throughout the Examples, this cell type, prepared as described above, will be referred to as "Parallel Plate, 30×70 mm."

D. Jelly-roll (carbon-on-nickel substrate, 50×70 mm, Type IV)

For this test cell, the electrodes were typically supported on carbon-on-nickel substrates, 50×70 mm, Type IV. However, carbon-on-nickel Type IV substrates of other sizes, e.g., 40×50 mm, were used occasionally; these substrates were prepared in a manner very similar to that of the carbon-on-nickel substrates, 50×70 mm, Type IV. Depending on their chemical compositions, the electrode active materials were applied either as salt solutions or as pastes.

The cell was assembled as follows. An anode-separator-cathode-separator sandwich was made from the anode and cathode assemblages by inserting two pieces of glass paste paper between the electrodes and stacking two more pieces of glass paste paper on top of the cathode. The glass paste paper separators were all cut from glass paste paper about 0.12 mm thick to the same cross sectional area as the electrodes. The anode and cathode assemblages were arranged in the sandwich so that the two sets of five lead wires (i.e., one set on each electrode) were at opposite ends.

A glass tube 75 mm in length with inner and outer diameters of 2 mm and 6 mm, respectively, was used as the center rod for winding the sandwich into a jelly-roll; this tube was also used as a conduit or feed-through for the five cathode lead wires. The glass tube was affixed along one of the 70 mm edges of the sandwich on the separator side with one end flush with the sandwich edge perpendicular to the cathode lead wires. This operation was carried out by twist-tightening the tube to the sandwich edge with glass fibers along its length and feeding the corner cathode lead wire through the tube. As the sandwich was wound tightly around the glass tube, the remaining cathode lead wires were fed one-by-one through the tube; this operation served to affix the sandwich more securely to the tube and also enabled the cathode lead wires to be fed safely to the top of the rolled cell without any electrical contact with the anode. After the rolling operation was complete, the cathode lead wires were twisted together. The anode wires, which were spread around the top rim of the cell, were gathered and also twisted together.

The cell housing consisted of a Pyrex glass test tube with an inner diameter of about 13–16 mm, depending on the thickness of the rolled electrode assemblage. Two holes were made on opposite sides of the tube. The electrode assemblage (jelly-roll) prepared as described above was carefully inserted into the tube, and the anode and cathode leads were fed through the holes. The cell was annealed by heating it slowly in a nitrogen atmosphere from 50° C. to 500° C. and holding it for 5 hours. The cell was cooled to room temperature and the holes were sealed with epoxy in a dry box. About 10–20 g of electrolyte was injected into the tube which was then sealed off at the top with an oxygen-acetylene flame.

Throughout the Examples, this cell type, prepared as described above, will be referred to as "Jelly-roll."

The present invention is illustrated in more detail by reference to the following Examples, which should not be considered to be limiting the scope of the invention. For brevity and convenience, reference will be made in these Examples as appropriate to the common materials and procedures given above. In each Example, the electrodes are referred to herein as the anode and cathode for which are defined, respectively, as the negative and positive electrodes during cell discharging. Also, all chemical compositions are by mole percent or mole fraction unless indicated otherwise.

EXAMPLE #1

For the cells of this Example, the anode consists of a salt mixture, $xLiCl+(1-x)CaCl_2$, where $0.2<x<0.5$. the cathode consists of a salt mixture, $xLiCl+(1-x)CaCl_2$, where $0.5<x<0.9$. The electrodes are supported on substrates of either carbon or copper; the carbon substrates may either stand alone or may be reinforced with a metal such as nickel or platinum. The electrolyte solvent may consist of any composition within the room temperature liquid phase region of the $AlCl_3$-$PCl_5$-$PCl_3$ ternary. For example, the solvent may consist of $AlCl_3$ and $PCl_5$ in a 1:1 molar ratio, with $PCl_3$ present at saturation. To impart a high $Li^+$ ionic conductivity to the electrolyte, $LiAlCl_4$ is added at a concentration of about 10 m %. The solubility of $LiAlCl_4$ in the $AlCl_3$-$PCl_5$-$PCl_3$ ternary is higher than 20 m % over most of the composition range within which a single liquid phase is formed at room temperature, but generally, a maximum in conductivity as a function of $LiAlCl_4$ content is reached at less than 10 m %.

FIG. 1 shows the ionic conductivity vs. reciprocal temperature from −20° C. to 120° C. of 2 $AlCl_3$-$PCl_5$ with LiCl additions of 0, 10, and 20 m %. The conductivity data shown in FIG. 1 are generally representative of molten salt electrolytes within the $AlCl_3$-$PCl_5$-$PCl_3$ ternary. For all three compositions shown, additions of $PCl_3$ results in a stabilized liquid structure and a significant increase in the multiple ionic conductivity, especially for the 2 $AlCl_3$-$PCl_5$-0.2 LiCl electrolyte shown in FIG. 1, result in an increase in the conductivity at 25° C. from $\sim 10^3$ $(\Omega\text{-cm})^{-1}$ to $\sim 10^{-2}$ $(\Omega\text{-cm})^{-1}$.

The fabrication procedures and performance characteristics of five representative cells (denoted A through E) using this family of cell component materials are given below.

A. Anode (0.020 g): 0.2 LiCl-0.8 $CaCl_2$
   Cathode (0.021 g): 0.9 LiDl-0.1 $CaCl_2$
   Substrate: Carbon-on-nickel
   Electrolyte (in excess): $AlCl_3$-$PCl_5$-0.3 $PCl_3$-0.1 $LiAlCl_4$
   Size: 4×10 mm For this cell, carbon-on-nickel substrates, 4×10 mm, Type I (wound carbon fibers) were used for both electrodes. The materials and preparation procedures for this substrate design are described above in Part A of Section III (Electrode Substrate Preparations).

An electrode of the type, 0.2 LiCl-0.8 $CaCl_2$, 4×10 mm, carbon-on-nickel, prepared by a solution depositing technique, constituted the anode for this cell. The materials and preparation procedures for this electrode are described above in detail in Part A(i) of Section IV (Electrode Coating Preparations).

A cathode consisting of a 0.9 LiCl-0.1 CaCl$_2$ salt mixture on a carbon-on-nickel substrate was prepared using a solution deposition technique as described above in Part A of Section IV (Electrode Coating Preparations). The starting solution was prepared by dissolving 11.3 g LiCl and 3.3 g CaCl$_2$ in 40 ml water. The baking procedure performed between immersions and the final baking and annealing steps were the same as those for the anode of this cell, i.e., as given in Part A(i) of Section IV (Electrode Coating Preparations). The final weight of the salt mixture on the cathode substrate was about 0.021 g.

An electrolyte with the nominal composition given above was prepared by dissolving 1.75 g LiAlCl$_4$ into 38 g AlCl$_3$-PCl$_5$-0.3 PCl$_3$ solvent and heating this mixture to 80° C. until it had homogenized. The starting LiAlCl$_4$ salt was prepared as described above in Section I (Starting Materials Preparations). The starting AlCl$_3$-PCl$_5$-0.3 PCl$_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.5 V across the cell in series with an adjustable resistor which was initially set to 2.5 kΩ so that the charging current was limited 2.0 mA. As charging progressed, this resistor was manually lowered step by step to keep the charging current at about 2.0 mA until it had reached a value of about 300 Ω. The charging process was continued thereafter until the charging current had dropped to 0.05 mA. The total charging time from start to finish was about 4.5 hours.

The open circuit voltage after charging was 3.6 V, and the maximum short cut discharging current was around 60 mA. The cell was discharged through an adjustable resistor which was set to 3.5 kΩ so that the initial discharging current was 1.0 mA. After about 7.2 hours, the cell output voltage had dropped to 0.5 V.

B. Anode (0.02 g): 0.2 LiCl-0.8 CaCl$_2$
   Cathode (0.02 g): 0.9 LiCl-0.1 CaCl$_2$
   Substrate: Carbon-on-nickel
   Electrolyte (in excess): AlCl$_3$-PCl$_5$-0.3 PCl$_3$-0.1 LiAlCl$_4$
   Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

The fabrication procedures and materials for this cell were otherwise the same as those of Cell A of this Example.

This cell was charged in constant-voltage mode by applying a voltage of 4.5 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 300 Ω. The charging process was continued thereafter until the charging current had dropped to 0.05 mA. The total charging time from start to finish was about 4.7 hours.

The open circuit voltage after charging was 3.6 V, and the maximum short cut discharging current was 65 mA. The cell was discharged through an adjustable resistor which was set to 3.5 kΩ so that the initial discharging current was 1.0 mA. After about 7.5 hours, the cell output voltage had dropped to 0.5 V.

C. Anode (0.01 g): 0.2 LiCl-0.8 CaCl$_2$
   Cathode (0.012 g): 0.9 LiCl-0.1 CaCl$_2$
   Substrate: Carbon-on-Nickel (anode); Copper (cathode)
   Electrolyte (in excess): AlCl$_3$-PCl$_5$-0.3 PCl$_3$-0.1 LiAlCl$_4$
   Size: 4×10 mm The cell component materials for this cell were the same as those of Cell A of this Example except that copper foil was substituted for carbon-on-nickel as the substrate material for the cathode. The electrode coatings were prepared using a solution deposition technique as described above in Part A of Section IV (Electrode Coating Preparations). The starting solutions were the same as those of Cell A. Great care had to be taken to insure that the copper foil substrates did not oxidize during the electrode coating procedures. In this connection, one of the precautions that had to be taken was that all baking steps were carried out very slowly. For this cell, the baking procedure for the Cell A electrode salt coatings performed between immersions, i.e., as given in Part A(i) of Section IV (Electrode Coating Preparations), was modified such that the electrode assemblages were heated in air at a rate of 2° C./minute rather than 5° C./minute. Also, the assemblages were held at 250° C. for five hours rather than at 200° C. for two hours. Afterwards, the assemblages were transferred to a vacuum oven set to 200° C. and held for 10 hours. Once the coatings were built up to the desired weights, the assemblages were transferred to sealed Pyrex glass tubes and given the same final heat treatment as given in Part A(i) of Section IV (Electrode Coating Preparations).

This cell was charged in constant-voltage mode by applying a voltage of 4.2 V across the cell in series with an adjustable resistor which was initially set to 2.4 kΩ so that the charging current was limited 2.0 mA. As charging progressed this resistor was manually lowered step by step to keep the charging current at about 2.0 mA until it had reached a value of about 300 Ω. The charging process was continued thereafter until the charging current had dropped to 0.05 mA. The total charging time from start to finish was about 2.5 hours.

The open circuit voltage after charging was 2.7 V, and the maximum short cut discharging current was 70 mA. The cell was discharged through an adjustable resistor which was set to 2.2 kΩ so that the initial discharging current was 1.0 mA. After about 4.5 hours, the cell output voltage had dropped to 0.5 V.

D. Anode (0.002 g): 0.2 LiCl-0.8 CaCl$_2$
   Cathode (0.002 g): 0.8 LiCl-0.2 CaCl$_2$
   Substrate: Carbon
   Electrolyte (in excess): AlCl$_3$-PCl$_5$-0.3 PCl$_3$-0.1 LiAlCl$_4$
   Size: 1.2×10 mm For this cell, the Tiny Cell design was used which is described above in Part A of Section V (Cell Assembly). The materials and preparation procedures for the carbon fiber substrate-lead assemblages used in this test cell design are also given therein.

Electrode active material salt mixtures with the nominal compositions given above were deposited on the carbon fiber cluster substrates from solution as described above in Part A of Section III (Electrode Substrate Preparations). About 0.002 g of the respective salt mixtures were deposited on each electrode substrate. For the anode, a solution of 8.9 g $CaCl_2$ and 0.85 g LiCl in 30 ml water was used as the starting solution. For the cathode, a solution of 2.4 g $CaCl_2$ and 3.3 g LiCl in 30 ml water was used. For both electrodes, the baking procedure performed between immersions and the final baking and annealing steps were the same as those described for the electrode type 0.2 LiCl-0.8 $CaCl_2$, 4×10 mm, carbon-on-nickel, given in Part A(i) of Section IV (Electrode Coating Preparations).

The electrolyte was prepared by dissolving 1.75 g $LiAlCl_4$ into 38 g $AlCl_3$-$PCl_5$-0.3 $PCl_3$ solvent and heating this mixture to 80° C. until it had homogenized. The starting $AlCl_3$-$PCl_5$-0.3 $PCl_3$ solvent was prepared as described above in Part B(i) of Section II (Electrolyte Preparations).

This cell was charged in constant-voltage mode by applying a voltage of 4.5 V across the cell in series with an adjustable resistor which was initially set to 7.9 kΩ so that the charging current was limited 0.5 mA. As charging progressed, this resistor was manually lowered step by step to keep the charging current at about 0.5 mA until it had reached a value of about 1 kΩ. The charging process was continued thereafter until the charging current had dropped to 0.01 mA. The total charging time from start to finish was about 2.0 hours.

The open circuit voltage after charging was 3.6 V, and the maximum short cut discharging current was 0.8 mA. The cell was discharged through an adjustable resistor which was set to 12.5 kΩ so that the initial discharging current was 0.25 mA. After about 3.6 hours, the cell output voltage had dropped to 0.5 V.

E. Anode (0.07 g): 0.2 LiCl-0.8 $CaCl_2$
Cathode (0.010 g): 0.8 LiDl-0.2 $CaCl_2$
Substrate: Carbon-on-platinum
Electrolyte (in excess): $AlCl_3$-$PCl_5$-0.3 $PCl_3$-0.1 $LiAlCl_4$
Size: 2×7 mm For this cell, a substrate-lead assemblage was constructed for each electrode as follows. A 50 mm long Pt wire 0.5 mm in diameter was used for both the lead to the external circuit and the reinforcement for the electrode substrate. A Pt foil rectangle was formed at one end of the wire by flattening it to an area about 7 mm long and 2 mm wide, with the remaining Pt wire centered on one of the 2 mm wide edges. A carbon substrate was formed on one side of this Pt rectangle by applying about 0.002 g carbon-Teflon-water paste which was prepared according to the procedure given above in Part C of Section III (Electrode Substrate Preparations) for the carbon-on-nickel substrate, 4×10 mm, Type II (carbon-Teflon paste). The remaining substrate fabrication procedures are also given therein.

Substrate-lead assemblages fabricated as described above were used for both electrodes. Electrode active material salt mixtures with the nominal compositions given above were deposited from solution as described above in Part A of Section III (Electrode Substrate Preparations). About 0.02 g salt were deposited on each electrode substrate. For the anode, a solution of 8.9 g $CaCl_2$ and 0.85 g LiCl in 10 ml water was used as the starting solution. For the cathode, a solution of 2.4 g $CaCl_2$ and 3.3 g LiCl in 10 ml water was used. For both electrodes, the baking procedure used between immersions and the final baking and annealing steps were the same as those used for the preparation of the electrode type 0.2 LiCl-0.8 $CaCl_2$, 4×10 mm, carbon-on-nickel, given in Part A(i) of Section IV (Electrode Coating Preparations).

The electrolyte was prepared by dissolving 1.75 g $LiAlCl_4$ into 38 g $AlCl_3$-$PCl_5$-0.3 $PCl_3$ solvent and heating this mixture to 80° C. until it had homogenized. The $AlCl_3$-$PCl_5$-0.3 $PCl_3$ solvent was prepared as described above in Part B(i) of Section II (Electrolyte Preparations).

The cell was assembled as follows. The two electrode assemblages prepared as described above were placed into a 100 mm long Pyrex glass tube closed at one end with a 6 mm inner diameter so that the electrode bottom edges were about 10 mm from the bottom of the tube. The Pt wire leads were bent so that the two electrodes would be parallel to one another with a gap greater than about 0.5 mm but not exceeding 1 mm. The positions of the Pt wire leads and electrodes within the Pyrex glass tube housing were temporarily affixed by clamping the Pt wires to the Pyrex tube rim. Glass-to-metal seals were formed between the Pt wires and Pyrex glass tube rim by heating the glass with an oxygen-acetylene flame until the glass near the Pt wires became molten. As a final step, about 1.0 g electrolyte was poured into the cell from the top, the cell was shaken until the electrolyte had settled to the bottom, and the gap between the two electrodes was completely filled with electrolyte, and the top was sealed around the rim with a fitted cover glass and an oxygen-acetylene flame. The amount of electrolyte between the electrodes was estimated at about 0.03 g.

This cell was charged in constant-voltage mode by applying a voltage of 4.5 V across the cell in series with an adjustable resistor which was initially set to 4.0 kΩ so that the charging current was 1.0 mA. As charging progressed, this resistor was manually lowered step by step to keep the charging current at about 1.0 mA until it had reached a value of about 500 Ω. The charging process was continued thereafter until the charging current had dropped to 0.05 mA. The total charging time from start to finish was about 4.5 hours.

The open circuit voltage after charging was 3.60 V, and the maximum short cut discharging current was 75 mA. The cell was discharged through an adjustable resistor which was set to 6.1 kΩ so that the initial discharging current was 0.5 mA. After about 7.8 hours, the cell output voltage had dropped to 0.5 V.

EXAMPLE #2

For the cells of this Example, the anode consists of a salt mixture, $xLiCl+(1-x)CaCl_2$, where $0.2<x<0.5$. The cathode consists of a salt mixture, $xLiF+(1-x)CaCl_2$, where $0.5<x<0.8$. Both electrodes are supported on carbon substrates reinforced with nickel metal. The electrolyte solvent consist of a 1:1 mixture of $AlCl_3$ and $PCl_5$ in which $PCl_3$ is present at saturation; this liquid has the nominal composition, $AlCl_3$-$PCl_5$-0.3 $PCl_3$. To impart a high $Li^+$ ionic conductivity to the electrolyte, $LiAlCl_4$ is added at a concentration of about 10 m %, and LiF is also added at a concentration of about 1 m %. The fabrication procedures and performance characteristics of two representative cells (denoted A and B) using this family of cell component materials are given below.

A. Anode (0.02 g): 0.2 LiCl-0.8 $CaCl_2$
Cathode (0.035 g): 0.6 LiF-0.4 $CaCl_2$
Substrate: Carbon-on-nickel
Electrolyte (in excess): $AlCl_3$-$PCl_3$-0.3 $PCl_3$-0.1 $LiAlCl_4$-0.01 LiF
Size: 4×10 mm For this cell, carbon-on-nickel substrates, 4×10 mm, Type I (wound carbon fibers) were used for both electrodes. The materials and preparation procedures for this substrate design are described above in Part A of Section III (Electrode Substrate Preparations).

An electrode of the type, 0.2 LiCl-0.8 $CaCl_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

The cathode was prepared by coating a carbon-on-nickel substrate with a paste containing a 0.6 LiF-0.4 CaCl$_2$ salt mixture using the technique described above in Part B of Section IV (Electrode Coating Preparations). The paste was prepared as follows. First, 1.6 g LiF and 4.8 g CaCl$_2$ were combined in a quartz tube and the mixture was heated in a furnace to 700° C. for about 5 hours. After the mixture had cooled to room temperature, it was transferred to a dry box and crushed with a mortar and pestle to a fine powder. A paste was made with this powder by adding 0.1 g of the acetonitrile-01 PPO$_{8,000,000}$ binder; the preparation of this binder is described in Part B of Section IV (Electrode Coating Preparations). About 0.017–0.018 g of paste was evenly applied to each side of the substrate which was then squeezed between a glass roller and a glass plate. The assemblage was placed into a large Pyrex glass tube, heated to 180° C. in air, and held for two hours. The tube containing the assemblage was then cooled to room temperature, vacuum-sealed, reheated to 600° C., and held for two hours.

An electrolyte with the nominal composition given above was prepared by dissolving 1.75 g LiAlCl$_4$ and 0.26 g LiF into 38 g AlCl$_3$-PCl$_5$-0.3 PCl$_3$ solvent was prepared as described above in Part B(i) of Section II (Electrolyte Preparations). When LiF is added to AlCl$_3$-PCl$_5$-PCl$_3$-PCl$_3$-LiAlCl$_4$ electrolytes, they develop a gelatinous texture after about 10 hours. Therefore, only those AlCl$_3$-PCl$_5$-PCl$_3$-LiAlCl$_4$-LiF electrolytes that are newly-made can be used during cell assembly.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.5 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 300 Ω. The charging process was continued thereafter until the charging current had dropped to 0.05 mA. The total charging time from start to finish was about 4.1 hours.

The open circuit voltage after charging was 3.6 V, and the maximum short cut discharging current was 55 mA. The cell was discharged through an adjustable resistor which was set to 3.05 kΩ so that the initial discharging current was 1.0 mA. After about 6.5 hours, the cell output voltage had dropped to 0.5 V.

B. Anode (0.02 g): 0.2 LiCl-0.8 CaCl$_2$
Cathode (0.05 g): 0.5 LiF-0.5 CaCl$_2$
Substrate: Carbon-on-nickel
Electrolyte (in excess): AlCl$_3$-PCl$_5$-0.3 PCl$_3$-0.1 LiAlCl$_4$-0.01 LiF
Size: 4×10 mm This cell was prepared from start to finish in exactly the same manner as Cell A of this Example except that for the cathode, the starting materials consisted of 1.3 g LiF and 5.6 g CaCl$_2$ rather than 1.6 g LiF and 4.8 g CaCl$_2$, and 0.025 g of paste was applied to each side of the substrate rather than 0.018 g.

This cell was charged in constant-voltage mode by applying a voltage of 4.4 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 300 Ω. The charging process was continued thereafter until the charging current had dropped to 0.05 mA. The total charging time from start to finish was about 3.4 hours.

The open circuit voltage after charging was 3.50 V, and the maximum short cut discharging current was 60 mA. The cell was discharged through an adjustable resistor which was set to 3.1 kΩ so that the initial discharging current was 1.0 mA. After about 6.2 hours, the cell output voltage had dropped to 0.5 V.

EXAMPLE #3

For the cells of this Example, the anode consists of a salt mixture, xLiCl+(1−x)CaCl$_2$, where 0.2<x<0.5. The cathode consists of a salt mixture, xLiBr+(1−x)CaCl$_2$, where 0.5<x<0.9. Both electrodes are supported on carbon substrates reinforced with nickel metal. The electrolyte solvent may consist of any composition within the room temperature liquid phase region of the AlCl$_3$-PCl$_5$-PCl$_3$ ternary. To impart a high Li$^+$ ionic conductivity to the electrolyte, LiAlCl$_4$ is added at a concentration of about 10 m %. The fabrication procedures and performance characteristics of one representative cell (denoted A) using this family of cell component materials are given below.

A. Anode (0.02 g): 0.2 LiCl-0.8 CaCl$_2$
Cathode (0.035 g): 0.9 LiBr-0.1 CaCl$_2$
Substrate: Carbon-on-nickel
Electrolyte (in excess): AlCl$_3$-PCl$_5$-0.3 PCl$_3$-0.1 LiAlCl$_4$
Size: 4×10 mm For this cell, carbon-on-nickel substrates, 4×10 mm, Type I (wound carbon fibers) were used for both electrodes. The materials and preparation procedures for this substrate design are described above in Part A of Section III (Electrode Substrate Preparations).

An electrode of the type, 0.2 LiCl-0.8 CaCl$_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

A cathode consisting of 0.9 LiBr-0.1 CaCl$_2$ was prepared using a solution deposition technique as described above in Part A of Section IV (Electrode Coating Preparations). The total amount of salt deposited on the cathode substrate was 0.035 g. The starting solution consisted of 3.6 g of LiBr and 1.1 g of CaCl$_2$ dissolved in 50 ml water. The baking procedure performed between immersions and the final baking and annealing steps were the same as those used for the anode, i.e., as given in Part A(i) of Section IV (Electrode Coating Preparations).

The electrolyte was prepared by dissolving 1.75 g LiAlCl$_4$ into 38 g AlCl$_3$-PCl$_5$-0.3 PCl$_3$ solvent and heating this mixture to 80° C. until it had homogenized. The starting AlCl$_3$-PCl$_5$-0.3 PCl$_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charge din constant-voltage mode by applying a voltage of 4.0 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.05 mA. The total charging time from start to finish was about 4.5 hours.

The open circuit voltage after charging was 3.30 V, and the maximum short cut discharging current was 40 mA. The cell was discharged through an adjustable resistor which was set to 2.4 kΩ so that the initial discharging current was 1.0 mA. After about 6.4 hours, the cell output voltage had dropped to 0.5 V.

EXAMPLE #4

For the cells of this Example, the anode consists of a salt mixture, $xLiCl+(1-x)CaCl_2$, where $0.2<x<0.95$. The cathode consists of a salt mixture, $xLiCl+(1-x)CaCl_2$, where $0.5<x<0.95$. Both electrodes are supported on carbon substrates reinforced with either nickel or platinum. The electrolyte consists of either (1) $xLiAlCl_4+(1-x)$ $SOCl_2$ or (2) $xLiAlCl_4+(1-x)SO_2Cl_2$ where for both electrolytes, x may range from about 0.02 to 1.5. The fabrication procedures and performance characteristics of eight representative cells (denoted A through H) using this family of cell component materials are given below.

A. Anode (0.0025 g): 0.2 LiCl-0.8 $CaCl_2$
   Cathode (0.0025 g): 0.9 LiCl-0.1 $CaCl_2$
   Substrate: Carbon-on-platinum
   Electrolyte (0.004 g): $SOCl_2$-0.035 $LiAlCl_4$
   Size: 2×6 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with the following modifications: i) the substrate size was 2×6 mm rather than 4×10 mm, ii) the supporting metal was platinum foil rather than nickel net, ii) the Pt wire lead was spot welded to the center of one 2 mm edge and iv) the total amount of carbon-Teflon past applied to the nickel net was about 0.05 g rather than 0.01 g.

The anode and cathode coatings were deposited from aqueous solutions using the technique described above in Part A of Section IV (Electrode Coating Preparations). For this cell, about 0.0025 g of salt was deposited on each electrode due to the smaller substrate size. For the anode, a solution of 8.9 g $CaCl_2$ and 0.85 g LiDl in 30 ml water was used as the starting solution. For the cathode, a solution of 3.3 g $CaCl_2$ and 11.3 g LiCl in 40 ml water was used. The baking and annealing procedures used for the fabrication of the electrodes of this cell were the same as those used for the electrode type 0.2 LiCl-0.8 $CaCl_2$, 4×10 mm, carbon-on-nickel, given in Part A(i) of Section IV (Electrode Coating Preparations).

The electrolyte was prepared by dissolving 6.2 g $LiAlCl_4$ in 120 g $SOCl_2$.

A cell was assembled from the above-described cell component materials using a parallel plate design, i.e., Parallel Plate, 4×10 mm. The materials and preparation procedures for this test cell design are described in Part B of Section V (Cell Assembly). In this case, however, the smaller 2×6 mm electrode assemblages prepared as described above were used in place of the usual 4×10 mm assemblages.

This cell was charged by a computer program in constant-voltage mode. A voltage of about 4.9 V was applied across the cell in series with a fixed resistor of 2.1 kΩ and charging was carried out until the charging current had dropped to about 0.01 mA. The total charging time was about 2.0 hours. The open circuit voltage after charging was 3.85 V, and the short cut discharging current was about 15 mA.

The cell was discharged in constant-current mode at a rate of 0.1 mA for about 6.0 hours at which point, the cell output voltage had dropped to below about 1.0 V.

Figure 2:
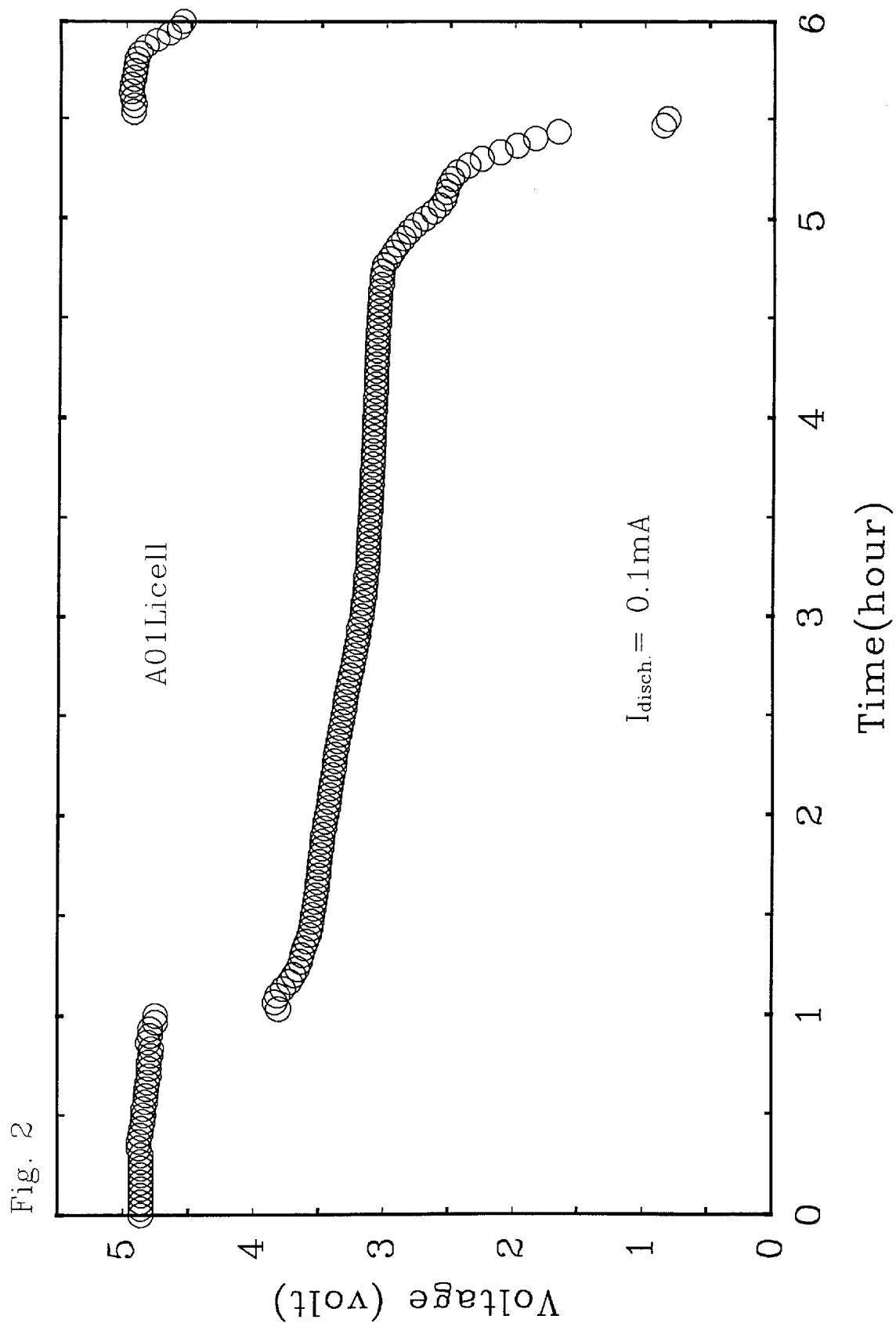
FIG. 2 is a plot of the charging-discharging curve for Cell A of Example #4.

FIG. 2 shows the charging-discharging curve for this cell. The discharging Coulombic capacity of the cell was determined from the current, time, and weight of the total working electrode active material, i.e., (0.1 mA)(6.0 h)/(0.00125 g)=240 mAh/g, where 0.00125 g is the amount of working electrode active material on each electrode. The discharging Coulombic capacity for each electrode was determined from the current, time, and weight of the total working active material, i.e., (0.1 mA)(6.0 h/(0.00125 g)=480 mAh/g.

B. Anode (0.048 g): 0.2 LiCl-0.8 $CaCl_2$
   Cathode (0.048 g): 0.9 LiCl-0.1 $CaCl_2$
   Substrate: Carbon-on-nickel
   Electrolyte (0.1 g): $SO_2Cl_2$-0.035 $LiAlCl_4$
   Size: 6×20 mm For this cell, the carbon-on-nickel substrates were prepared from start to finish using the same materials and procedures as those of the carbon-on-nickel substrate, 4×10 mm, Type I (wound carbon fibers) described above in Part A of Section III (Electrode Substrate Preparations) with the following modifications: i) the substrate size was 6×20 mm rather than 4×10 mm and ii) the total weight of carbon fibers wound around the nickel net was about 0.025 g rather than 0.01 g.

The electrode coatings were deposited from aqueous solutions using the technique described above in Part A of Section IV (Electrode Coating Preparations). For this cell, about 0.048 g of salt was deposited on each electrode due to the larger substrate size. The starting solution for the anode consisted of 2.52 g LiCl and 26.6 g $CaCl_2$ in 50 ml water. The starting solution for the cathode consisted of 11.3 g LiCl and 3.3 g $CaCl_2$ in 40 ml water. For both electrodes, the baking procedure performed between immersions and the final baking and annealing steps were the same as those described for the electrode type 0.2LiCl-0.8$CaCl_2$, 4×10 mm, carbon-on-nickel, given in Part A(i) of Section IV (Electrode Coating Preparations).

The electrolyte was prepared by dissolving 6.2 g $LiAlCl_4$ in 136 g $SO_2Cl_2$.

A cell was assembled from the above-described cell component materials using the same materials and procedures as those of the Parallel Plate, 4×10 mm, design given in Part B of Section V (Cell Assembly), except two glass paste papers (0.6 mm thick) were inserted between the two electrodes. One modification: a Pyrex tube with an inner diameter of 10 mm rather than 5 mm was used to house the cell due to the larger substrate width (i.e., 6 mm). The working electrolyte between two electrodes were estimated a about 0.1 g.

This cell was charged by a DC power source in constant-current mode at 5.0 mA. The charging voltage started at 1.2 V and increased to 4.0 V after about 30 minutes. The charging process was continued until the charging voltage reached its upper limit of 4.8 V, which was a gradual process. At that point, a constant current could not be maintained and the charging process was stopped after about 4.0 hours when the charging current had dropped to about 0.05 mA. The open circuit voltage after charging was 3.85 V, and the maximum short cut discharging current was 150 mA.

The cell was discharged through an adjustable resistor with a resistance of about 1 kΩ for a discharging current value of 3 mA. The discharging process was continued for about 4.2 hours at which point, the cell output voltage had dropped to 1.0 V with an output current of 1.0 mA. At that point, the cell open circuit voltage was measured at about 2.9 V with a short cut current of about 25 mA.

Figure 3A:
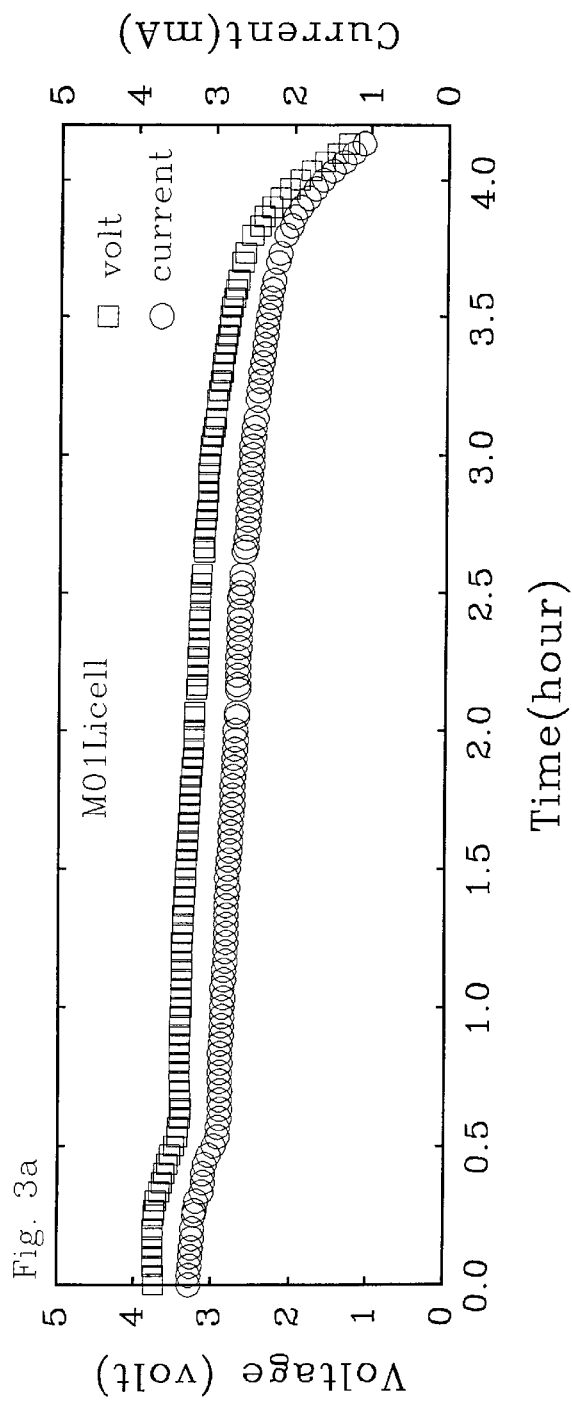
FIG. 3a shows the cell voltage and current versus time during discharging for Cell B of Example #4.
Figure 3B:
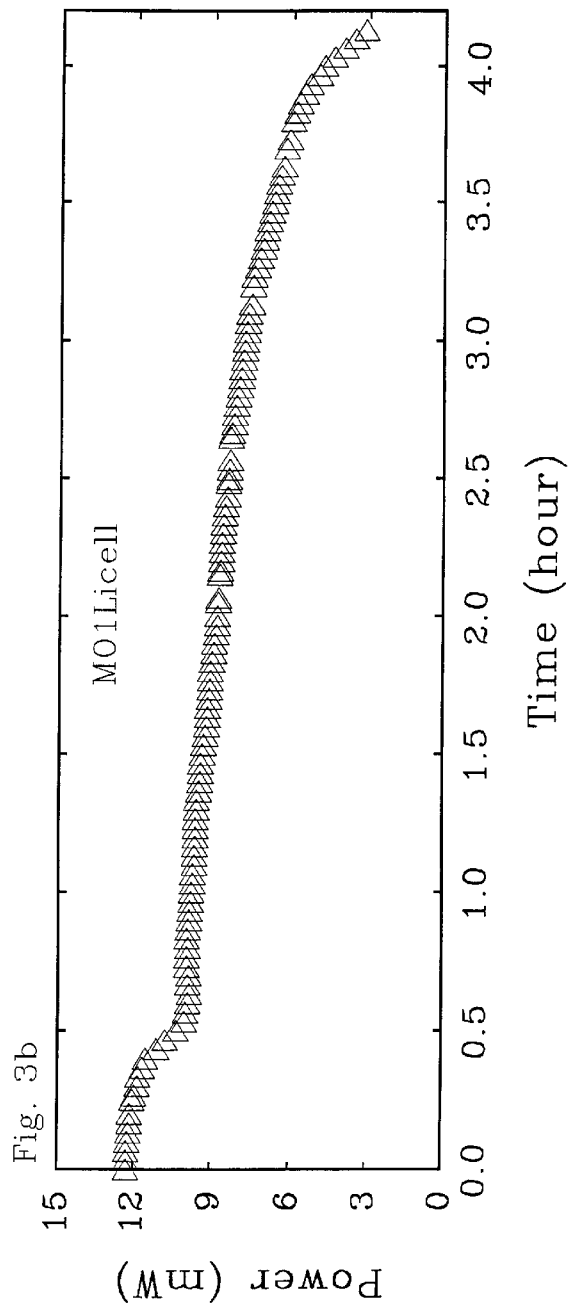
FIG. 3b shows the cell output power versus time during discharging for the same cell.

FIG. 3a shows the cell voltage and current versus time during discharging. FIG. 3b shows the cell output power versus time during discharging. The discharging Coulombic capacity of the cell was determined from the current, time, and weight of the total working electrode active material, i.e., (3 mA)(4.2 h)/(0.024 g+0.024 g)=263 mAh/g, where 0.024 g is the amount of working electrode active material on each electrode. The cathode discharging Coulombic capacity was determined from the current, time, and weight of the total working cathode active material, i.e., (3 mA)(4.2 h)/(0.024 g)=525 mAh/g.

C. Anode (0.02 g): 0.95LiCl-0.05CaCl$_2$
   Cathode (0.02 g): 0.95LiCl-0.05CaCl$_2$
   Substrate: Carbon-on-nickel
   Electrolyte (in excess) SOCl$_2$-0.035LiAlCl$_4$
   Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

electrode coatings consisting of a salt mixture of 0.95LiCl-0.05CaCl$_2$ were deposited from aqueous solutions on both electrode substrates using the technique described above in Part A of Section IV (Electrode Coating Preparations). For both electrodes, a starting solution was prepared by dissolving 4.0 g LiCl and 0.55 g CaCl$_2$ in 30 ml water. The baking procedure performed between immersions and the final baking and annealing steps were the same as those described for the electrode type 0.2LiCl-0.8CaCl$_2$, 4×10 mm, carbon-on-nickel, given in Part A(i) of Section IV (Electrode Coating Preparations). The final weight of deposited salt on each electrode substrate was 0.02 g.

The electrolyte was prepared by dissolving 6.2 g LiAlCl$_4$ in 120 g SOCl$_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.8 V across the cell in series with an adjustable resistor which was initially set to 2.8 kΩ so that the charging current was 2.5 mA. As charging progressed, this resistor was manually lowered step by step to keep the charging current at about 2.5 mA until it had reached a value of about 500Ω. The charging process was continued thereafter until the charging current had dropped to 0.03 mA. The total charging time from start to finish was about 2.4 hours.

The open circuit voltage after charging was 3.8 V, and the maximum short cut discharging current was 75 mA. The cell was discharged through an adjustable resistor which was set to 3.2 kΩ so that the initial discharging current was 1.0 mA. After about 5.5 hours, the cell output voltage had dropped to 0.5 V.

D. Anode (0.02 g): 0.95LiCl-0.05CaCl$_2$
   Cathode (0.018 g): 0.95LiCl-0.05CaCl$_2$
   Substrate: Carbon-on-nickel
   Electrolyte (exceed): SO$_2$Cl$_2$-0.035LiAlCl$_4$
   Size: 4×10 mm For this cell, carbon-on-nickel substrates, 4×10 mm, Type I (wound carbon fibers) were used for both electrodes. The materials and preparation procedures for this substrate design are described above in Part A of Section III (Electrode Substrate Preparations).

Electrode coatings consisting of a salt mixture of 0.95LiCl-0.05CaCl$_2$ were deposited from aqueous solutions on both electrode substrates using the technique described above in part A of Section IV (Electrode Coating Preparations). For both electrodes, a starting solution was prepared by dissolving 4.0 g LiCl and 0.55 g CaCl$_2$ in 50 ml water. The baking procedure performed between immersions and the final baking and annealing steps were the same as those described for the electrode type 0.2LiCl-0.8CaCl$_2$, 4×10 mm, carbon-on-nickel, given in Part A(i) of Section IV (Electrode Coating Preparations). The final weights of deposited salts on the anode and cathode substrates were about 0.02 g and 0.018 g, respectively.

The electrolyte was prepared by dissolving 6.2 g LiAlCl$_4$ in 136 g SO$_2$Cl$_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.8 V across the cell in series with an adjustable resistor which was initially set to 2.4 kΩ so that the charging current was 2.5 mA. As charging progressed, this resistor was manually lowered step by step to keep the charging current about 2.5 mA until it had reached a value of about 500Ω. The charging process was continued thereafter until the charging current had dropped to 0.03 mA. The total charging time from start to finish was about 2.5 hours.

The open circuit voltage after charging was 3.9 V, and the maximum short cut discharging current was 70 mA. The cell was discharged through an adjustable resistor which was set to 3.3 kΩ so that the initial discharging current was 1.0 mA. After about 5.5 hours, the cell output voltage had dropped to 0.5 V.

E. Anode (1.55 g): 0.5LiCl-0.5CaCl$_2$
   Cathode (1.56 g): 0.95LiCl-0.05CaCl$_2$
   Substrate: Carbon-on-nickel
   Electrolyte (in excess): SOCl$_2$-0.05LiAlCl$_4$
   Size: 40×70 mm A parallel plate cell with electrode cross sectional areas of about 28 cm$^2$ was prepared with anode and cathode active materials consisting, respectively, of 0.5LiCl-0.5CaCl$_2$ and 0.95LiCl-0.05CaCl$_2$ salt mixtures, each electrode salt mixture supported on carbon-on-nickel substrates.

The carbon-on-nickel substrates were prepared as follows. 70×70 mm squares of carbon fabric (0.13 g/cm$^2$, Zoltek, Inc., Panex®30 fabric Pw03) were cleaned by soaking them in concentrated H$_2$SO$_4$ for about 10 hours and rinsing them thoroughly with water. These carbon fabric squares were treated further by heating them with a propane flame to around 1200° C.; this treatment served to drive off impurities and also smoothed the surfaces of the carbon fabric by burning off all the tiny fibers sticking out of the surface.

Two nickel net sections were cut for each substrate. The nickel net was woven from nickel wires with a diameter of 0.17 mm. These sections each consisted of a 15×70 mm rectangular section with a thinner rectangular "tail" about 1 mm wide and 100 mm long centered on one of the 15 mm edges. Three nickel wires for use as connections to the external circuitry were freed from the net of the tail by removing the cross wires.

The carbon-on-nickel substrates were assembled as follows. The nickel net rectangles were folded in half along the same axis as that of the nickel wire leads. Two folded nickel net rectangles were positioned at opposite edges of a carbon square by sliding the edges inside until they made contact with the nickel net rectangle folds. Nickel wires were removed from nickel net pieces and were used to permanently affix the nickel net rectangles to the carbon squares. This operation was carried out at each edge by tightly weaving or sewing two wires through the nickel net-carbon-nickel net layers. Great care was taken to insure that the carbon and nickel made excellent contact.

Electrode coatings consisting of salt mixtures with the above nominal compositions were deposited from aqueous solutions on both electrode substrates using the technique described above in Part A of Section IV (Electrode Coating Preparations). For the anode, a starting solution was prepared by dissolving 4.2 g LiCl and 11.1 g $CaCl_2$ in 30 ml water. For the cathode, a starting solution was prepared by dissolving 4.0 g LiCl and 0.55 g $CaCl_2$ in 50 ml water. The immersion-baking procedure was repeated as necessary until the total weights of the LiCl—$CaCl_2$ salt mixtures on the anode and cathode substrates were about 1.55 g and 1.56 g, respectively.

The baking procedure performed after each immersion for this cell consisted of first heating the coated substrates in air at a rate of about 5° C./minute from 50° C. to 250° C., holding them at 250° C. for two hours, transferring them to a vacuum oven set at 200° C., and holding them for another two hours. As a final step, the electrode assemblages were inserted into glass containers, a dried nitrogen atmosphere was introduced, and the glass containers were sealed. The containers were heated slowly from 50° C. to 500° C. and held for about 30 minutes.

The electrolyte as prepared by dissolving 8.8 g $LiAlCl_4$ in 120 g $SOCl_2$.

The cell was assembled as follows. The two electrodes were placed at opposite ends in a glass container which was 72 mm high, 80 mm wide, and 4 mm thick as measured from the inside. The walls of the container were about 4 mm thick on all sides. The electrodes were placed in the container such that the pairs of leads on each electrode emerged from the top Care was taken to insure that the electrodes were parallel to one another with a gap of 1 mm. This was accomplished by inserting four glass slides (72×8×1 mm) between the electrodes. These glass slides were arranged in a parallel fashion and distributed uniformly between the edges, exposing three rectangular regions of about 13×70 mm; these three rectangles formed the active electrode surface area of the cell. The cell was filled with about 70 g electrolyte and was then sealed at the top with a 12×80 mm glass slide and epoxy which was allowed to set for at least 5 hours. The amount of electrolyte between the electrodes was estimated at about 60 g.

This cell was charged by a DC power source in constant-current mode at 80 mA. The charging voltage started at 1.0 V and increased to 4.0 V after about 25 minutes. The charging process was continued until the charging voltage reached its upper limit of 4.9 V. At that point, a constant current could not be maintained and the charging process was stopped after about 4.0 hours when the charging current had dropped to about 1.0 mA. The open circuit voltage after charging was 3.85 V, and the maximum short cut discharging current was 1.75 A.

The cell was discharged through a light bulb with a resistance about 80Ω for a discharging current value of 45 mA. The discharging process was continued for about 7.2 hours at which point, the cell output voltage had dropped to 1.8 V with an output current of 25 mA. At the point, the cell open circuit voltage was measured at about 2.8 V with a short cut current of about 90 mA.

Figure 4A:
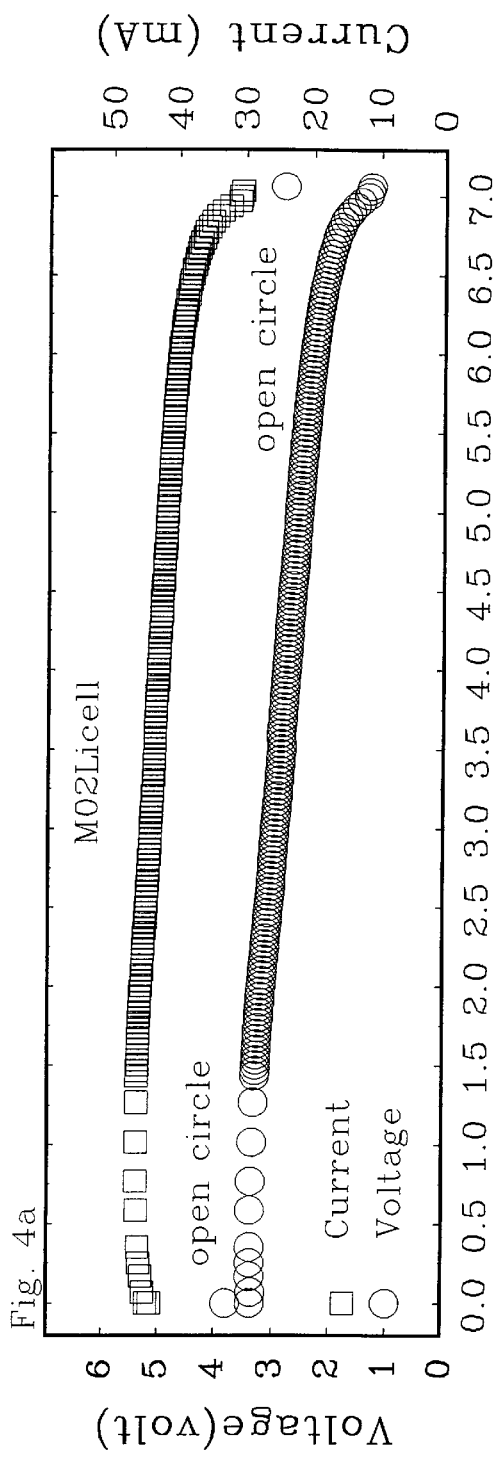
FIG. 4a shows the cell voltage and current versus time during discharging for Cell E of Example #4.
Figure 4B:
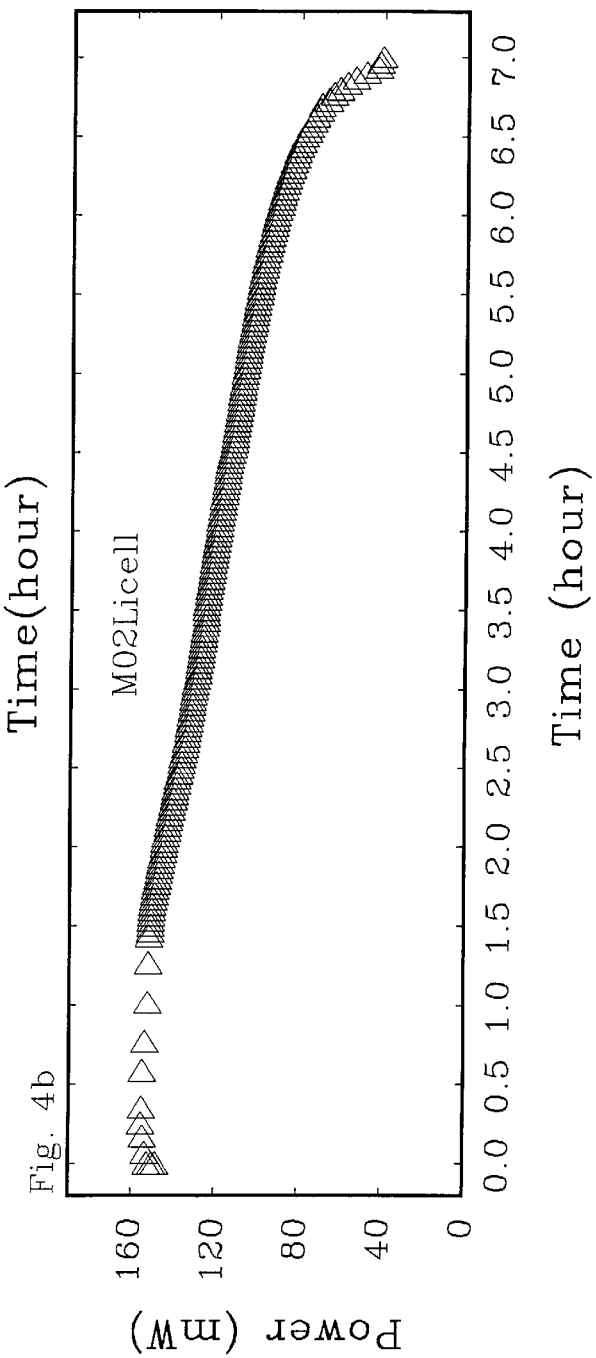
FIG. 4b shows the cell output power versus time during discharging for the same cell.

FIG. 4a shows the cell voltage and current versus time during discharging. FIG. 4b shows the cell output power versus time during discharging. The discharging Coulombic capacity of the cell was determined from the current, time, and weight of the total working electrode active material, i.e., (45 mA)(7.2 h)/(0.775 g+0.780 g)=208 mAh/g, where 0.775 g and 0.780 g are the amounts of working electrode active material on the anode and cathode, respectively. The cathode discharging Coulombic capacity was determined from the current, time, and weight of the total working cathode active material, i.e., (45 mA)(7.2 h)/(0.780 g)=415 mAh/g.

F. Anode (150 g): $0.5LiCl-0.5CaCl_2$
Cathode (1.52 g): $0.95LiCl-0.05CaCl_2$
Substrate: Carbon-on-nickel
Electrolyte (in excess): $SO_2Cl_2$-$0.04LiAlCl_4$
Size: 40×70 mm This cell was prepared from start to finish using he same procedures as those given above for Cell E of this Example except for the electrolyte composition and the amounts of salts deposited on the electrode substrates which were slightly lower than those of Cell E. The electrolyte was prepared by dissolving 7.0 g $LiAlCl_4$ in 136 g $SO_2Cl_2$.

This cell was charged by a DC power source in constant-current mode at 80 mA. The charging voltage started at 1.0 V and increased to 3.8 V after about 25 minutes. The charging process was continued until the charging voltage reached its upper limit of 4.9 V. At that point, a constant current could not be maintained (the charging current started to drop) and the charging process was stopped for about 4.0 hours when the charging current had reduced to 1.0 mA. The open circuit voltage after charging was 3.8 V, and the maximum short cut discharging current was 1.5 A.

The cell was discharged through a light bulb with a resistance of about 80Ω for a discharging current value of 45 mA. The discharging process was continued for about 6.5 hours at which point, the cell output voltage had dropped to 1.8 V with an output current of 26 mA. At that point, the cell open circuit voltage was measured at about 2.8 V with a short cut current of about 100 mA.

G. Anode (1.30 g): $0.5LiCl-0.5CaCl_2$
Cathode (1.42 g): $0.95LiCl-0.05CaCl_2$
Substrate: Carbon-on-nickel
Electrolyte (in excess): $SOCl_2$-$0.035LiAlCl_4$
Size: 30×70 mm For this cell, the carbon-on-nickel substrates were fabricated as follows. The nickel for the substrate and leads to the external circuit was cut in one continuous piece from nickel net woven from 0.17 mm diameter wires; a 30×70 mm section formed the substrate, and 5 rectangular "tails" about 2 mm wide were evenly distributed along the entire length of one of the 68 mm edges from one end to the other. Five nickel wires spaced about 17 mm apart for use as connections to the external circuitry were freed from the net by removing the cross wires from the tails.

A paste was made of carbon and polypropylene oxide (PPO) as follows. About 10 g of carbon fibers were cut to 0.5 mm lengths which were then combined with 0.5 g LiCl and 2 ml water. This mixture was heated in air at a rate of about 5° C./minute from 50° C. to 500° C., held for two hours, and cooled to room temperature. Afterwards, this mixture was crushed to a fine powder with a mortar and pestle and the LiCl was washed away with water. The remaining material, which consisted mostly of carbon, was allowed to dry under ambient conditions and was mixed thoroughly with 0.5 g PPO with a molecular weight of 4,000 (i.e., $PPO_{4000}$). About 0.15 g of this paste was evenly applied to each side of a 28×68 nickel net prepared as described above then smoothed by squeezing between a glass roller and glass plate. The dimensions of the carbon-on-nickel substrate after application of this paste were about 30×70 mm.

This carbon-on-nickel substrate assemblage was left on the glass plate used to hold it during the application of the carbon-PPO paste. In an argon-filled dry box, the substrate and glass plate were placed in a large test tube which was plugged up at the open end by stuffing it tightly with glass paste paper. This assemblage was heated at 5° C./minute from 150° C. to 200° C., held for two hours, heated thereafter at 5° C./minute to 500° C., held for one hour, and cooled to room temperature. This heat treatment was carried out from start to finish in vacuum.

Electrode coatings consisting of salt mixtures with the above nominal compositions were deposited from aqueous solutions on both electrode substrates using the technique described above in Part A of Section IV (Electrode Coating Preparations). For the anode, a starting solution was prepared by dissolving 4.2 g LiCl and 11.1 g $CaCl_2$ in 30 ml water. For the cathode, a starting solution was prepared by dissolving 4.0 g LiCl and 0.55 g $CaCl_2$ in 50 ml water. The immersion-baking procedure was repeated as necessary until the total weights of the LiCl—$CaCl_2$ salt mixtures on the anode and cathode substrates were about 1.30 g and 1.42 g, respectively.

A cell was assembled from the above-described cell component materials using a parallel plate design, i.e., Parallel Plate, 30×70 mm. The materials and preparation procedures for this test cell design are described in Part C of Section V (Cell Assembly).

This cell was charged by a computer program in constant-current mode. A voltage not exceeding 5.0 V was applied across the cell in series with an adjustable resistor so that the charging current was about 50 mA throughout the charging process. The open circuit voltage after charging was 3.75 V. The cell was discharged through an adjustable resistor so that the discharging current was 25 mA throughout the discharging process which was carried out until the cell output voltage had dropped to about 1.0 V.

FIG. 5a shows the charging-discharging curve for this cell during the fourth cycle. For this cycle, the total discharging time was about 6.2 hours. FIG. 5b shows the middle-cycle-10 charging-discharging curve. For this cycle, the total discharging time was about 7.43 hours. The discharging Coulombic capacity of the cell was determined from the current, time, and weight of the total working electrode active material, i.e., (25 mA)(7.43 h)/(0.65 g+0.71 g)=137 mAh/g, where 0.65 g and 0.71 are the amounts of working electrode active material on the anode and cathode, respectively. The cathode discharging Coulombic capacity was determined from the current, time, and weight of the total working cathode active material, i.e., (25 mA)(7.43 h)/(0.71 g)=262 mAh/g. The anode discharging Coulombic capacity was determined from the current, time, and weight of the total working anode active material, i.e., (25 mA)(7.43 h)/(0.65 g)=286 mAh/g. The average discharging voltage was about 3.35 V, so the active material average energy density of this cell was determined at (3.35V)(25 mA)(7.43 h)/(0.65 g+0.71 g)=458 mWh/g.

H. Anode (0.162 g): $0.5LiCl-0.5CaCl_2$
Cathode (0.145 g): $0.95LiCl-0.05\ CaCl_2$
Substrate: Carbon-on-nickel
Electrolyte (in excess): $SO_2Cl_2-0.035LiAlCl_4$
Size: 15×30 mm For this cell, the carbon-on-nickel substrates were prepared from start to finish using the same materials and procedures as those of the carbon-on-nickel substrate, 4×10 mm, Type III (carbon-PPO paste) described above in Part D of Section III (Electrode Substrate Preparations) with the following modifications: i) the substrate size was 15×30 mm rather than 4×10 mm and ii) the total amount of carbon-PPO paste applied to the nickel net was about 0.25 g rather than 0.02 g.

Electrode active material salt mixtures with the nominal compositions given above were deposited on the carbon-on-nickel substrates from solution as described above in Part A of Section III (Electrode Substrate Preparations). For the anode, the starting solution consisted of 4.2 g LiCl and 11.1 g $CaCl_2$ in 50 ml water. For the cathode, the starting solution consisted of 8.0 g LiCl and 1.11 g $CaCl_2$ in 30 ml water. The amounts of salts deposited on the anode and cathode substrates were about 0.162 g and 0.145 g, respectively. For both electrodes, the baking procedure performed between immersions and the final baking and annealing steps wee the same as those described for the electrode type $0.2LiCl-0.8CaCl_2$, 4×10 mm, carbon-on-nickel, given in Part A(i) of Section IV (Electrode Coating Preparations).

The electrolyte for this cell was made by dissolving 6.2 g $LiAlCl_4$ in 136 g $SO_2Cl_2$.

A cell was assembled from the above-described cell component materials using the same materials and procedures as those of the Parallel Plate, 4×10 mm, design given in Part B of Section V (Cell Assembly), with one modification: a Pyrex tube with an inner diameter of 20 mm rather than 5 mm was used to house the cell due to the larger substrate width (i.e., 15 mm).

This cell was charged by a computer program in constant-current mode. The charging current was about 100 mA through the charging process. The open circuit voltage after charging was 3.8 V. The cell was discharged through an adjustable resistor so that the discharging current was 10 mA throughout the discharging process which was carried out until the cell output voltage had dropped to about 0.1 V. The total discharging time was about 3.7 hours.

Figure 6:
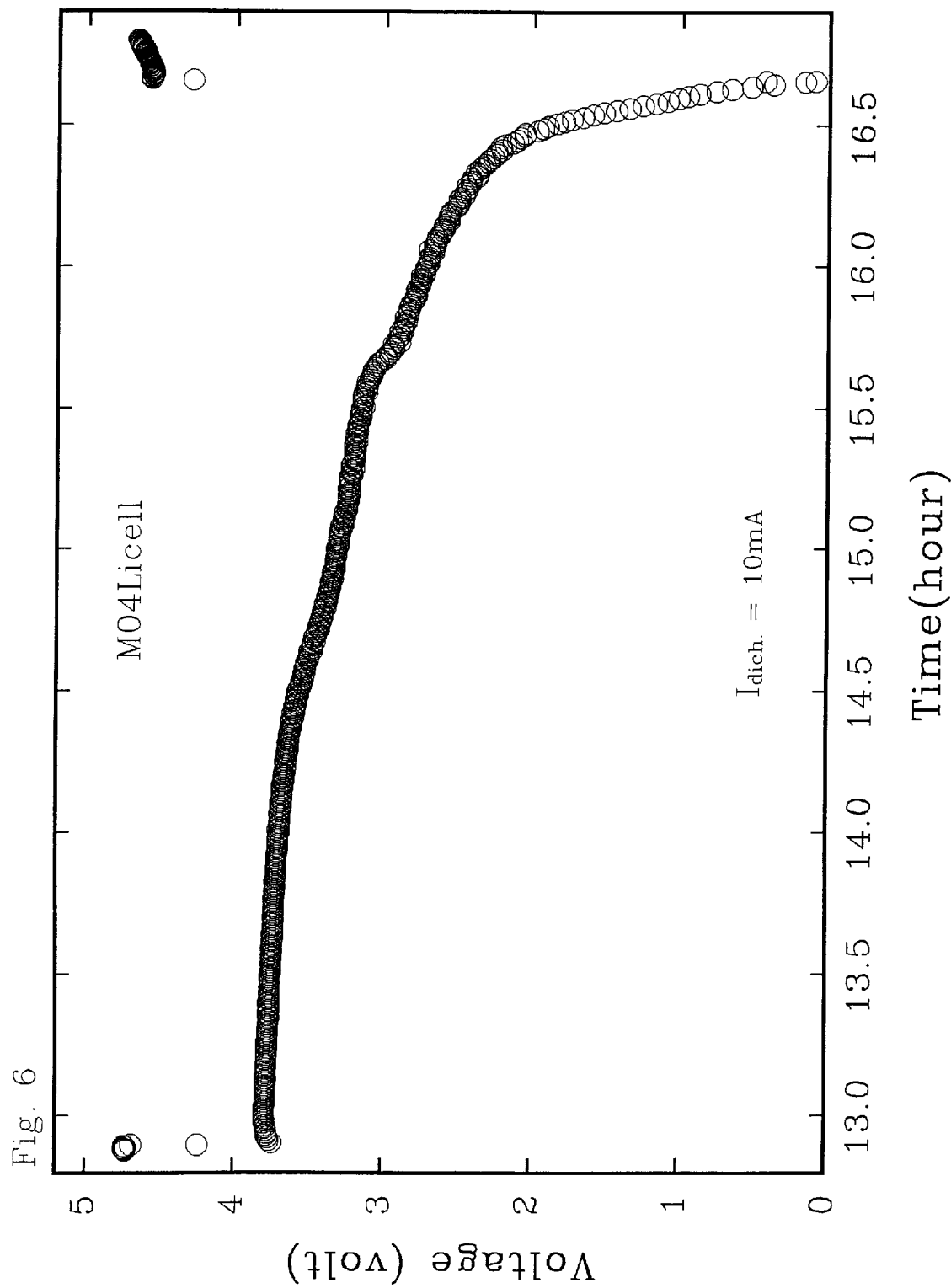
FIG. 6 is a plot of the charging-discharging curve for Cell H of Example #4.

FIG. 6 shows the cell voltage versus time during discharging. The discharging Coulombic capacity of the cell was determined from the current, time, and weight of the total working electrode active material, i.e., (10 mA)(3.7 h)/(0.081 g+0.0725 g)=241 mAh/g, where 0.081 g and 0.0725 g are the amounts of working electrode active material on the anode and cathode, respectively. The cathode discharging Coulombic capacity was determined from the current, time, and weight of the total working cathode active material, i.e., (10 mA)(3.7 h)/0.0725 g)=510 mAh/g.

EXAMPLE #5

For this cells of this Example, the anode consists of a salt mixture, $xLiCl+(1-x)CaCl_2$, where $0.2<x<0.95$. The cathode consists of a salt mixture, $xLiCl+(1-x)CaCl_2$, where $0.5<x<0.95$. Both electrodes are supported on carbon fiber substrates. The electrolyte may consist of one of $$(1-x)SOCl_2+xLiAlCl_4+0.01LiBF_4 \quad (1)$$

$$(1-x)SO_2Cl_2+xLiAlCl_4+0.01LiBF_4 \quad (2)$$

where for all four electrolytes, x may range from about 0.02 to 1.5 and ~1 m % of either LiF or $LiBF_4$ is added to the electrolyte to give it a gelatinous texture. The fabrication procedures and performance characteristics of four representative cells (denoted A through D) using this family of cell component materials are given below.

A. Anode (0.002 g): $0.2LiCl-0.8CaCl_2$
   Cathode (0.002 g): $0.9LiCl-0.1CaCl_2$
   Substrate: Carbon
   Electrolyte (in excess): $SOCl_2$-$0.035LiAlCl_4$-$0.01LiBF_4$
   Size: 1.2×10 mm For this cell, the Tiny Cell design was used which is described above in Part A of Section V (Cell Assembly). The materials and preparation procedures for the carbon fiber cluster substrate-lead assemblages used in this test cell design are also given therein.

Electrode active material salt mixtures with the nominal compositions given above were deposited on the carbon fiber cluster substrates from solution as described above in Part A of Section III (Electrode Substrate Preparations). About 0.002 g of the respective salt mixtures were deposited on each electrode substrate. For the anode, a solution of 8.9 g $CaCl_2$ and 0.85 g LiCl in 30 ml water was used as the starting solution. For the cathode, a solution of 3.3 g $CaCl_2$ and 11.3 g LiCl in 30 ml water was used. For both electrodes, the baking procedure performed between immersions and the final baking and annealing steps were the same as those described for the electrode type $0.2LiCl-0.8CaCl_2$, 4×10 mm, carbon-on-nickel, given in Part A(i) of Section IV (Electrode Coating Preparations).

The electrolyte was prepared by dissolving 6.2 g $LiAlCl_4$ and 0.937 g $LiBF_4$ in 120 g $SOCl_2$.

This cell was charged in constant-voltage mode by applying a voltage of 4.8 V across the cell in series with an adjustable resistor which was initially set to 4.4 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.7 hours.

The open circuit voltage after charging was 3.8 V, and the maximum short cut discharging current was 25 mA. The cell was discharged through an adjustable resistor which was set to 5.5 kΩ so that the initial discharging current was 0.6 mA. After about 2.5 hours, the cell output voltage had dropped to 0.5 V.

B. Anode (0.002 g): $0.2LiCl-0.8CaCl_2$
   Cathode (0.002 g): $0.9LiCl-0.1CaCl_2$
   Substrate: Carbon
   Electrolyte (in excess): $SO_2Cl_2$-$0.035LiAlCl_4$-$0.01LiBF_4$
   Size: 1.2×10 mm This cell was prepared from start to finish using the same materials and procedures as those of Cell A of this Example except that $SO_2Cl_2$ was substituted for $SOCl_2$ in the electrolyte. The electrolyte for this cell was prepared by dissolving 6.2 g $LiAlCl_4$ and 0.937 g $LiBF_4$ in 136 g $SO_2Cl_2$.

This cell was charged in constant-voltage mode by applying a voltage of 4.9 V across the cell in series with an adjustable resistor which was initially set to 4.5 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.5 hours.

The open circuit voltage after charging was 3.85 V, and the maximum short cut discharging current was 25 mA. The cell was discharged through an adjustable resistor which was set to 6.7 kΩ so that the initial discharging current was 0.5 mA. After about 2.9 hours, the cell output voltage had dropped to 0.5 V.

C. Anode (0.002 g): $0.2LiCl-0.8CaCl_2$
   Cathode (0.002 g): $0.9LiCl-0.1CaCl_2$
   Substrate: Carbon
   Electrolyte (in excess): $SOCl_2$-$0.035LiAlCl_4$-$0.01LiF$
   Size: 1.2×10 mm This cell was prepared from start to finish using the same materials and procedures as those of Cell A of this Example except that LiF was substituted for $LiBF_4$ in the electrolyte. The electrolyte was prepared by dissolving 6.2 g $LiAlCl_4$ and 0.259 g LiF in 120 g $SOCl_2$.

This cell was charged in constant-voltage mode by applying a voltage of 4.9 V across the cell in series with an adjustable resistor which was initially set to 4.5 kΩ so that the charting current was 1.0 mA. As charging progressed, this resistor was manually lowered step by step to keep the charging current at about 1 mA until it had reached a value of about 1.0 kΩ. The charging process was continued thereafter until the charging current had dropped to 0.03 mA. The total charging time from start to finish was about 1.5 hours.

The open circuit voltage after charging was 3.8 V, and the maximum short cut discharging current was 25 mA. The cell was discharged through an adjustable resistor which was set to 5.6 kΩ so that the initial discharging current was 0.6 mA. After about 2.4 hours, the cell output voltage had dropped to 0.5 V.

D. Anode (0.002 g): $0.2LiCl-0.8CaCl_2$
   Cathode (0.002 g): $0.9LiCl-0.1CaCl_2$
   Substrate: Carbon
   Electrolyte (in excess): $SO_2Cl_2$-$0.035LiAlCl_4$-$0.01LiF$
   Size: 1.2×10 mm This cell was prepared from start to finish using the same materials and procedures as those of Cell A of this Example except that $SO_2Cl_2$ was substituted for $SOCl_2$ and LiF was substituted for $LiBF_4$ in the electrolyte. The electrolyte was prepared by dissolving 6.2 g $LiAlCl_4$ and 0.259 g LiF in 136 g $SO_2Cl_2$.

This cell was charged in constant-voltage mode by applying a voltage of 4.9 V across the cell in series with an adjustable resistor which was initially set to 4.5 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.6 hours.

The open circuit voltage after charging was 3.8 V, and the maximum short cut discharging current was 30 mA. The cell was discharged through an adjustable resistor which was set to 6.5 kΩ so that the initial discharging current was 0.6 mA. After about 2.5 hours, the cell output voltage had dropped to 0.5 V.

EXAMPLE #6

For the cells of this Example, the anode consists of a salt mixture, $x\text{LiCl}+(1-x)\text{CaCl}_2$, where $0.2<x<0.95$. The cathode consists of a salt mixture, $x\text{LiCl}+(1-x)\text{Li}_2\text{O}$, where $0.4<x<0.6$. Both electrodes are supported on carbon substrates reinforced with nickel metal. The electrolyte may consist of either (1) $(1-x)\text{SOCl}_2+x\text{LiAlCl}_4$ or (2) $(1-x)\text{SO}_2\text{Cl}_2+x\text{LiAlCl}_4$ where x may range from about 0.02 to 1.5. The fabrication procedures and performance characteristics of four representative cells (denoted A through D) using this family of cell component materials are given below.

A. Anode (0.035 g): $0.2\text{LiCl}-0.8\text{CaCl}_2$
   Cathode (0.035 g): $0.6\text{LiCl}-0.4\text{Li}_2\text{O}$
   Substrate: Carbon-on-nickel
   Electrolyte (in excess): $\text{SOCl}_2-0.035\text{LiAlCl}_4$
   Size: 4×20 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with the following modification: the substrate size was 4×20 mm rather than 4×10 mm. For this substrate, the amount of carbon applied to the nickel net was about 0.005 g, as for the 4×10 mm substrates.

The anode was prepared by depositing a $0.2\text{LiCl}-0.8\text{CaCl}_2$ salt mixture from an aqueous solution using the technique described above in Part A of Section IV (electrode Coating Preparations). The total amount of salt deposited on the anode substrate was about 0.035 g. A starting solution consisting of LiCl and $\text{CaCl}_2$ present at a molar ratio of about 1:4 was prepared by dissolving 2.52 g LiCl and 26.6 g $\text{CaCl}_2$ in 50 ml water. The baking procured performed between immersions and the final baking and annealing steps were the same as those described for the electrode type $0.2\text{LiCl}-0.8\text{CaCl}_2$, 4×10 mm, carbon-on-nickel, given in Part A(i) of Section IV (Electrode Coating Preparations).

The cathode coating consisted of a $0.6\text{LiCl}-0.4\text{Li}_2\text{O}$ salt mixture which was prepared as follows. First, 12.6 g LiCl and 9.6 g LiOH were combined in a quartz tube and the mixture was heated in a furnace to 500° C. for about 10 hours. After the mixture had cooled to room temperature, it was transferred to a dry box and the expected loss of water that occurs upon conversion of 2LiOH to $\text{Li}_2\text{O}$ (i.e., 3.6 g $\text{H}_2\text{O}$ for 9.6 g LiOH) was confirmed by comparing the total weight of the ingredients after the 500° C. calcining to their weight prior to that procedure. This mixture, which now consisted of LiCl and $\text{Li}_2\text{O}$ in a 3:2 molar ratio, was crushed to a fine powder with a mortar and pestle. A paste was made with this powder by adding 0.1 g of the acetonitrile-01PPO$_{8,000,000}$ binder, the preparation of this binder is described in Part B of Section IV (Electrode Coating Preparations). About 0.017–0.018 g of this paste was evenly applied to each side of the substrate which was then squeezed between a glass roller and a glass plate. The cathode assemblage was placed into a Pyrex glass tube, heated to 150° C. in air, and held for two hours. The tube containing the assemblage was then cooled to room temperature, vacuum-sealed, reheated to 600° C., and held for two hours.

The electrolyte for this cell was prepared by dissolving 6.2 g $\text{LiAlCl}_4$ in 120 g $\text{SOCl}_2$.

A cell was assembled from the above-described cell component materials using a parallel plate design, i.e., Parallel Pate, 4×10 mm. The materials and preparation procedures for this test cell design are described in Part B of Section V (Cell Assembly). In this case, however, the longer 4×20 mm electrode assemblages prepared as described above were used in place of the usual 4×10 mm assemblages.

This cell was charged by a DC power source in constant-current mode at 5.0 mA. The charging voltage started at 1.2 V and increased to 4.0 V after about 20 minutes. The charging process was continued until the charging voltage reached its upper limit of 4.8 V, which was a gradual process. At that point, a constant current could not be maintained and the charging process was stopped after about 4.2 hours when the charging current had dropped to about 0.05 mA. The open circuit voltage after charging was 3.9 V, and the maximum short cut discharging current was 65 mA.

The cell was discharged through an adjustable resistor with a resistance of about 3.6 kΩ for a discharging current value of 1.0 mA. The discharging process was continued for about 9.4 hours at which point, the cell output voltage had dropped to 0.5 V with an output current of 0.2 mA. At that point, the cell open circuit voltage was measured at about 2.9 V with a short cut current of about 30 mA.

FIG. 7a shows the cell voltage versus time during discharging for this cell. FIG. 7b shows the cell output power versus time during discharging. The discharging Coulombic capacity of the cell was determined from the current, time, and weight of the total working electrode active material, i.e., (1 mA)(9.4 h)/(0.0175 g+0.0175 g)=269 mAh/g, where 0.0175 g is the amount of working electrode active material on each electrode. The discharging Coulombic capacity for each electrode was determined from the current, time, and weight of the total working cathode active material, i.e., (1 mA)(9.4 h)/(0.0175 g)=537 mAh/g. The average discharging voltage was about 3.35 V, so the active material average energy density of this cell was determined at (3.35V)(1 mA)(9.4 h)/(0.0175 g+0.0175 g)=900 mWh/g.

B. Anode (0.025 g): $0.2\text{LiCl}-0.8\text{CaCl}_2$
   Cathode (0.025 g): $0.6\text{LiCl}-0.4\text{Li}_2\text{O}$
   Substrate: Carbon-on-nickel
   Electrolyte (in excess): $\text{SO}_2\text{Cl}_2-0.035\text{LiAlCl}_4$
   Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

An electrode of the type, $0.2\text{LiCl}-0.8\text{CaCl}_2$, 4×10 mm, carbon-on-nickel, prepared by a solution deposition technique, constituted the anode for this cell. The materials and preparation procedures for this electrode are the same as those given in Part A(i) of Section IV (Electrode Coating Preparations) with one modification: the amount of salt deposited on the substrate was about 0.025 g rather than 0.02 g.

The cathode was prepared from start to finish using the same procedures and materials as those of Cell A of this Example except that the total amount of salt applied to the substrate was about 0.025 g rather than 0.035 g due to the difference in substrate sizes between Cells A and B.

The electrolyte for this cell was prepared by dissolving 6.2 g $\text{LiAlCl}_4$ in 136 g $\text{SO}_2\text{Cl}_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 5.0 V across the cell in series with an adjustable resistor which was initially set to 2.5 kΩ so that the charging current was 2.5 mA. As charging progressed, this resistor was manually lowered step by step to keep the charging current at about 2.5 mA until it had reached a value of about 500Ω. the charging process was continued thereafter until the charging current had dropped to 0.03 mA. The total charging time from start to finish was about 4.2 hours.

The open circuit voltage after charging was 3.9 V, and the maximum short cut discharging current was 70 mA. The cell was discharged through an adjustable resistor which was varied from one cycle to the next so that the discharging behavior for this cell could be measured as a function of discharging current. Discharging was continued for each cycle until the cell output voltage had dropped to 0.5 V.

FIGS. 8a and b show the cell voltage versus time during discharging for discharging currents of 5 mA and 2 mA, respectively. For FIG. 8a, the discharging time is 1.35 hours and the cell Coulombic capacity is calculated at (5 mA)(1.35 h)/(0.0125 g+0.0125 g)=270 mAh/b, where 0.0125 g is the amount of electrode active material on each electrode. For FIG. 8b, the discharging time is 3.45 hours and the cell Coulombic capacity is calculated at (2 mA)(3.45 h)/(0.0125 g+0.0125 g)=276 mAh/g. From these results, it can be seen that the lower discharge rate results in a somewhat higher Coulombic capacity for this cell.

C. Anode (0.02 g): $0.2LiCl-0.8CaCl_2$
  Cathode (0.02 g): $0.6LiCl-0.4Li_2O$
  Substrate: Carbon-on-nickel
  Electrolyte (in excess): $SOCl_2-0.035LiAlCl_4$
  Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

An electrode of the type, $0.2LiCl-0.8CaCl_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

The cathode was prepared from start to finish using the same procedures and materials as those of Cell A of this Example except that the total amount of salt applied to the substrate was about 0.02 g rather than 0.035 g due to the difference in substrate sizes.

The electrolyte for this cell was prepared by dissolving 6.2 g $LiAlCl_4$ in 120 g $SO_2Cl_2$.

The charging procedure was the same as that of Cell B of this Example. FIG. 8c shows the cell voltage versus time during discharging. During discharging, the current was 2.0 mA and the total discharging time was about 2.7 hours. The Coulombic capacity of the cell is calculated at (2 mA)(2.7 h)/(0.01 g+0.01 g)=270 mAh/g.

D. Anode (0.35 g): $0.2LiCl-0.8CaCl_2$
  Cathode (0.352 g): $0.6LiCl-0.4Li_2O$
  Substrate: Carbon-on-nickel
  Electrolyte (10 g): $SOCl_2-0.035LiAlCl_4$
  Size: 30×70 m The cell component materials are the same as those of Cells A and C of this Example; for this cell, a larger test cell design with an electrode cross sectional area of 21 cm² was employed.

The carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with the following modifications: i) the substrate size was 30×70 mm rather than 4×10 mm, ii) the total amount of carbon-Teflon paste applied to the nickel net was about 0.8 g rather than 0.02 g and iii) the subsequent heat treatment was different from that of the 4×10 mm substrates. The substrate preparation procedures with these modifications are given in more detail below.

First, the nickel for the substrate and lead to the external circuit was cut in one continuous piece from nickel net; a 30×70 mm section formed the substrate, and a thinner rectangular "tail" 2 mm wide was centered on one of the 30 mm edges. Four nickel wires for use as connections to the external circuitry were freed from the net by removing the cross wires. About 0.4 g carbon-Teflon-water paste was applied evenly to each side of the nickel net, and the paste was smoothed by squeezing between a glass roller and a glass plate, making certain that each side was thoroughly covered so that the nickel metal would never be exposed to the electrolyte during cell operation. This carbon-on-nickel substrate assemblage was vacuum heated at 200° C. for 10 hours, cooled to room temperature, placed in a vacuum-sealed Pyrex glass tube, and given a final heat treatment at 600° C. for two hours. The total amount of carbon on the substrate once all the preparations were complete was about 0.7 g.

The anode was prepared by depositing a $0.2LiCl-0.8CaCl_2$ salt mixture from an aqueous solution using the technique described above in Part A of Section IV (Electrode Coating Preparations). The total amount of salt deposited on the anode substrate was about 0.35 g. A starting solution consisting of LiCl and $CaCl_2$ present at a molar ratio of about 1:4 was prepared by dissolving 2.52 g LiCl and 26.6 g $CaCl_2$ in 50 ml water. The baking procedure performed between immersions and the final baking and annealing steps were the same as those described for the electrode type $0.2LiCl-0.8CaCl_2$, 4×10 mm, carbon-on-nickel, given in Part A(i) of Section IV (Electrode Coating Preparations).

The cathode was prepared by applying a paste containing the salt mixture, $0.6LiCl-0.4Li_2O$, prepared as described for Cell A of this Example. About 0.176 g of paste was evenly applied to each side of the substrate which was then squeezed between a glass roller and a glass plate. This cathode assemblage was placed in a large glass test tube with the open end stuffed with glass paste paper and transferred to a vacuum furnace, wherein it was heated from 50° C. to 200° C. at a rate of 5° C./minute then held for about 5 hours. Then, a nitrogen atmosphere was introduced into the furnace, and the assemblage was heated from 200° C. to 450° C. and held thereafter for 5 hours.

A cell was assembled from the above-described cell component materials using a parallel plate design, i.e., Parallel Plate, 30×70 mm. The materials and preparation procedures for this test cell design are described in Part C of Section V (Cell Assembly).

This cell was charged and discharged by a computer program in constant-current mode. The charging voltage upper limit was set to 5.0 V. FIGS. 9a and b show the cell voltage versus time during discharging during the second and third cycles. For both cycles, the cell was discharged at a rate of 40 mA, and the total discharging time was about 2.5 hours. The discharging Coulombic capacity of the cell was determined from the current, time, and weight of the total working electrode active material, i.e., (40 mA)(2.5 h)/(0.175 g+0.176 g)=285 mAh/g, where 0.175 g and 0.176 g are the amounts of working electrode active material on the anode and cathode, respectively, The cathode discharging Coulombic capacity was determined from the current, time, and weight of the total working cathode active material, i.e., (40 mA)(2.5 h)/(0.176 g)=568 mAh/g.

EXAMPLE #7

For the cells of this Example, the anode consists of a salt mixture, $x$LiCl+(1−$x$)CaCl$_2$, where 0.2<x<0.95. The cathode consists of a salt mixture, $x$LiCl+(1−$x$)Li$_2$O, where 0.4<x<0.6. Both electrodes are supported on carbon fiber cluster substrates. The electrolyte may consist of one of

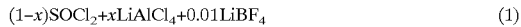  (1)

  (2)

  (3)

  (4)

where for all four electrolytes, x may range from about 0.02 to 1.5 and ~1m % of either LiF or LiBF$_4$ is added to the electrolyte to give it a gelatinous texture. The fabrication procedures and performance characteristics of four representative cells (denoted A through D) using this family of cell component materials are given below.

A. Anode (0.002 g): 0.2LiCl-0.8CaCl$_2$
  Cathode (0.0013 g): 0.6LiCl-0.4Li$_2$O
  Substrate: Carbon
  Electrolyte (in excess): SOCl$_2$-0.035LiAlCl$_4$-0.01LiBF$_4$
  Size: 1.2×10 mm For this cell, the Tiny Cell design was used which is described above in Part A of Section V (Cell Assembly). The materials and preparation procedures for the carbon fiber cluster substrate-lead assemblages used in this test cell design are also given therein.

For the anode, about 0.002 g of a salt mixture with the above nominal composition was deposited on a carbon fiber cluster substrate using the technique described above in Part A of Section IV (Electrode Coating Preparations). The starting solution consisted of 8.9 g CaCl$_2$ and 0.85 g LiCl in 10 ml water. The baking procedure performed between immersions and the final baking and annealing steps were the same as those described for the electrode type 0.2LiCl-0.8CaCl$_2$, 4×10 mm, carbon-on-nickel, given in Part A(i) of Section IV (Electrode Coating Preparations).

For the cathode, about 0.0013 g of a paste consisting of a salt mixture with the above nominal composition was applied to a carbon fiber cluster substrate. This paste was prepared as follows. First, 12.6 g LiCl and 9.6 g LiOH were combined in a quartz tube and the mixture was heated in a furnace to 500° C. for about 10 hours. After the mixture had cooled to room temperature, it was transferred to a dry box and the expected loss of water that occurs upon conversion of 2LiOH to Li$_2$O (i.e., 3.6 g H$_2$O for 9.6 g LiOH) was confirmed by comparing the total weight of the ingredients after the 500° C. calcining to their weight prior to that procedure. This mixture, which now consisted of LiCl and Li$_2$O in a 3:2 molar ratio, was crushed to a fine powder with a mortar and pestle. A paste was made with this powder by adding 0.1 g of the acetonitrile-01PPO$_{8,000,000}$ binder. After the paste was applied to the substrate, the cathode assemblage was placed into a Pyrex glass tube, heated to 150° C. in air, and held for two hours. The tube containing the assemblage was then cooled to room temperature, vacuum-sealed, reheated to 600° C., and held for two hours.

The electrolyte was prepared by dissolving 6.2 g LiAlCl$_4$ and 0.937 g LiBF$_4$ in 120 g SOCl$_2$.

This cell was charged in constant-voltage mode by applying a voltage of 4.9 V across the cell in series with an adjustable resistor which was initially set to 4.5 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.5 hours.

The open circuit voltage after charging was 3.8 V, and the maximum short cut discharging current was 25 mA. The cell was discharged through an adjustable resistor which was set to 5.6 kΩ so that the initial discharging current was 0.6 mA. After about 2.5 hours, the cell output voltage had dropped to 0.5 V.

B. Anode (0.002 g): 0.2LiCl-0.8CaCl$_2$
  Cathode (0.0013 g): 0.6LiCl-0.4Li$_2$O
  Substrate: Carbon
  Electrolyte (in excess): SO$_2$Cl$_2$-0.035LiAlCl$_4$-0.01LiBF$_4$
  Size: 1.2×10 mm This cell was prepared from start to finish using the same procedures as those given in Cell A of this Example except that for the electrolyte, SO$_2$Cl$_2$ was substituted for SOCl$_2$. The electrolyte was prepared by dissolving 6.2 g LiAlCl$_4$ and 0.937 g LiBF$_4$ in 136 g SO$_2$Cl$_2$.

This cell was charged in constant-voltage mode by applying a voltage of 4.9 V across the cell in series with an adjustable resistor which was initially set to 4.5 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.6 hours.

The open circuit voltage after charging was 3.85 V, and the maximum short cut discharging current was 28 mA. The cell was discharged through an adjustable resistor which was set to 6.7 kΩ so that the initial discharging current was 0.5 mA. After about 3.2 hours, the cell output voltage had dropped to 0.5 V.

C. Anode (0.002 g): 0.2LiCl-0.8CaCl$_2$
  Cathode (0.0015 g): 0.6LiCl-0.4Li$_2$O
  Substrate: Carbon
  Electrolyte (in excess): SOCl$_2$-0.035LiAlCl$_4$-0.01LiF
  Size: 1.2×10 mm This cell was prepared from start to finish using the same procedures as those given in Cell A of this Example except that for the electrolyte, LiF was substituted for LiBF$_4$. The electrolyte was prepared by dissolving 6.2 g LiAlCl$_4$ and 0.259 g LiF in 120 g SOCl$_2$.

This cell was charged in constant-voltage mode by applying a voltage of 4.9 V across the cell in series with an adjustable resistor which was initially set to 4.4 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.5 hours.

The open circuit voltage after charging was 3.8 V, and the maximum short cut discharging current was 25 mA. The cell was discharged through an adjustable resistor which was set to 5.4 kΩ so that the initial discharging current was 0.6 mA. After about 2.5 hours, the cell output voltage had dropped to 0.5 V.

D. Anode (0.002 g): $0.2LiCl\text{-}0.8CaCl_2$
        Cathode (0.0013 g): $0.6LiCl\text{-}0.4Li_2O$
        Substrate: Carbon
        Electrolyte (in excess): $SO_2Cl_2\text{-}0.035LiAlCl_4\text{-}0.01LiF$
        Size: 1.2×10 mm This cell was prepared from start to finish using the same procedures as those given in Cell A of this Example except that for the electrolyte, $SO_2Cl_2$ was substituted for $SOCl_2$ and LiF was substituted for $LiBF_4$. The electrolyte was prepared by dissolving 6.2 g $LiAlCl_4$ and 0.259 g LiF in 136 g $SO_2Cl_2$.

This cell was charged in constant-voltage mode by applying a voltage of 4.9 V across the cell in series with an adjustable resistor which was initially set to 4.5 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.6 hours.

The open circuit voltage after charging was 3.85 V, and the maximum short cut discharging current was 35 mA. The cell was discharged through an adjustable resistor which was set to 5.5 kΩ so that the initial discharging current was 0.6 mA. After about 2.5 hours, the cell output voltage had dropped to 0.5 V.

EXAMPLE #8

For the cells of this Example, the anode consists of a salt mixture, $xLiCl+(1-x)CaCl_2$, where $0.2<x<0.95$. The cathode consists of a salt mixture, $xLiCl+(1-x)[yLi_2O+(1-y)Li_2CO_3]$, where $0.4<x<0.6$ and $0.6y<0.9$. Both electrodes are supported on carbon substrates reinforced with nickel metal. The electrolyte may consist of either (1) $(1-x)SOCl_2+xLiAlCl_4$ or (2) $(1-x)SO_2Cl_2+xLiAlCl_4$ were x may range from about 0.02 to 1.5 The fabrication procedures and performance characteristics of four representative cells (denoted A through D) using this family of cell component materials are given below.

A. Anode (0.04 g): $0.2LiCl\text{-}0.8CaCl_2$
        Cathode (0.045 g): $0.4LiCl\text{-}0.48Li_2O\text{-}0.12Li_2CO_3$ (i.e., $0.4LiCl\text{-}0.6[0.8Li_2O\text{-}0.2Li_2CO_3]$)
        Substrate: Carbon-on-nickel
        Electrolyte (0.1 g): $SOCl_2\text{-}0.035LiAlCl_4$
        Size: 8×15 mm For this cell, the carbon-on-nickel substrates were prepared from start to finish using the same materials and procedures as those of the carbon-on-nickel substrate, 4×10 mm, Type III (carbon-PPO paste) described above in Part D of Section III (Electrode Substrate Preparations) with the following modifications: i) the substrate size was 8×15 mm rather than 4×10 mm and ii) the total amount of carbon-PPO paste applied to the nickel net was about 0.06 g rather than 0.02 g.

An anode consisting of a $0.2LiCl\text{-}0.8CaCl_2$ salt mixture on a carbon-on-nickel substrate was prepared by depositing a salt mixture with this nominal composition from an aqueous solution using the technique described above in Part A of Section IV (Electrode Coating Preparations). The total amount of slat applied to the substrate was about 0.04 g. The starting solution consisted of 2.52 g LiCl and 26.6 g $CaCl_2$ dissolved in 50 ml water. The baking procedure performed between immersions and the final baking and annealing steps were the same as those described for the electrode type $0.2LiCl\text{-}0.8CaCl_2$, 4×10 mm, carbon-on nickel, given in Part A(i) of Section IV (Electrode Coating Preparations).

The cathode for this cell was prepared from start to finish using the same materials and procedures as those given above in Part B(ii) of Section IV (Electrode Coating Preparations) for the electrode type $0.4LiCl\text{-}0.48Li_2O\text{-}0.12Li_2CO_3$, 4×10 mm, carbon-on-nickel, but with the following modifications: i) the substrate size was 8×15 mm rather than 4×10 mm and ii) the total amount of salt applied to the substrate was about 0.045 g due to the larger substrate size.

The electrolyte for this cell was prepared by dissolving 6.2 g $LiAlCl_4$ in 120 g $SOCl_2$.

A cell was assembled from the above-described cell component material using the same materials and procedures as those of the Parallel Plate, 4×10 mm, design given in Part B of Section V (Cell Assembly), except two glass paste papers were inserted between the two electrodes. One modification: a Pyrex tube with an inner diameter of 10 mm rather than 5 mm was used to house the cell due to the larger substrate width (i.e., 8 mm).

This cell was charged in constant-current mode at 20 mA for 30 minutes. The open circuit voltage after charging was 3.8 V. The cell was discharged in constant-current mode at a rate of 5 mA. The total discharging time was about 1.83 hours.

Figure 10:
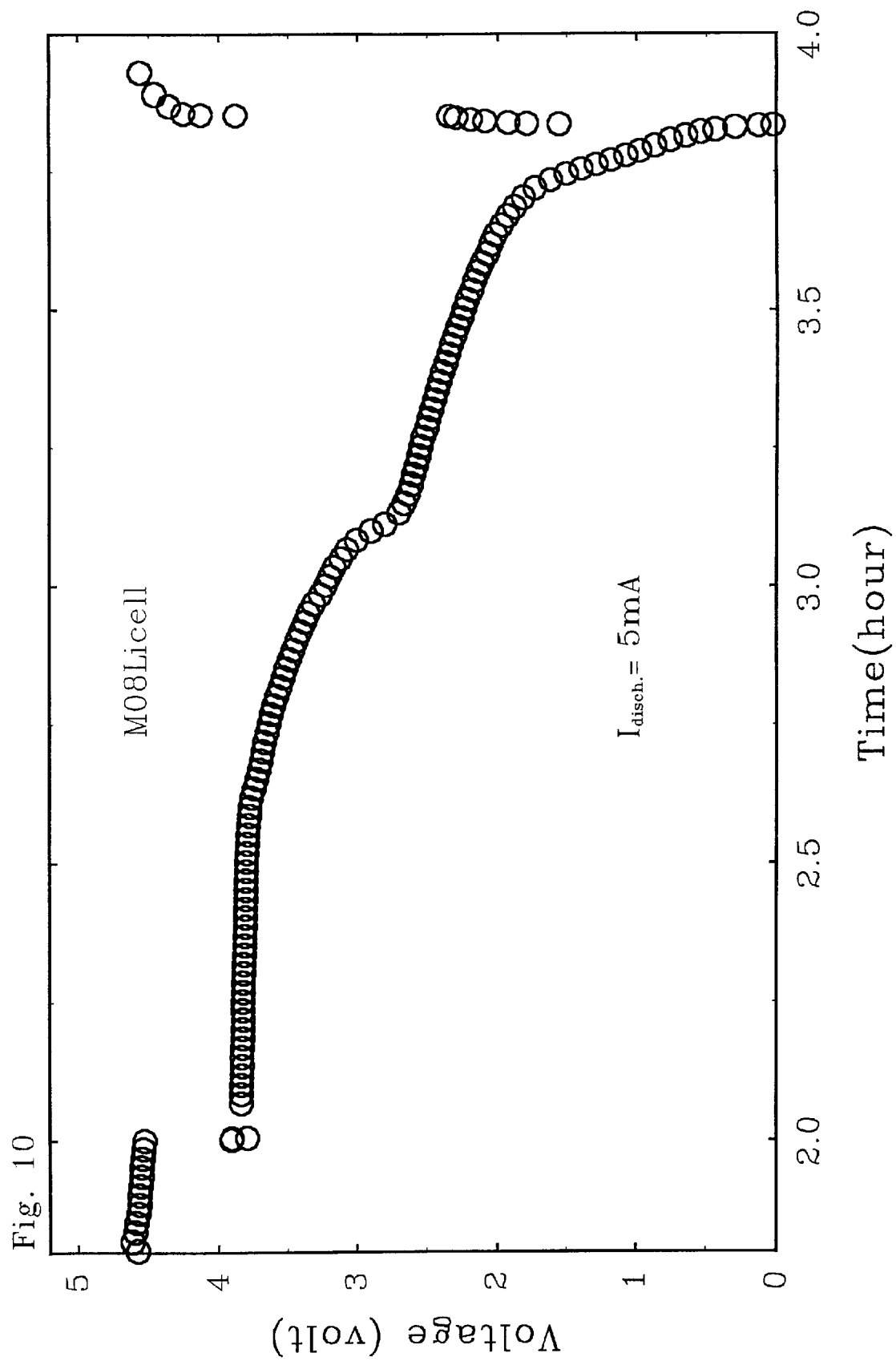
FIG. 10 shows the cell voltage versus time during discharging for Cell A of Example #8.

FIG. 10 shows the cell voltage versus time during discharging. The discharging Coulombic capacity of the cell was determined from the current, time, and weight of the total working electrode active material, i.e., (5 mA)(1.83 h)/(0.02 g+0.0225 g)=215 mAh/g, where 0.02 g and 0.0225 g are the amounts of working electrode active material on the anode and cathode, respectively. The cathode discharging Coulombic capacity was determined from the current, time, and weight of the total working cathode active material, i.e., (5 mA)(1.83 h)/(0.0225 g)=407 mAh/g.

B. Anode (0.03 g): $0.2LiCl\text{-}0.8CaCl_2$
        Cathode (0.028 g): $0.4LiCl\text{-}0.48Li_2O\text{-}0.12Li_2CO_3$
        Substrate: Carbon-on-nickel
        Electrolyte (in excess): $SO_2Cl_2\text{-}0.035LiAlCl_4$
        Size: 4×10 mm For this cell, carbon-on-nickel substrates, 4×10 mm, Type III (carbon-PPO paste) were used for both electrodes. The materials and preparation procedures for this substrate design are described above in Part D of Section III (Electrode Substrate Preparations).

An electrode of the type, $0.2LiCl\text{-}0.8CaCl_2$, 4×10 mm, carbon-on-nickel, prepared by a solution deposition technique, constituted the anode for this cell. The materials and preparation procedures for this electrode are the same as those given in Part A(i) of Section IV (Electrode Coating Preparations) with one modification: the amount of salt deposited on the substrate was about 0.03 g rather than 0.02 g.

An electrode of the type, $0.4LiCl\text{-}0.48Li_2O\text{-}0.12Li_2CO_3$, 4×10 mm, carbon-on-nickel, prepared by applying the coating as a paste, constituted the cathode for this cell. The materials and preparation procedures for this electrode are described above in detail in Part B(ii) of Section IV (Electrode Coating Preparations). The total amount of salt applied to the substrate was about 0.028 g.

The electrolyte was prepared by dissolving 6.2 g $LiAlCl_4$ in 136 g $SO_2Cl_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged by a DC power source in constant-current mode at 5.0 mA. The charging voltage started at 1.0 V and increased to 4.0 V after about 15 minutes. The charging process was continued until the charging voltage reached its upper limit of 4.9 V, which was a gradual process. At that point, a constant current could not be maintained and the charging process was stopped after about 2.5 hours when the charging current had dropped to about 0.5 mA. The open circuit voltage after charging was 3.85 V, and the maximum short cut discharging current was 30 mA.

The cell was discharged through an adjustable resistor with a resistance of about 2.9 kΩ for a discharging current value of 1.5 mA. The discharging process was continued for about 6.2 hours at which point, the cell output voltage had dropped to 1.0 V with an output current of 0.5 mA. At that point, the cell open circuit voltage was measured at about 2.8 V with a short cut current of about 5 mA.

Figures 11A, 11B:
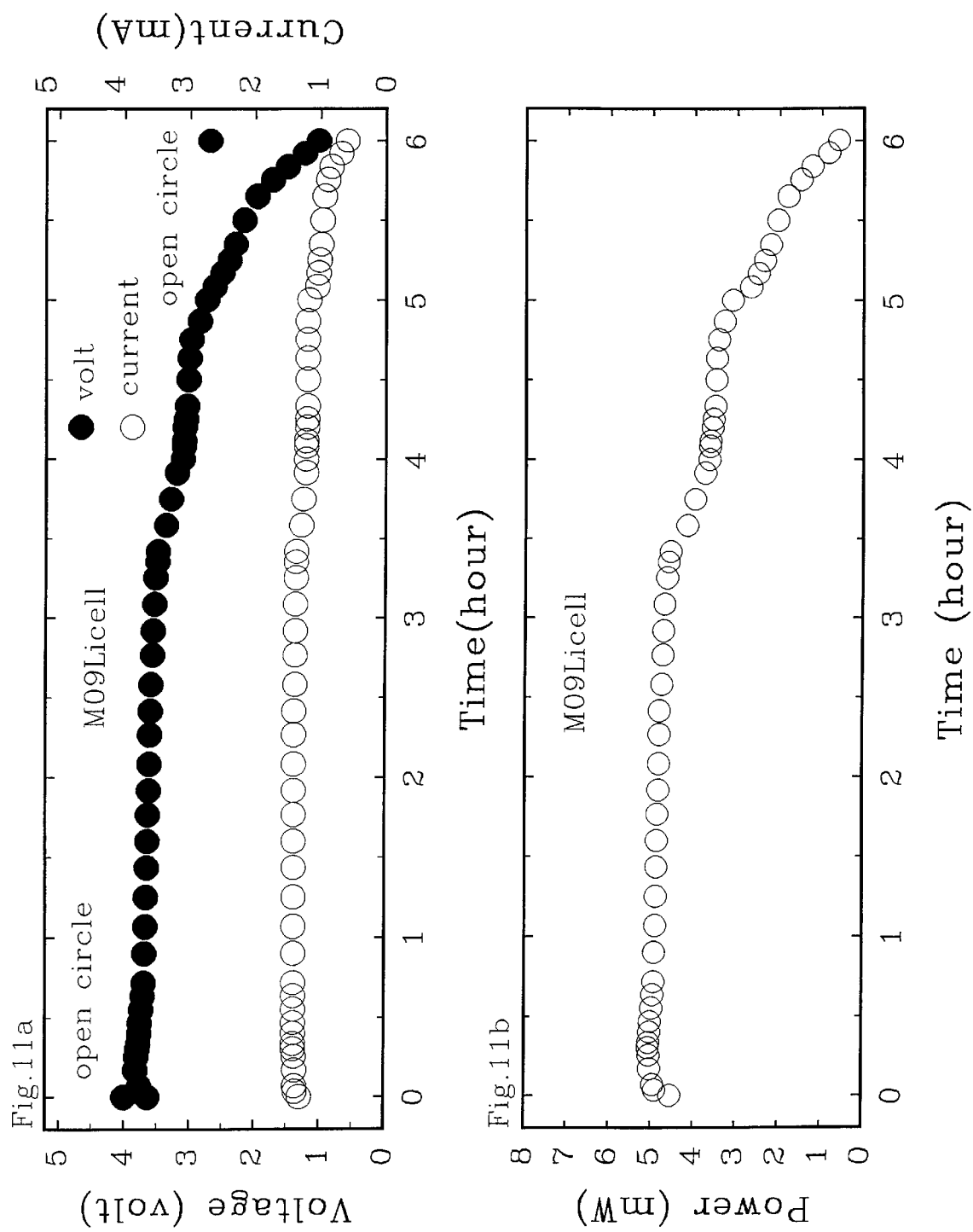
FIG. 11a shows the cell voltage versus time during discharging for Cell B of Example #8.
FIG. 11b shows the cell output power versus time during discharging for the same cell.

FIG. 11a shows the cell voltage versus time during discharging for this cell. FIG. 11b shows the cell output power versus time during discharging. The discharging Coulombic capacity of the cell was determined from the current, time, and weight of the total working electrode active material, i.e., (1.5 mA)(6.2 h)/(0.015 g+0.014 g)=321 mAh/g, where 0.015 g and 0.014 g are the amounts of working electrode active material on the anode and cathode, respectively. The cathode discharging Coulombic capacity was determined from the current, time, and weight of the total working cathode active material, i.e., (1.5 mA)(6.2 h)/(0.014 g)=664 mAh/g.

C. Anode (0.2 g): $0.2LiCl-0.8CaCl_2$
        Cathode (0.173 g): $0.4LiCl-0.48Li_2O-0.12Li_2CO_3$
        Substrate: Carbon-on-nickel
        Electrolyte (14 g): $SOCl_2-0.035LiAlCl_4$
        Size: 50×70 mm This cell has the same cell component materials as Cell A of this Example, but the test cell used herein is larger and employs a jelly-roll design rather than a parallel plate or carbon fiber cluster substrate configuration. For this cell, carbon-on-nickel substrates, 50×70 mm, Type IV (carbon-acetonitrile-PPO slurry) were used for both electrodes. The materials and preparation procedures for this substrate design are described in Part E of Section III (Electrode Substrate Preparations).

An anode consisting of $0.2LiCl-0.8CaCl_2$ was prepared using a solution deposition technique as described above in Part A of Section IV (Electrode Coating Preparations). The starting solution consisted of 2.52 g LiCl and 26.6 g $CaCl_2$ dissolved in 50 ml water. The total amount of salt deposited on the cathode substrate was about 0.2 g. The baking procedure performed between immersions and the final baking and annealing steps were the same as those described for the electrode type $0.2LiCl-0.8CaCl_2$, 4×10 mm, carbon-on-nickel, given in Part A(i) of Section IV (Electrode Coating Preparations).

The cathode for this cell was prepared from start to finish using the same materials and procedures as those given above in Part B(ii) of Section IV (Electrode Coating Preparations) for the electrode type $0.4LiCl-0.48Li_2O-0.12Li_2CO_3$, 4×10 mm, carbon-on-nickel, but with the following modifications: i) the substrate size was 50×70 mm rather than 4×10 mm and ii) the total amount of salt applied to the substrate was about 0.173 g due to the larger substrate size.

A cell was assembled from the above-described cell component materials using the Jelly-roll test cell design. The materials and preparation procedures for this test cell design are described in Part D of Section V (Cell Assembly).

This cell was repeatedly charged and discharged for over 550 hours using a constant current charging and discharging computer program. The charging and discharging currents were set at 120 mA and 25 mA, respectively. The open circuit voltage after charging was 3.2 V, and the cell exhibited a cathode discharging Coulombic capacity of about 370–490 mAh/g throughout.

Figure 12A:
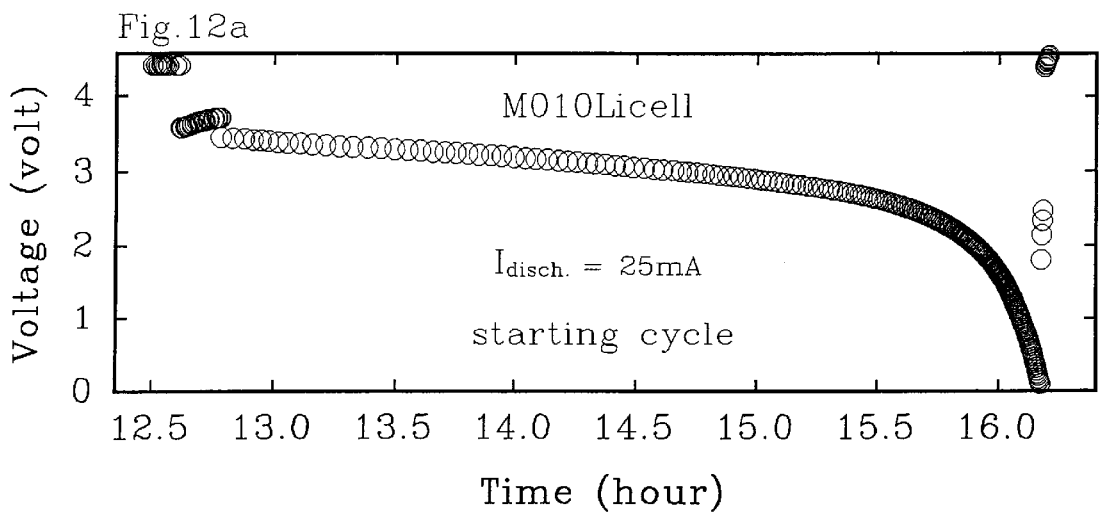
FIGS. 12a–c show the cell voltage versus time during discharging for the first, 50th, and 100th cycles for Cell C of Example #8.
Figure 12B:
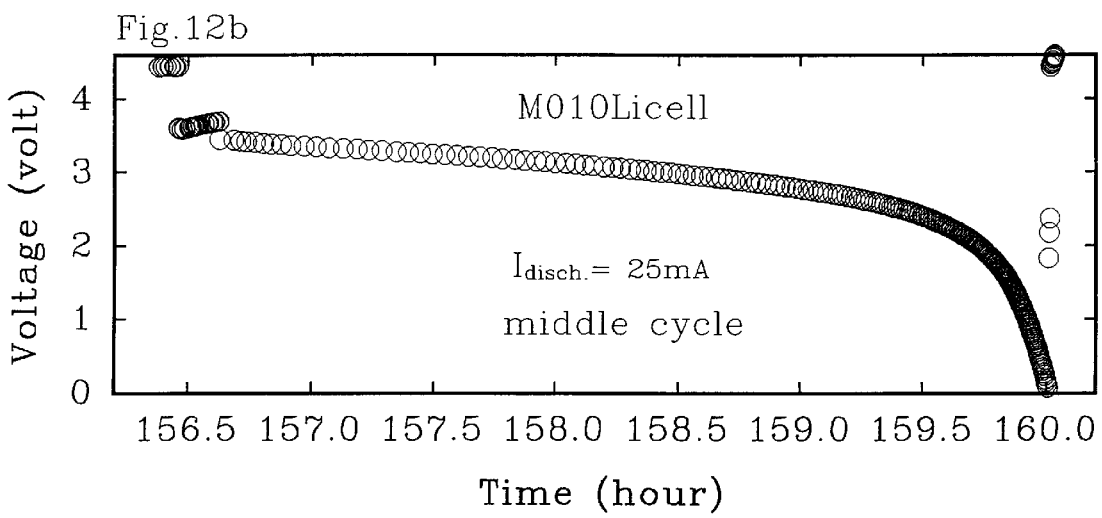
Figure 12C:
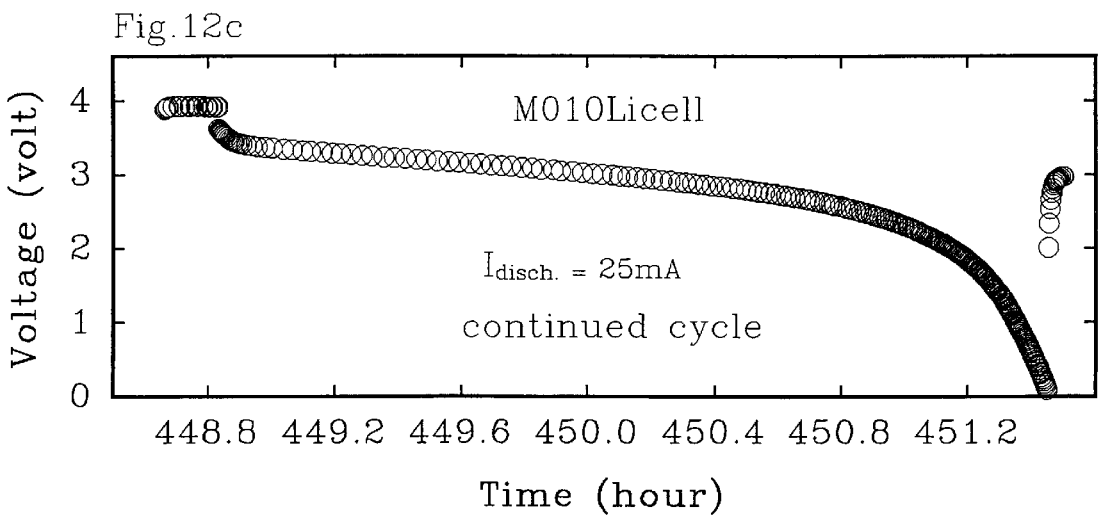

FIGS. 12a–c show the cell output voltage versus time during discharging for the first, 50th, and 100th cycles. For all cycles, discharging was carried out at 25 mA. For the first cycle, the total discharging time was 3.39 hours and the discharging Coulombic capacity of the cell was determined from the current, time, and weight of the total working electrode active material, i.e., (25 mA)(3.39 h)/(0.2 g+0.173 g)=227 mAh/g, were 0.2 g and 0.173 g are the amounts of working electrode active material on the anode and cathode, respectively. The cathode discharging Coulombic capacity was determined from the current, time, and weight of the total working cathode active material, i.e., (25 mA)(3.39 h)/(0.173 g)=490 mAh/g. For this jelly roll design, the total working electrode active material included the material on both sides of the substrates.

For the 50th cycle, the total discharging time was 3.38 hours and the total cell and cathode Coulombic capacities, respectively, were similarly determined at 227 mAh/g and 488 mAh/g.

For the 100th cycle, the total discharging time was 2.62 hours and the total cell and cathode Coulombic capacities, respectively, were similarly determined at 176 mAh/g and 379 mAh/g.

D. Anode (0.2 g): $0.2LiCl-0.8CaCl_2$
        Cathode (0.120 g): $0.4LiCl-0.48Li_2O-0.12Li_2CO_3$
        Substrate: Carbon-on-nickel
        Electrolyte (13 g): $SOCl_2-0.035LiAlCl_4$
        Size: 50×70 mm This cell has the same cell component materials as those Cell A and C of this Example and employs a jelly-roll design. For this cell, carbon on nickel substrates, 50×70 mm, Type V (carbon-acetonitrile-PPO slurry) were used for both electrodes. The materials and preparation procedures for this substrate design are described above in Part F of Section III (Electrode Substrate Preparations). The substrate design employed herein differs from most of the other designs in that it consists of carbon fabric.

Both electrodes for this cell were prepared as described above for Cell C of this example due to the similar substrate size of both cells.

A cell was assembled from the above-described cell component materials using the Jelly-roll test cell design. The materials and preparation procedures for this test cell design are described in Part D of section V (Cell Assembly).

This cell was repeatedly charged and discharged using a constant current charging and discharging computer program. The charging and discharging currents were set at 60 mA and 25 mA, respectively. The open circuit voltage after charging was 3.2 V, and the cell exhibited a cathode discharging Coulombic capacity of about 450 mAh/g throughout. These cell attributes are very similar to those of Cell C of this Example.

EXAMPLE #9

For the cells of this Example, the anode consists of a salt mixture, $x$LiCl+$(1-x)$CaCl$_2$, where $0.2<x<0.95$. The cathode consists of a salt mixture, $x$LiCl+$(1-x)$[$y$Li$_2$O+$(1-y)$Li$_2$CO$_3$], where $0.4<x<0.6$ and $0.6<y<0.9$. Both electrodes are supported on carbon substrates reinforced with nickel metal. The electrolyte may consist of one of $$(1-x)\text{SOCl}_2 + x\text{LiAlCl}_4 + 0.01\text{LiBF}_4 \quad (1)$$

$$(1-x)\text{SO}_2\text{Cl}_2 + x\text{LiAlCl}_4 + 0.01\text{LiBF}_4 \quad (2)$$

$$(1-x)\text{SOCl}_2 + x\text{LiAlCl}_4 + 0.01\text{LiF} \quad (3)$$

$$(1-x)\text{SO}_2\text{Cl}_2 + x\text{LiAlCl}_4 + 0.01\text{LiF} \quad (4)$$

where for all four electrolytes, x may range from about 0.02 to 1.5 and ~1 m % of either LiF or LiBF$_4$ is added to the electrolyte to give it a gelatinous texture. The fabrication procedures and performance characteristics of four representative cells (denoted A through D) using this family of cell component materials are given below.

A. Anode (0.02 g): 0.2LiCl-0.8CaCl$_2$
   Cathode (0.012 g): 0.4LiCl-0.48Li$_2$O-0.12Li$_2$CO$_3$
   Substrate: Carbon-on-nickel
   Electrolyte (in excess): SOCl$_2$-0.035LiAlCl$_4$-0.01LiBF$_4$
   Size: 4×10 mm For this cell, carbon-on-nickel substrates, 4×10 mm, Type III (carbon-PPO paste) were used for both electrodes. The materials and preparation procedures for this substrate design are described above in Part D of Section III (Electrode Substrate Preparations).

An electrode of the type, 0.2LiCl-0.8CaCl$_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

An electrode of the type, 0.4LiCl—0.48Li$_2$O—0.12Li$_2$CO$_3$, 4×10 mm, carbon-on-nickel, prepared by applying the coating as a paste, constituted the cathode for this cell. The materials and preparation procedures for this electrode are described above in detail in Part B(ii) of Section IV (Electrode Coating Preparations). The total amount of salt applied to the substrate was about 0.012 g.

The electrolyte was prepared by dissolving 6.2 g LiAlCl$_4$ and 0.937 g LiBF$_4$ in 120 g SOCl$_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.9 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 1.0 kΩ. The charging process was continued thereafter until the charging current had dropped to 0.03 mA. The total charging time from start to finish was about 3.5 hours.

The open circuit voltage after charging was 3.8 V, and the maximum short cut discharging current was 75 mA. The cell was discharged through an adjustable resistor which was set to 3.2 kΩ so that the initial discharging current was 1.0 mA. After about 6.0 hours, the cell output voltage had dropped to 0.5 V.

B. Anode (0.02 g): 0.2LiCl—0.8CaCl$_2$
   Cathode (0.012 g): 0.4LiCl—0.48Li$_2$O—0.12Li$_2$CO$_3$
   Substrate: Carbon-on-nickel
   Electrolyte (in excess): SO$_2$Cl$_2$—0.035LiAlCl$_4$—0.01LiBF$_4$
   Size: 4×10 mm This cell was fabricated from start to finish using the same materials and procedures as those of Cell A of this Example except that for the electrolyte, SO$_2$Cl$_2$ was substituted for SOCl$_2$. The electrolyte was prepared by dissolving 6.2 g LiAlCl$_4$ and 0.937 g LiBF$_4$ in 136 g SO$_2$Cl$_2$.

This cell was charged in constant-voltage mode by applying a voltage of 4.9 V across the cell in series with an adjustable resistor which was initially set to 2.0 kΩ so that the charging current was 2.5 mA. As charging progressed, this resistor was manually lowered step by step to keep the charging current at about 2.5 mA until it had reached a value of about 1.0 kΩ. The charging process was continued thereafter until the charging current had dropped to 0.03 mA. The total charging time from start to finish was about 3.5 hours.

The open circuit voltage after charging was 3.9 V, and the maximum short cut discharging current was 88 mA. The cell was discharged through an adjustable resistor which was set to 3.3 kΩ so that the initial discharging current was 1.0 mA. After about 8.5 hours, the cell output voltage had dropped to 0.5 V.

C. Anode (0.02 g): 0.2LiCl—0.8CaCl$_2$
   Cathode (0.012 g): 0.4LiCl—0.48Li$_2$O—0.12Li$_2$CO$_3$
   Substrate: Carbon-on-nickel
   Electrolyte (in excess): SOCl$_2$—0.035LiAlCl$_4$—0.01LiF
   Size: 4×10 mm This cell was fabricated from start to finish using the same procedures as those of Cell A of this Example except that for the electrolyte, LiF was substituted for LiBF$_4$. The electrolyte was prepared by dissolving 6.2 g LiAlCl$_4$ and 0.259 g LiF in 120 g SOCl$_2$.

This cell was charged in constant-voltage mode by applying a voltage of 4.8 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 1.0 kΩ. The charging process was continued thereafter until the charging current had dropped to 0.03 mA. The total charging time from start to finish was about 4.0 hours.

The open circuit voltage after charging was 3.8 V, and the maximum short cut discharging current was 85 mA. The cell was discharged through an adjustable resistor which was set to 3.2 kΩ so that the initial discharging current was 1.0 mA. After about 7.8 hours, the cell output voltage had dropped to 0.5 V.

D. Anode (0.02 g): 0.2LiCl—0.8CaCl$_2$
   Cathode (0.012 g): 0.4LiCl—0.48Li$_2$O—0.12Li$_2$CO$_3$
   Substrate: Carbon-on-nickel
   Electrolyte (in excess): SO$_2$Cl$_2$—0.035LiAlCl$_4$—0.01LiF
   Size: 4×10 mm This cell was fabricated from start to finish using the same procedures as those of Cell A of this Example except that for the electrolyte, SO$_2$Cl$_2$ was substituted for SOCl$_2$ and LiF was substituted for LiBF$_4$. The electrolyte was prepared by dissolving 6.2 g LiAlCl$_4$ and 0.259 g LiF in 136 g SO$_2$Cl$_2$.

This cell was charged in constant-voltage mode by applying a voltage of 4.8 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 1.0 kΩ. The charging process was continued thereafter until the charging current had dropped to 0.03 mA. The total charging time from start to finish was about 4.3 hours.

The open circuit voltage after charging was 3.5 V, and the maximum short cut discharging current was 90 mA. The cell was discharged through an adjustable resistor which was set to 2.9 kΩ so that the initial discharging current was 1.0 mA. After about 8.5 hours, the cell output voltage had dropped to 0.5 V.

EXAMPLE #10

For the cells of this Example, the anode consists of carbon. The cathode consists of $Li_2CoO_2$. Both electrodes substrates consist of carbon reinforced by platinum metal. The electrolyte may consist of either $$(1-x)SO_2Cl_2 + xLiAlCl_4 + 0.01LiF \quad (1)$$

$$AlCl_3 + PCl_5 + POCl_3 + 0.1LiAlCl_4 + 0.01LiF \quad (2)$$

where, for both electrolytes, x may range from about 0.02 to 1.5 and about 1 m % LiF is added to impart a gelatinous texture. The fabrication procedures and performance characteristics of two representative cells (denoted A and B) using this family of cell component materials are given below.

A. Anode (0.025 g): Carbon
   Cathode (0.022 g): $Li_2CoO_2$
   Substrate: Carbon-on-platinum
   Electrolyte (in excess): $SO_2Cl_2$—$0.4LiAlCl_4$—$0.01LiF$
   Size: 4×10 mm For this cell, carbon-on-platinum substrates, 4×10 mm, Type I (wound carbon fibers) were used for both electrodes. The materials and preparation procedures for this substrate design are described above in Part B of Section III (Electrode Substrate Preparations).

For the anode substrate, the total weight of wound carbon fibers on the platinum support was about 0.01 g. This carbon constituted the active anode material.

The cathode was prepared as follows. The $Li_2CoO_2$ was prepared by combining 14.8 g $Li_2CO_3$ and 33.17 $CoCl_2$ in a quartz test tube, heating the mixture to 850° C. in air, and holding it for 10 hours. During this heat treatment, the color of the powder mixture (now $Li_2CoO_2$) changed from blue to black. The $Li_2CoO_2$ was cooled to room temperature and crushed to a powder with a mortar and pestle. A paste was made from the $Li_2CoO_2$ powder by combining it with about 0.1 g of the acetonitrile-$01PPO_{8,000,000}$ binder; the preparation of this binder is described in Part B of Section IV (Electrode Coating Preparations). About 0.011 g of the paste was evenly applied to each side of a carbon-on-platinum substrate. The paste was smoothed by squeezing it between a glass roller and a glass plate. The cathode assemblage was placed into Pyrex glass tube, heated to 150° C. in air, and held for two hours. The tube containing the assemblage was then cooled to room temperature, vacuum-sealed, reheated to 600° C., and held for two hours.

The electrolyte was prepared by dissolving 7.0 g $LiAlCl_4$ and 0.259 g LiF in 136 g $SO_2Cl_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 5.2 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.03 mA. The total charging time from start to finish was about 4.3 hours.

The open circuit voltage after charging was 4.0 V, and the maximum short cut discharging current was 75 mA. The cell was discharged through an adjustable resistor which was set to 3.2 kΩ so that the initial discharging current was 1.0 mA. After about 8.5 hours, the cell output voltage had dropped to 0.5 V.

B. Anode (0.025 g): Carbon
   Cathode (0.022 g): $Li_2CoO_2$
   Substrate: Carbon-on-platinum
   Electrolyte (in excess): $AlCl_3$—$PCl_5$—$0.3POCl_3$—$0.1LiAlCl_4$—$0.01LiF$
   Size: 4×10 mm This cell was prepared from start to finish using the same materials and procedures as those of Cell A of this Example except for the electrolyte which was prepared as follows.

An electrolyte with the nominal composition given above was prepared by dissolving 1.75 g $LiAlCl_4$ and 0.26 g LiF into 39 g $AlCl_3$—$PCl_5$—$0.3POCl_3$ solvent and heating this mixture to 80° C. until it had homogenized. The starting $AlCl_3$—$PCl_5$—$0.3POCl_3$ solvent was prepared as described above in Part B(ii) of Section II (Electrolyte Preparations).

This cell was charged in constant-voltage mode by applying a voltage of 4.9 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.03 mA. The total charging time from start to finish was about 4.4 hours.

The open circuit voltage after charging was 3.65 V, and the maximum short cut discharging current was 75 mA. The cell was discharged through an adjustable resistor which was set to 3.1 kΩ so that the initial discharging current was 1.0 mA. After about 8.0 hours, the cell output voltage had dropped to 0.5 V.

EXAMPLE #11

For the cells of this Example, the anode consists of carbon. The cathode consists of $Li_2MnO_2$. Both electrodes substrates consist of carbon reinforced by platinum metal. The electrolyte may consist of either $$(1-x)SO_2Cl_2 + xLiAlCl_4 + 0.01LiF \quad (1)$$

$$AlCl_3 + PCl_5 + POCl_3 + 0.1LiAlCl_4 + 0.01LiF \quad (2)$$

where, for both electrolytes, x may range from about 0.02 to 1.5 and about 1 m % LiF is added to impart a gelatinous texture. The fabrication procedures and performance characteristics of two representative cells (denoted A and B) using this family of cell component materials are given below.

A. Anode (0.025 g): Carbon

Cathode (0.022 g): $Li_2MnO_2$
Substrate: Carbon-on-platinum
Electrolyte (in excess): $SO_2Cl_2$—$0.4LiAlCl_4$—$0.01LiF$
Size: 4×10 mm For this cell, carbon-on-platinum substrates, 4×10 mm, Type I (wound carbon fibers) were used for both electrodes. The materials and preparation procedures for this substrate design are described above in Part B of Section III (Electrode Substrate Preparations).

For the anode substrate, the total weight of wound carbon fibers on the platinum support was about 0.01 g. This carbon constituted the active anode material.

The cathode was prepared as follows. The $Li_2MnO_2$ was prepared by combining 7.4 g $Li_2CO_3$ and 12.5 g $MnCl_2$ in a quartz test tube, heating the mixture to 900° C. in air, and holding it for 10 hours. During this heat treatment, the color of the powder mixture (now $Li_2MnO_2$) changed from pink to black. The $Li_2MnO_2$ was cooled to room temperature and crushed to a powder with a mortar and pestle. A paste was made from the $Li_2MnO_2$ powder by combining it with about 0.1 g of the acetonitrile-$01PPO_{8,000,000}$ binder; the preparation of this binder is described in Part B of Section IV (Electrode Coating Preparations). About 0.011 g of the paste was evenly applied to each side of a carbon-on-platinum substrate. The paste was smoothed by squeezing it between a glass roller and a glass plate. The cathode assemblage was placed into Pyrex glass tube, heated to 150° C. in air, and held for two hours. The tube containing the assemblage was then cooled to room temperature, vacuum-sealed, reheated to 600° C., and held for two hours.

This cell was charged in constant-voltage mode by applying a voltage of 5.0 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.03 mA. The total charging time from start to finish was about 4.0 hours.

The open circuit voltage after charging was 3.85 V, and the maximum short cut discharging current was 65 mA. The cell was discharged through an adjustable resistor which was set to 3.25 kΩ so that the initial discharging current was 1.0 mA. After about 7.8 hours, the cell output voltage had dropped to 0.5 V.

B. Anode (0.025 g): Carbon
Cathode (0.022 g): $Li_2MnO_2$
Substrate: Carbon-on-platinum
Electrolyte (in excess): $AlCl_3$—$PCl_5$—$0.3POCl_3$—$0.1LiAlCl_4$—$0.01LiF$
Size: 4×10 mm This cell was fabricated from start to finish using the same materials and procedures as those of Cell A of this Example except for the electrolyte which was prepared as follows.

The electrolyte was prepared by dissolving 1.75 g $LiAlCl_4$ and 0.26 g LiF into 39 g $AlCl_3$—$PCl_5$—$0.3POCl_3$ solvent and heating this mixture to 80° C. until it had homogenized. The starting $AlCl_3$—$PCl_5$—$0.3POCl_3$ solvent was prepared as described above in Part B(ii) of Section II (Electrolyte Preparations).

This cell was charged in constant-voltage mode by applying a voltage of 5.0 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.03 mA. The total charging time from start to finish was about 4.1 hours.

The open circuit voltage after charging was 3.9 V, and the maximum short cut discharging current was 60 mA. The cell was discharged through an adjustable resistor which was set to 3.3 kΩ so that the initial discharging current was 1.0 mA. After about 8.0 hours, the cell output voltage had dropped to 0.5 V.

EXAMPLE #12

For the cells of this Example, the anode consists of a salt mixture, $xLiCl+(1-x)CaCl_2$, where $0.2<x<0.4$. The cathode consists of a salt mixture, $xLiOCN+(1-x)AlCl_3$, where $0.8<x<0.95$. Both electrodes are supported on carbon fiber cluster substrates. The electrolyte may consist of either (1) $(1-x)SO_2Cl_2+xLiAlCl_4$, where $0.02<x<1.5$, or (2) $AlCl_3+PCl_5+0.3POCl_3+0.1LiAlCl_4$. The fabrication procedures and performance characteristics of two representative cells (denoted A and B) using this family of cell component materials are given below.

A. Anode (0.005 g): $0.2LiCl$—$0.8CaCl_2$
Cathode (0.005 g): $0.9LiOCN$—$0.1AlCl_3$
Substrate: Carbon
Electrolyte (in excess): $SO_2Cl_2$—$0.04LiAlCl_4$
Size: 1.2×10 mm For this cell, the Tiny Cell design was used which is described above in Part A of Section V (Cell Assembly). The materials and preparation procedures for the carbon fiber cluster substrate-lead assemblages used in this test cell design are also given therein.

Electrode active material salt mixtures with nominal compositions as given above were deposited on the carbon fiber cluster substrates from aqueous solutions using the technique described above in Part A of Section IV (Electrode Coating Preparations). About 0.005 g of salt were deposited on each electrode substrate. For the anode, a solution of 8.9 g $CaCl_2$ and 0.85 g LiCl in 10 ml water was used as the starting solution. For the cathode, a solution of 4.4 g LiOCN and 1.3 g $AlCl_3$ in 20 ml water was used. For both electrodes, the baking procedure performed between immersions and the final baking and annealing steps were the same as those described for the electrode type $0.2LiCl$—$0.8CaCl_2$, 4×10 mm, carbon-on-nickel, given in Part A(i) of Section IV (Electrode Coating Preparations).

The electrolyte for this cell was prepared by dissolving 7.0 g $LiAlCl_4$ in 136 g $SO_2Cl_2$.

This cell was charged in constant-voltage mode by applying a voltage of 5.0 V across the cell in series with an adjustable resistor which was initially set to 2.0 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 2.1 hours.

The open circuit voltage after charging was 3.85 V, and the maximum short cut discharging current was 25 mA. The cell was discharged through an adjustable resistor which was set to 5.5 kΩ so that the initial discharging current was 0.6 mA. After about 3.4 hours, the cell output voltage had dropped to 0.5 V.

B. Anode (0.005 g): $0.2LiCl$—$0.8CaCl_2$
Cathode (0.005 g): $0.9LiOCN$—$0.1AlCl_3$
Substrate: Carbon
Electrolyte (in excess): $AlCl_3$—$PCl_5$—$0.3POCl_3$—$0.1LiAlCl_4$ Size: 1.2×10 mm This cell was prepared from start to finish using the same cell materials and fabrication procedures as those of Cell A of this Example except for the electrolyte which was prepared as follows.

The electrolyte was prepared by dissolving 1.75 g $LiAlCl_4$ into 39 g $AlCl_3$—$PCl_5$—$0.3POCl_3$ solvent and heating this mixture to 80° C. until it had homogenized. The starting $AlCl_3$—$PCl_5$—$0.3POCl_3$ solvent was prepared as described above in Part B(ii) of Section II (Electrolyte Preparations).

This cell was charged in constant-voltage mode by applying a voltage of 5.0 V across the cell in series with an adjustable resistor which was initially set to 2.0 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 2.2 hours.

The open circuit voltage after charging was 3.60 V, and the maximum short cut discharging current was 30 mA. The cell was discharged through an adjustable resistor which was set to 5.3 kΩ so that the initial discharging current was 0.6 mA. After about 3.3 hours, the cell output voltage had dropped to 0.5 V.

EXAMPLE #13

For the cells of this Example, the anode consists of a salt mixture, $xLiCl+(1-x)CaCl_2$, where $0.2<x<0.4$. The cathode consists of a salt mixture, $xLiSCN+(1-x)AlCl_3$, where $0.8<x<0.95$. Both electrodes are supported on carbon fiber cluster substrates. The electrolyte may consist of either (1) $(1-x)SO_2Cl_2+xLiAlCl_4$, where $0.02<x<1.5$, or (2) $AlCl_3+PCl_5+0.3POCl_3+0.1LiAlCl_4$. The fabrication procedures and performance characteristics of two representative cells (denoted A and B) using this family of cell component materials are given below.

A. Anode (0.005 g): $0.2LiCl$—$0.8CaCl_2$
  Cathode (0.005 g): $0.9LiSCN$—$0.1AlCl_3$
  Substrate: Carbon
  Electrolyte (in excess): $SO_2Cl_2$—$0.04LiAlCl_4$
  Size: 1.2×10 mm For this cell, the Tiny Cell design was used which is described above in Part A of Section V (Cell Assembly). The materials and preparation procedures for the carbon fiber cluster substrate-lead assemblages used in this test cell design are also given therein.

Electrode active material salt mixtures with nominal compositions as given above were deposited on the carbon fiber cluster substrates from aqueous solutions using the technique described above in Part A of Section IV (Electrode Coating Preparations). About 0.005 g of salt were deposited on each electrode substrate. For the anode, a solution of 8.9 g $CaCl_2$ and 0.85 g LiCl in 10 ml water was used as the starting solution. The baking procedure performed between immersions and the final baking and annealing steps were the same as those described for the electrode type $0.2LiCl$—$0.8CaCl_2$, 4×10 mm, carbon-on-nickel, given in Part A(i) of Section IV (Electrode Coating Preparations).

For the cathode, a starting solution of 6.2 g LiSCN and 1.3 g $AlCl_3$ in 20 ml water was used. The baking procedure used between immersions consisted of heating the cathode assemblage in vacuum to 100° C., holding for five hours, cooling to room temperature, placing the assemblage in a vacuum-sealed Pyrex glass tube, heating to 250° C., and holding for five hours. The final heat treatment consisted of placing the assemblage in a vacuum-sealed Pyrex glass tube, heating to 320° C., and holding for 30 minutes.

The electrolyte for this cell was prepared by dissolving 7.0 g $LiAlCl_4$ in 136 g $SO_2Cl_2$.

This cell was charged in constant-voltage mode by applying a voltage of 5.0 V across the cell in series with an adjustable resistor which was initially set to 2.0 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.7 hours.

The open circuit voltage after charging was 3.65 V, and the maximum short cut discharging current was 25 mA. The cell was discharged through an adjustable resistor which was set to 5.2 kΩ so that the initial discharging current was 0.6 mA. After about 2.6 hours, the cell output voltage had dropped to 0.5 V.

B. Anode (0.005 g): $0.2LiCl$—$0.8CaCl_2$
  Cathode (0.005 g): $0.9LiSCN$—$0.1AlCl_3$
  Substrate: Carbon
  Electrolyte (in excess): $AlCl_3$—$PCl_5$—$0.3POCl_3$—$0.1LiAlCl_4$
  Size: 1.2×10 mm This cell was prepared from start to finish using the same cell materials and fabrication procedures as those of Cell A of this Example except for the electrolyte which was prepared as follows.

The electrolyte was prepared by dissolving 1.75 g $LiAlCl_4$ into 39 g $AlCl_3$—$PCl_5$—$0.3POCl_3$ solvent and heating this mixture to 80° C. until it had homogenized. The starting $AlCl_3$—$PCl_5$—$0.3POCl_3$ solvent was prepared as described above in Part B(ii) of Section II (Electrolyte Preparations).

This cell was charged in constant-voltage mode by applying a voltage of 4.6 V across the cell in series with an adjustable resistor which was initially set to 2.0 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.6 hours.

The open circuit voltage after charging was 3.50 V, and the maximum short cut discharging current was 20 mA. The cell was discharged through an adjustable resistor which was set to 5.0 kΩ so that the initial discharging current was 0.6 mA. After about 2.5 hours, the cell output voltage had dropped to 0.5 V.

EXAMPLE #14

For the cells of this Example, the anode consists of a salt mixture, $xLiCl+(1-x)CaCl_2$, where $0.2<x<0.4$. The cathode consists of a salt mixture, $xLiClO_4+(1-x)AlCl_3$, where $0.8<x<0.95$. Both electrodes are supported on carbon fiber cluster substrates. The electrolyte may consist of either (1) $(1-x)SO_2Cl_2+xLiAlCl_4$, where $0.02<x<1.5$, or (2) $AlCl_3+PCl_5+0.3POCl_3+0.1LiAlCl_4$. The fabrication procedures and performance characteristics of two representative cells (denoted A and B) using this family of cell component materials are given below.

A. Anode (0.01 g): $0.2LiCl$—$0.8CaCl_2$
  Cathode (0.01 g): $0.9LiClO_4$—$0.1AlCl_3$ Substrate: Carbon
Electrolyte (in excess): $SO_2Cl_2$—$0.04LiAlCl_4$
Size: 1.2×10 mm For this cell, the Tiny Cell design was used which is described above in Part A of Section V (Cell Assembly). The materials and preparation procedures for the carbon fiber cluster substrate-lead assemblages used in this test cell design are also given therein.

Electrode active material salt mixtures with nominal compositions as given above were deposited on the carbon fiber cluster substrates from aqueous solutions using the technique described above in Part A of Section IV (Electrode Coating Preparations). About 0.01 g of salt were deposited on each electrode substrate. For the anode, a solution of 8.9 g $CaCl_2$ and 0.85 g LiCl in 10 ml water was used as the starting solution. For the cathode, a solution of 4.6 g $LiClO_4$ and 0.6 g $AlCl_3$ in 5 ml water was used. For both electrodes, the baking procedure performed between immersions and the final baking and annealing steps were the same as those described for the electrode type $0.2LiCl$—$0.8CaCl_2$, 4×10 mm, carbon-on-nickel, given in Part A(i) of Section IV (Electrode Coating Preparations).

The electrolyte for this cell was prepared by dissolving 7.0 g $LiAlCl_4$ in 136 g $SO_2Cl_2$.

This cell was charged in constant-voltage mode by applying a voltage of 4.9 V across the cell in series with an adjustable resistor which was initially set to 2.0 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.9 hours.

The open circuit voltage after charging was 3.8 V, and the maximum short cut discharging current was 80 mA. The cell was discharged through an adjustable resistor which was set to 6.2 kΩ so that the initial discharging current was 0.5 mA. After about 3.5 hours, the cell output voltage had dropped to 0.5 V.

B. Anode (0.01 g): $0.2LiCl$—$0.8CaCl_2$
Cathode (0.01 g): $0.9LiClO_4$—$0.1AlCl_3$
Substrate: Carbon
Electrolyte (in excess): $AlCl_3$—$PCl_5$—$0.3POCl_3$—$0.1LiAlCl_4$
Size: 1.2×10 mm This cell was prepared from start to finish using the same cell materials and fabrication procedures as those of Cell A of this Example except for the electrolyte which was prepared as follows.

The electrolyte was prepared by dissolving 1.75 g $LiAlCl_4$ into 39 g $AlCl_3$—$PCl_5$—$0.3POCl_3$ solvent and heating this mixture to 80° C. until it had homogenized. The starting $AlCl_3$—$PCl_5$—$0.3POCl_3$ solvent was prepared as described above in Part B(ii) of Section II (Electrolyte Preparations).

This cell was charged in constant-voltage mode by applying a voltage of 4.9 V across the cell in series with an adjustable resistor which was initially set to 2.0 kΩ so that the charging current was 1.0 mA. As charging progressed, this resistor was manually lowered step by step to keep the charging current at about 1 mA until it had reached a value of about 1.0 kΩ. The charging process was continued thereafter until the charging current had dropped to 0.01 mA. The total charging time from start to finish was about 1.9 hours.

The open circuit voltage after charging was 3.9 V, and the maximum short cut discharging current was 85 mA. The cell was discharged through an adjustable resistor which was set to 6.2 kΩ so that the initial discharging current was 0.5 mA. After about 3.4 hours, the cell output voltage had dropped to 0.5 V.

EXAMPLE #15

For the cells of this Example, the anode consists of carbon in a carbon-containing substrate. The cathode consists of a salt mixture, $0.8Li_2O$—$0.2Li_2CO_3$. Both electrodes substrates consist of carbon reinforced with nickel metal. The electrolyte may consist of either (1) $(1-x)SOCl_2+xLiAlCl_4$ or (2) $(1-x)SO_2Cl_2+xLiAlCl_4$, where $0.02<x<1.5$. The fabrication procedures and performance characteristics of two representative cells (denoted A and B) using this family of cell component materials are given below.

A. Anode (0.02 g): Carbon
Cathode (0.01 g): $0.8Li_2O$—$0.2Li_2CO_3$
Substrate: Carbon-on-nickel
Electrolyte (in excess): $SOCl_2$—$0.04LiAlCl_4$
Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

For the anode, the 0.005 g of carbon on the substrate constituted the anode active material.

An electrode of the type, $0.8Li_2O$—$0.2Li_2CO_3$, 4×10 mm, carbon-on-nickel, prepared by applying the coating as a paste, constituted the cathode for this cell. The materials and preparation procedures for this electrode are described above in detail in Part B(i) of Section IV (Electrode Coating Preparations). The total amount of salt applied to the substrate was about 0.01 g.

The electrolyte was prepared by dissolving 7.0 g $LiAlCl_4$ in 120 g $SOCl_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.5 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.03 mA. The total charging time from start to finish was about 3.5 hours.

The open circuit voltage after charging was 3.6 V, and the maximum short cut discharging current was 65 mA. The cell was discharged through an adjustable resistor which was set to 3.0 kΩ so that the initial discharging current was 1.0 mA. After about 7.0 hours, the cell output voltage had dropped to 0.5 V.

B. Anode (0.02 g): Carbon
Cathode (0.01 g): $0.8Li_2O$—$0.2Li_2CO_3$
Substrate: Carbon-on-nickel
Electrolyte (in excess): $SO_2Cl_2$—$0.04LiAlCl_4$
Size: 4×10 mm This cell was prepared from start to finish using the same materials and procedures as those of Cell A of this Example except that $SO_2Cl_2$ was substituted for $SOCl_2$ in the electrolyte. The electrolyte was prepared by dissolving 7.0 g $LiAlCl_4$ into 136 g $SO_2Cl_2$.

This cell was charged in constant-voltage mode by applying a voltage of 4.6 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.03 mA. The total charging time from start to finish was about 3.4 hours.

The open circuit voltage after charging was 3.65 V, and the maximum short cut discharging current was 75 mA. The cell was discharged through an adjustable resistor which was set to 3.1 kΩ so that the initial discharging current was 1.0 mA. After about 6.8 hours, the cell output voltage had dropped to 0.5 V.

EXAMPLE #16

For the cells of this Example, the anode consists of a salt mixture, $xLiCl+(1-x)CaCl_2$, where $0.2<x<0.95$. The cathode consists of mixture of $Li_2S$ and carbon. Both electrodes are supported on or carbon-on-nickel substrates. The electrolyte may consist of one of $$(1-x)SOCl_2+xLiAlCl_4 \qquad (1)$$

$$(1-x)SO_2Cl_2+xLiAlCl_4 \qquad (2)$$

$$AlCl_3+PCl_5+0.3PCl_3+0.05LiAlCl_4 \qquad (3)$$

where $0.02<x<1.5$ for electrolytes (1) and (2). The fabrication procedures and performance characteristics of three representative cells (denoted A through C) using this family of cell component materials are given below.

A. Anode (0.02 g): $0.2LiCl$—$0.8CaCl_2$
   Cathode (0.025 g): $Li_2S$—C
   Substrate: Carbon
   Electrolyte (in excess): $SOCl_2$—$0.04LiAlCl_4$
   Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

An electrode of the type, $0.2LiCl$—$0.8CaCl_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

A cathode containing a mixture of $Li_2S$ and carbon as electrode active materials was prepared as follows. The starting $Li_2S$ was ground to a fine powder with a mortar and pestle. A paste was made by combining 4.6 g $Li_2S$ with 2.0 g of a polypropylene oxide-acetonitrile binder. This binder was made in 100 g lots by combining 50 g polypropylene oxide with a molecular weight of about 4,000 g/mole (i.e., $PPO_{4,000}$) and 50 g acetonitrile. About 0.012–0.013 g of this $Li_2S$-$PPO_{4,000}$ paste was applied evenly to each side of a carbon-nickel substrate which was then squeezed between a glass roller and a glass plate. The cathode assemblage was placed into a Pyrex glass tube, heated to 150° C. in air, and held for two hours. The tube containing the assemblage was then cooled to room temperature, vacuum-sealed, reheated to 600° C., held for two hours, and cooled slowly to room temperature.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.6 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.03 mA. The total charging time from start to finish was about 3.6 hours.

The open circuit voltage after charging was 3.2 V, and the maximum short cut discharging current was 70 mA. The cell was discharged through an adjustable resistor which was set to 2.7 kΩ so that the initial discharging current was 1.0 mA. After about 7.2 hours, the cell output voltage had dropped to 0.5 V.

B. Anode (0.002 g): $0.2LiCl$—$0.8CaCl_2$
   Cathode (0.002 g): $Li_2S$—C
   Substrate: Carbon
   Electrolyte (in excess): $SO_2Cl_2$—$0.04LiAlCl_4$
   Size: 4×10 mm For this cell, the Tiny Cell design was used which is described above in Part A of Section V (Cell Assembly). The materials and preparation procedures for the carbon fiber cluster substrate-lead assemblages used in this test cell design are also given therein.

An anode active material salt mixture with the nominal composition given above was deposited on the carbon fiber cluster substrate from solution as described above in Part A of Section III (Electrode Substrate Preparations). About 0.002 g of salt was deposited on the anode substrate. For the anode, a solution of 8.9 g $CaCl_2$ and 0.85 g $LiCl$ in 10 ml water was used as the starting solution. The baking procedure performed between immersions and the final baking and annealing steps were the same as those described for the electrode type $0.2LiCl$—$0.8CaCl_2$, 4×10 mm, carbon-on-nickel, given in Part A(i) of Section IV (Electrode Coating Preparations).

For the cathode, about 0.002 g of a paste consisting of a $Li_2S$-carbon mixture was applied to a carbon fiber cluster substrate. This paste was prepared from start to finish using the same materials and procedures as those of Cell A of this Example. The subsequent heat treatment was also the same as that of Cell A of this Example.

The electrolyte was prepared by dissolving 7.0 g $LiAlCl_4$ in 136 g $SO_2Cl_2$.

This cell was charged in constant-voltage mode by applying a voltage of 4.6 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 1.0 kΩ. The charging process was continued thereafter until the charging current had dropped to 0.03 mA. The total charging time from start to finish was about 3.4 hours.

The open circuit voltage after charging was 3.3 V, and the maximum short cut discharging current was 80 mA. The cell was discharged through an adjustable resistor which was set to 2.9 kΩ so that the initial discharging current was 1.0 mA. After about 6.8 hours, the cell output voltage had dropped to 0.5 V.

C. Anode (0.002 g): $0.2LiCl$—$0.8CaCl_2$
   Cathode (0.002 g): $Li_2S$—C
   Substrate: Carbon
   Electrolyte (in excess): $AlCl_3$—$PCl_5$—$0.3PCl_3$—$0.05LiAlCl_4$
   Size: 1.2×10 mm This cell was prepared from start to finish using the same materials and procedures as those of Cell B of this Example except for the electrolyte which was prepared as follows.

The electrolyte was prepared by dissolving 0.875 g LiAlCl$_4$ into 38 g AlCl$_3$—PCl$_5$—0.3PCl$_3$ solvent and heating this mixture to 80° C. until it had homogenized. The starting AlCl$_3$—PCl$_5$— 0.3PCl$_3$ solvent was prepared as described above in Part B(i) of Section II (Electrolyte Preparations).

This cell was charged in constant-voltage mode by applying a voltage of 4.4 V across the cell in series with an adjustable resistor which was initially set to 2.0 kΩ so that the charging current was 2.5 mA. As charging progressed, this resistor was manually lowered step by step to keep the charging current at about 2.5 mA until it had reached a value of about 150 Ω. The charging process was continued thereafter until the charging current had dropped to 0.03 mA. The total charging time from start to finish was about 2.0 hours.

The open circuit voltage after charging was 2.7 V, and the maximum short cut discharging current was 85 mA. The cell was discharged through an adjustable resistor which was set to 2.2 kΩ so that the initial discharging current was 1.0 mA. After about 5.0 hours, the cell output voltage had dropped to 0.5 V.

EXAMPLE #17

For the cells of this Example, the anode consists of a salt mixture, xLiCl+(1−x)CaCl$_2$, where 0.2<x<0.5. The cathode consists of mixture of Li$_2$O and carbon. Both electrodes are supported on substrates of carbon reinforced with nickel. The electrolyte solvent may consist of any composition within the room temperature liquid phase region of any one of the following ternaries: (1) AlCl$_3$+PCl$_5$+PCl$_3$; (2) AlCl$_3$+PCl$_5$+POCl$_3$; (3) AlCl$_3$+PCl$_5$+PSCl$_3$. To impart a high Li$^+$ ionic conductivity to the electrolyte, LiAlCl$_4$ is added at a concentration of about 10 m %.

The fabrication procedures and performance characteristics of two representative cells (denoted A through B) using this family of cell component materials are given below.

A. Anode (0.02 g): 0.2LiCl—0.8CaCl$_2$
Cathode (0.008 g): Li$_2$O—C
Substrate: Carbon-on-nickel
Electrolyte (in excess): AlCl$_3$—PCl$_5$—0.3PCl$_3$—0.1LiAlCl$_4$
Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

An electrode of the type, 0.2LiCl—0.8CaCl$_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

A cathode was prepared as follows. The Li$_2$O-carbon mixture was prepared by combining 9.6 g LiOH and 2.0 g polypropylene oxide with a molecular weight of 4,000 (i.e., PPO$_{4000}$). This mixture was placed in a quartz test tube, heated in air to 200° C., held for two hours, heated thereafter at 5° C./minute to 800° C., held for 30 minutes, and cooled to room temperature. This hard solid mixture of Li$_2$O and carbon was ground to a fine powder with a mortar and pestle and mixed with 1.0 g PPO$_{4000}$ to form a paste. Each side of a carbon-on-nickel substrate was coated with about 0.004 g Li$_2$O-carbon paste which was smoothed by squeezing between a glass roller and glass plate. This cathode assemblage was placed in a large glass test tube with the open end stuffed with glass paste paper, heated in argon at 5° C./minute from 100° C. to 250° C., and held for four hours in argon. This assemblage was heated thereafter in argon at 5° C./minute to 500° C. and held for four hours.

The electrolyte was prepared by dissolving 1.75 g LiAlCl$_4$ into 38 g AlCl$_3$—PCl$_5$—0.3PCl$_3$ solvent and heating this mixture to 80° C. until it had homogenized. The starting AlCl$_3$—PCl$_5$— 0.3PCl$_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.5 V across the cell in series with an adjustable resistor which was initially set to 2.4 kΩ so that the charging current was 1.5 mA. As charging progressed, this resistor was manually lowered step by step to keep the charging current at about 1.5 mA until it had reached a value of about 500 Ω. The charging process was continued thereafter until the charging current had dropped to 0.05 mA. The total charging time from start to finish was about 4.7 hours.

The open circuit voltage after charging was 3.15 V, and the maximum short cut discharging current was 50 mA. The cell was discharged through an adjustable resistor which was set to 3.3 kΩ so that the initial discharging current was 0.8 mA. After about 7.4 hours, the cell output voltage had dropped to 0.5 V.

B. Anode (0.02 g): 0.2LiCl—0.8CaCl$_2$
Cathode (0.008 g): Li$_2$O—C
Substrate: Carbon-on-nickel
Electrolyte (in excess): AlCl$_3$—PCl$_5$—0.3POCl$_3$—0.1LiAlCl$_4$
Size: 4×10 mm This cell was prepared from start to finish using the same materials and procedures as those of Cell A of this Example except for the electrolyte which was prepared as follows.

The electrolyte was prepared by dissolving 1.75 g LiAlCl$_4$ into 39 g AlCl$_3$—PCl$_5$—0.3POCl$_3$ solvent and heating this mixture to 80° C. until it had homogenized. The starting AlCl$_3$—PCl$_5$— 0.3POCl$_3$ solvent was prepared as described above in Part B(ii) of Section II (Electrolyte Preparations).

This cell was charged in constant-voltage mode by applying a voltage of 4.4 V across the cell in series with an adjustable resistor which was initially set to 2.4 kΩ so that the charging current was 1.5 mA. As charging progressed, this resistor was manually lowered step by step to keep the charging current at about 1.5 mA until it had reached a value of about 500 Ω. The charging process was continued thereafter until the charging current had dropped to 0.05 mA. The total charging time from start to finish was about 4.9 hours.

The open circuit voltage after charging was 3.20 V, and the maximum short cut discharging current was 55 mA. The cell was discharged through an adjustable resistor which was set to 3.2 kΩ so that the initial discharging current was 0.8 mA. After about 7.6 hours, the cell output voltage had dropped to 0.5 V.

EXAMPLE #18

For the cells of this Example, the anode consists of a salt mixture, xLiCl+(1−x)CaCl$_2$, where 0.2<x<0.5. The cathode consists of mixture of Li$_2$S and carbon. The electrodes are supported on substrates of carbon reinforced with nickel. The electrolyte solvent may consist of any composition within the room temperature liquid phase region of any one of the following ternaries: (1) $AlCl_3+PCl_5+PCl_3$; (2) $AlCl_3+PCl_5+POCl_3$; (3) $AlCl_3+PCl_5+PSCl_3$. To impart a high $Li^+$ ionic conductivity to the electrolyte, $LiAlCl_4$ is added at a concentration of about 10 m %.

The fabrication procedures and performance characteristics of three representative cells (denoted A through C) using this family of cell component materials are given below.

A. Anode (0.02 g): $0.2LiCl-0.8CaCl_2$
   Cathode (0.012 g): $Li_2S-C$
   Substrate: Carbon-on-nickel
   Electrolyte (in excess): $AlCl_3-PCl_5-0.3PCl_3-0.1LiAlCl_4$
   Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

An electrode of the type, $0.2LiCl-0.8CaCl_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

A cathode containing a mixture of $Li_2S$ and carbon as electrode active materials was prepared as follows. The starting $Li_2S$ was ground to a fine powder with a mortar and pestle. A paste was made by combining 4.6 g $Li_2S$ with 2.0 g of a polypropylene oxide-acetonitrile binder. This binder was made in 100 g lots by combining 50 g polypropylene oxide with a molecular weight of about 4,000 g/mole (i.e., $PPO_{4,000}$) and 50 g acetonitrile. About 0.006 g of this $Li_2S-PPO_{4,000}$ paste was applied evenly to each side of a carbon-nickel substrate which then squeezed between a glass roller and a glass plate. The cathode assemblage was placed into a Pyrex glass tube, heated to 150° C. in air, and held for two hours. The tube containing the assemblage was then cooled to room temperature, vacuum-sealed, reheated to 600° C., held for two hours, and cooled slowly to room temperature.

The electrolyte was prepared by dissolving 1.75 g $LiAlCl_4$ into 38 g $AlCl_3-PCl_5-0.3PCl_3$ solvent and heating this mixture to 80° C. until it had homogenized. The starting $AlCl_3-PCl_5-0.3PCl_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.3 V across the cell in series with an adjustable resistor which was initially set to 1.8 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.05 mA. The total charging time from start to finish was about 4.4 hours.

The open circuit voltage after charging was 2.5 V, and the maximum short cut discharging current was 45 mA. The cell was discharged through an adjustable resistor which was set to 2.4 kΩ so that the initial discharging current was 0.8 mA. After about 7.1 hours, the cell output voltage had dropped to 0.5 V.

B. Anode (0.02 g): $0.2LiCl-0.8CaCl_2$
   Cathode (0.012 g): $Li_2S-C$
   Substrate: Carbon-on-nickel
   Electrolyte (in excess): $AlCl_3-PCl_5-0.3POCl_3-0.1LiAlCl_4$
   Size: 4×10 mm This cell was prepared from start to finish using the same materials and procedures as those of Cell A of this Example except for the electrolyte which was prepared as follows.

The electrolyte was prepared by dissolving 1.75 g $LiAlCl_4$ into 39 g $AlCl_3-PCl_5-0.3POCl_3$ solvent and heating this mixture to 80° C. until it had homogenized. The starting $AlCl_3-PCl_5-0.3POCl_3$ solvent was prepared as described above in Part B(ii) of Section II (Electrolyte Preparations).

This cell was charged in constant-voltage mode by applying a voltage of 4.2 V across the cell in series with an adjustable resistor which was initially set to 1.8 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.05 mA. The total charging time from start to finish was about 5.0 hours.

The open circuit voltage after charging was 3.25 V, and the maximum short cut discharging current was 50 mA. The cell was discharged through an adjustable resistor which was set to 3.1 kΩ so that the initial discharging current was 0.8 mA. After about 6.8 hours, the cell output voltage had dropped to 0.5 V.

C. Anode (0.02 g): $0.2LiCl-0.8CaCl_2$
   Cathode (0.012 g): $Li_2S-C$
   Substrate: Carbon-on-nickel
   Electrolyte (in excess): $AlCl_3-PCl_5-0.3PSCl_3-0.1LiAlCl_4$
   Size: 4×10 mm This cell was prepared from start to finish using the same materials and procedures as those of Cell A of this Example except for the electrolyte which was prepared as follows.

An electrolyte with the nominal composition given above was prepared by dissolving 1.75 g $LiAlCl_4$ into 39 g $AlCl_3-PCl_5-0.3PSCl_3$ solvent and heating this mixture to 80° C. until it had homogenized. The starting $AlCl_3-PCl_5-0.3PSCl_3$ solvent was prepared as described above in Part B(ii) of Section II (Electrolyte Preparations).

This cell was charged in constant-voltage mode by applying a voltage of 4.4 V across the cell in series with an adjustable resistor which was initially set to 1.9 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.05 mA. The total charging time from start to finish was about 4.5 hours.

The open circuit voltage after charging was 3.20 V, and the maximum short cut discharging current was 55 mA. The cell was discharged through an adjustable resistor which was set to 3.1 kΩ so that the initial discharging current was 0.8 mA. After about 7.1 hours, the cell output voltage had dropped to 0.5 V.

EXAMPLE #19

For the cells of this Example, the anode consists of a salt mixture, $xLiCl+(1-x)CaCl_2$, where $0.2<x<0.5$. The cathode consists of the mixture, $xLi_2O+(1-x)Li_2CO_3$, where $0.6<x<0.9$. The electrodes are supported on substrates of carbon reinforced with nickel. The electrolyte solvent may consist of any composition within the room temperature liquid phase region of any one of the following ternaries: (1) $AlCl_3+PCl_5+PCl_3$; (2) $AlCl_3+PCl_5+POCl_3$; (3) $AlCl_3+PCl_5+PSCl_3$. To impart a high $Li^+$ ionic conductivity to the electrolyte, $LiAlCl_4$ is added at a concentration of about 10 m %.

The fabrication procedures and performance characteristics of three representative cells (denoted A through C) using this family of cell component materials are given below.

A. Anode (0.02 g): $0.2LiCl—0.8CaCl_2$
  Cathode (0.001 g): $0.8Li_2O—0.2Li_2CO_3$
  Substrate: Carbon-on-nickel
  Electrolyte (in excess): $AlCl_3—PCl_5—0.3PCl_3—0.1LiAlCl_4$
  Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

An electrode of the type, $0.2LiCl—0.8CaCl_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

An electrode of the type, $0.8Li_2O—0.2Li_2CO_3$, 4×10 mm, carbon-on-nickel, prepared by applying the coating as a paste, constituted the cathode for this cell. The materials and preparation procedures for this electrode are described above in detail in Part B(i) of Section IV (Electrode Coating Preparations). The total amount of salt applied to the substrate was about 0.001 g.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.6 V across the cell in series with an adjustable resistor which was initially set to 2.6 kΩ so that the charging current was 1.5 mA. As charging progressed, this resistor was manually lowered step by step to keep the charging current at about 1.5 mA until it had reached a value of about 500 Ω. The charging process was continued thereafter until the charging current had dropped to 0.03 mA. The total charging time from start to finish was about 5.0 hours.

The open circuit voltage after charging was 3.25 V, and the maximum short cut discharging current was 45 mA. The cell was discharged through an adjustable resistor which was set to 3.4 kΩ so that the initial discharging current was 0.8 mA. After about 6.5 hours, the cell output voltage had dropped to 0.5 V.

B. Anode (0.02 g): $0.2LiCl—0.8CaCl_2$
  Cathode (0.001 g): $0.8Li_2O—0.2Li_2CO_3$
  Substrate: Carbon-on-nickel
  Electrolyte (in excess): $AlCl_3—PCl_5—0.3POCl_3—0.1LiAlCl_4$
  Size: 4×10 mm This cell was prepared from start to finish using the same materials and procedures as those of Cell A of this Example except for the electrolyte which was prepared as follows.

The electrolyte was prepared by dissolving 1.75 g $LiAlCl_4$ in 39 g $AlCl_3—PCl_5—0.3POCl_3$ solvent and heating this mixture to 80° C. until it had homogenized. The starting $AlCl_3—PCl_5—0.3POCl_3$ solvent was prepared as described above in Part B(ii) of Section II (Electrolyte Preparations).

This cell was charged in constant-voltage mode by applying a voltage of 4.6 V across the cell in series with an adjustable resistor which was initially set to 2.6 kΩ so that the charging current was 1.5 mA. As charging progressed, this resistor was manually lowered step by step to keep the charging current at about 1.5 mA until it had reached a value of about 500 Ω. The charging process was continued thereafter until the charging current had dropped to 0.03 mA. The total charging time from start to finish was about 5.4 hours.

The open circuit voltage after charging was 3.25 V, and the maximum short cut discharging current was 45 mA. The cell was discharged through an adjustable resistor which was set to 3.4 kΩ so that the initial discharging current was 0.8 mA. After about 7.8 hours, the cell output voltage had dropped to 0.5 V.

C. Anode (0.02 g): $0.2LiCl—0.8CaCl_2$
  Cathode (0.001 g): $0.8Li_2O—0.2Li_2CO_3$
  Substrate: Carbon-on-nickel
  Electrolyte (in excess): $AlCl_3—PCl_5—0.3PSCl_3—0.1LiAlCl_4$
  Size: 4×10 mm This cell was prepared from start to finish using the same materials and procedures as those of Cell A of this Example except for the electrolyte which was prepared as follows.

The electrolyte was prepared by dissolving 1.75 g $LiAlCl_4$ into 39 g $AlCl_3—PCl_5—0.3PSCl_3$ solvent and heating this mixture to 80° C. until it had homogenized. The starting $AlCl_3—PCl_5—0.3PSCl_3$ solvent was prepared as described above in Part B(ii) of Section II (Electrolyte Preparations).

This cell was charged in constant-voltage mode by applying a voltage of 4.5 V across the cell in series with an adjustable resistor which was initially set to 2.6 kΩ so that the charging current was 1.5 mA. As charging progressed, this resistor was manually lowered step by step to keep the charging current at about 1.5 mA until it had reached a value of about 500 Ω. The charging process was continued thereafter until the charging current had dropped to 0.03 mA. The total charging time from start to finish was about 5.1 hours.

The open circuit voltage after charging was 3.25 V, and the maximum short cut discharging current was 40 mA. The cell was discharged through an adjustable resistor which was set to 3.5 kΩ so that the initial discharging current was 0.8 mA. After about 7.6 hours, the cell output voltage had dropped to 0.5 V.

EXAMPLE #20

For the cells of this Example, the anode consists of a salt mixture, $xLiCl+(1-x)CaCl_2$, where $0.2<x<0.5$. The cathode consists of the salt mixture of $xLi_2S+(1-x)LiCl$, where $0.6<x<0.9$. The electrodes are supported on substrates of carbon reinforced with nickel. The electrolyte consists of either (1) $xLiAlCl_4+(1-x)SOCl_2$ or (2) $xLiAlCl_4+(1-x)SO_2Cl_2$ where for both electrolytes, x may range from about 0.02 to 1.5. The fabrication procedures and performance characteristics of two representative cells (denoted A and B) using this family of cell component materials are given below.

A. Anode (0.02 g): $0.2LiCl—0.8CaCl_2$
  Cathode (0.01 g): $0.8Li_2S—0.2LiCl$
  Substrate: Carbon-on-nickel
  Electrolyte (in excess): $SOCl_2—0.04LiAlCl4$
  Size: 4×10 mm For this cell, carbon-on-nickel substrates, 4×10 mm, Type II (carbon-Teflon paste) were used for both electrodes. The materials and preparation procedures for this substrate design are described above in Part C of Section III (Electrode Substrate Preparations).

An electrode of the type, 0.2LiCl—0.8CaCl$_2$, 4×10 mm, carbon-on-nickel, prepared by a solution deposition technique, constituted the anode for this cell. The materials and preparation procedures for this electrode are described above in detail in Part A(i) of Section IV (Electrode Coating Preparations).

The cathode was prepared as follows. The starting Li$_2$S was ground to a fine powder with a mortar and pestle. A paste containing Li$_2$S and LiCl in a ~4:1 molar ratio was prepared by combining 3.7 g Li$_2$S and 0.84 g LiCl with a polyethylene-water binder containing 0.5 g polyethylene oxide with a molecular weight of 1,000,000 (i.e., PEO$_{1000000}$). (This binder was made by dissolving 0.5 g PEO$_{1000000}$ into 50 ml water and then allowing most of the water to evaporate until only about 5 ml remained). This paste was heated to 100° C. in air and held for about two hours to drive off excess water. About 0.005 g of this paste was applied evenly to each side of a carbon-on-nickel substrate which was then squeezed between a glass roller and a glass plate. The cathode assemblage was heated in air at a rate of 5° C./minute from 50° C. to 160° C. and held for two hours. A vacuum was applied, and the assemblage was heated further to 200° C. and held for another two hours. The cathode assemblage was cooled to room temperature and placed into a glass test tube which was vacuum-sealed. This assemblage was heated at a rate of 5° C./minute to 450° C., held for about five hours, and cooled slowly to room temperature.

The electrolyte was prepared by dissolving 7.0 g LiAlCl$_4$ in 120 g SOCl$_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.0 V across the cell in series with an adjustable resistor which was initially set to 1.5 kΩ so that the charging current was 2.0 mA. As charging progressed, this resistor was manually lowered step by step to keep the charging current at about 2.0 mA until it had reached a value of about 300 Ω. The charging process was continued thereafter until the charging current had dropped to 0.05 mA. The total charging time from start to finish was about 2.5 hours.

The open circuit voltage after charging was 3.6 V, and the maximum short cut discharging current was 60 mA. The cell was discharged through an adjustable resistor which was set to 3.1 kΩ so that the initial discharging current was 1.0 mA. After about 5.2 hours, the cell output voltage had dropped to 0.5 V. During discharging, the cell output voltage exhibited two plateaus.

B. Anode (0.02 g): 0.2LiCl—0.8CaCl$_2$
   Cathode (0.01 g): 0.8Li$_2$S—0.2LiCl
   Substrate: Carbon-on-nickel
   Electrolyte (in excess): SO$_2$Cl$_2$—0.04LiAlCl$_4$
   Size: 4×10 mm This cell was prepared from start to finish using the same materials and procedures as those of Cell A of this Example except for the electrolyte, in which SO$_2$Cl$_2$ was substituted for SOCl$_2$. The electrolyte was prepared by dissolving 7.0 g LiAlCl$_4$ in 136 g SO$_2$Cl$_2$.

This cell was charged in constant-voltage mode by applying a voltage of 4.2 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 300 Ω. The charging process was continued thereafter until the charging current had dropped to 0.05 mA. The total charging time from start to finish was about 2.7 hours.

The open circuit voltage after charging was 3.8 V, and the maximum short cut discharging current was 60 mA. The cell was discharged through an adjustable resistor which was set to 3.5 kΩ so that the initial discharging current was 1.0 mA. After about 5.2 hours, the cell output voltage had dropped to 0.5 V. During discharging, the cell output voltage exhibited two plateaus, as for Cell A of this Example.

EXAMPLE #21

For the cells of this Example, the anode consists of a salt mixture, $x$NaCl+(1−$x$)Al$_2$O$_3$+0.2BaCl$_2$, where 0.5<$x$<0.7. the cathode consists of a salt mixture, $x$NaCl+(1−$x$)NaF, where 0.6<$x$<0.95. The electrodes are supported on substrates of carbon reinforced with nickel. The electrolyte may consist of any one of

  (1)

  (2)

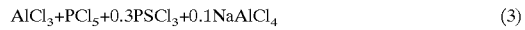  (3)

The fabrication procedures and performance characteristics of three representative cells (denoted A through C) using this family of cell component materials are given below.

A. Anode (0.025 g): 0.5NaCl—0.25Al$_2$O$_3$—0.25BaCl$_2$
   Cathode (0.025 g): 0.85NaCl—0.15NaF
   Substrate: Carbon-on-nickel
   Electrolyte (in excess): AlCl$_3$—PCl$_5$—0.3PCl$_3$—0.1NaAlCl$_4$
   Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, 0.5NaCl—0.25Al$_2$O$_3$—0.25BaCl$_2$, 4×10 mm, carbon-on-nickel, prepared by a solution deposition technique, constituted the anode for this cell. The materials and preparation procedures for this electrode are described above in detail in Part A(ii) of Section IV (electrode Coating Preparations).

A cathode with the nominal composition given above was prepared as follows. NaCl and NaBF$_4$ were combined in an 85:15 molar ratio by dissolving 4.90 g NaCl and 1.62 g NaBF$_4$ in water as a saturated solution at 40° C. (To make this solution, water was added to the salt mixture while stirring with a magnetic stirrer on a hot plate until all the solids had dissolved.) This salt mixture was deposited from solution as a coating on a carbon-on-nickel substrate using the technique described above in Part A of Section IV (Electrode Coating Preparations). The baking procedure performed after each immersion was the same as that used for the anode, i.e., as described above in Part A(ii) of Section IV (Electrode Coating Preparations). This baking procedure served to drive off all the water and also insured the complete conversion of NaBF$_4$ to NaF by inducing the decomposition of NaBF$_4$ to NaF and gaseous BF$_3$. The immersion-baking procedure was repeated as necessary until the total weight of the salt coating was about 0.025 g.

An AlCl$_3$—PCl$_5$—PCl$_3$—NaAlCl$_4$ electrolyte with the above nominal composition was prepared by dissolving 9.6 g NaAlCl$_4$ into 195 g AlCl$_3$—PCl$_5$—0.3PCl$_3$ at room temperature. The starting NaAlCl$_4$ salt was prepared as described above in Section I (Starting Materials Preparations). The starting AlCl$_3$—PCl$_5$—0.3PCl$_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.0 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.05 mA. The total charging time from start to finish was about 3.5 hours.

The open circuit voltage after charging was 3.3 V, and the maximum short cut discharging current was 35 mA. The cell was discharged through an adjustable resistor which was set to 2.8 kΩ so that the initial discharging current was 1.0 mA. After about 5.2 hours, the cell output voltage had dropped to 0.3 V.

B. Anode (0.025 g): 0.5NaCl—0.25Al$_2$O$_3$—0.25BaCl$_2$
Cathode (0.025 g): 0.85NaCl—0.15NaF
Substrate: Carbon-on-nickel
Electrolyte (in excess): AlCl$_3$—PCl$_5$—0.3POCl$_3$—0.1NaAlCl$_4$
Size: 4×10 mm This cell was prepared from start to finish using the same materials and procedures as Cell A of this Example except that for the electrolyte, POCl$_3$ was substituted for PCl$_3$. The electrolyte was prepared by dissolving 9.6 g NaAlCl$_4$ into 210 g AlCl$_3$—PCl$_5$—0.3POCl$_3$. The starting AlCl$_3$—PCl$_5$—0.3POCl$_3$ solvent was prepared as described above in Part B(ii) of Section II (Electrolyte Preparations).

This cell was charged in constant-voltage mode by applying a voltage of 4.0 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.05 mA. The total charging time from start to finish was about 4.0 hours.

The open circuit voltage after charging was 3.3 V, and the maximum short cut discharging current was 35 mA. The cell was discharged through an adjustable resistor which was set to 2.8 kΩ so that the initial discharging current was 1.0 mA. After about 4.8 hours, the cell output voltage had dropped to 0.3 V.

C. Anode (0.025 g): 0.5NaCl—0.25Al$_2$O$_3$—0.25BaCl$_2$
Cathode (0.025 g): 0.85NaCl—0.15NaF
Substrate: Carbon-on-nickel
Electrolyte (in excess): AlCl$_3$—PCl$_5$—0.3PSCl$_3$—0.1NaAlCl$_4$
Size: 4×10 mm This cell was prepared from start to finish using the same materials and procedures a Cell A of this Example except that for the electrolyte, PSCl$_3$ was substituted for PCl$_3$. The electrolyte was prepared by dissolving 3.8 g NaAlCl$_4$ into 78 g AlCl$_3$—PCl$_5$—0.3PSCl$_3$. The starting AlCl$_3$—PCl$_5$—0.3PSCl$_3$ solvent was prepared as described above in Part B(ii) of Section II (Electrolyte Preparations).

This cell was charged in constant-voltage mode by applying a voltage of 4.0 V across the cell in series with an adjustable resistor which was initially set to 2.0 kΩ so that the charging current was 2.0 mA. as charging progressed, this resistor was manually lowered step by step to keep the charging current at about 2.0 mA until it had reached a value of about 500 Ω. The charging process was continued thereafter until the charging current had dropped to 0.05 mA. The total charging time from start to finish was about 3.5 hours.

The open circuit voltage after charging was 3.3 V, and the maximum short cut discharging current was 35 mA. The cell was discharged through an adjustable resistor which was set to 3.0 kΩ sot hat the initial discharging current was 1.0 mA. After about 4.8 hours, the cell output voltage had dropped to 0.3 V.

EXAMPLE #22

For the cells of this Example, the anode consists of a salt mixture, xNaCl+(1−x)Al$_2$O$_3$+0.2BaCl$_2$, where 0.5<x<0.7. The cathode consists of a salt mixture, xNaCl+(1−x)Na$_2$O, where 0.6<x<0.95. The electrodes are supported on substrates of carbon reinforced with nickel. The electrolyte may consist of either

  (1)

  (2)

The fabrication procedures and performance characteristics of two representative cells (denoted A and B) using this family of cell component materials are given below.

A. Anode (0.025 g): 0.5NaCl—0.25Al$_2$O$_3$—0.25BaCl$_2$
Cathode (0.025 g): 0.7NaCl—0.3Na$_2$O
Substrate: Carbon-on-nickel
Electrolyte (in excess): AlCl$_3$—PCl$_5$—0.3PCl$_3$—0.1NaAlCl$_4$
Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, 0.5NaCl—0.25Al$_2$O$_3$—0.25BaCl$_2$, 4×10 mm, carbon-on-nickel, prepared by a solution deposition technique, constituted the anode for this cell. The materials and preparation procedures for this electrode are described above in detail in Part A(ii) of Section IV (electrode Coating Preparations).

A cathode with the nominal composition given above was prepared as follows. NaCl and NaOH were combined in a 7:6 molar ratio by dissolving 4.90 g NaCl and 4.20 g NaOH in water as a saturated solution at room temperature. (To make this solution, water was added to the salt mixture while stirring with a magnetic stirrer until all the solids had dissolved.) This salt mixture was deposited from solution as a coating on a carbon-on-nickel substrate using the technique described above in Part A of Section IV (Electrode Coating Preparations). The baking procedure performed after each immersion consisted of first drying the coated substrate by heating in air at a rate of about 5° C./minute from 50° C. to 100° C. and holding for one hour. Then, the coated substrate was heated to 190° C., held for two hours, heated thereafter at a rate of 10° C./minute to 500° C. and held for about 10 hours. This baking procedure served to drive off all the water and also insured the complete conversion of NaOH to $Na_2O$ by inducing the decomposition of NaOH to $Na_2O$ and $H_2O$. The immersion-baking procedure was repeated as necessary until the total weight of the salt coating was about 0.025 g.

The electrolyte was prepared by dissolving 9.6 g $NaAlCl_4$ into 195 g $AlCl_3$—$PCl_5$—$0.3PCl_3$ at room temperature. The $AlCl_3$—$PCl_5$—$0.3PCl_3$ solvent was prepared as described above in Part B(i) of Section II (Electrolyte Preparations).

A cell was assembled from the above-described cell component materials using a parallel plate design, i.e., Parallel Plate, 4×10 mm. The materials and parepation procedures for this test cell design are described in Part B of Section V (Cell Assembly).

This cell was charged in constant-voltage mode by applying a voltage of 4.2 across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 500 Ω. The charging process was continued thereafter until the charging current had dropped to 0.05 mA. The total charging time from start to finish was about 3.8 hours.

The open circuit voltage after charging was 3.2 V, and the maximum short cut discharging current was 35 mA. The cell was discharged through an adjustable resistor which was set to 3.0 kΩ so that the initial discharging current was 1.0 mA. After about 4.8 hours, the cell output voltage had dropped to 0.3 V.

B. Anode (0.025 g): $0.5NaCl$—$0.25Al_2O_3$—$0.25BaCl_2$
   Cathode (0.025 g): $0.7NaCl$—$0.3Na_2O$
   Substrate: Carbon-on-nickel
   Electrolyte (in excess): $AlCl_3$—$PCl_5$—$0.3POCl_3$—$0.1NaAlCl_4$
   Size: 4×10 mm This cell was prepared from start to finish using the same materials and procedures as used for Cell A of this Example except that $POCl_4$ was substituted for $PCl_3$ in the electrolyte. The electrolyte was prepared by dissolving 9.6 g $NaAlCl_4$ into 210 g $AlCl_3$—$PCl_5$—$0.3POCl_3$. The $AlCl_3$—$PCl_5$—$0.3POCl_3$ solvent was prepared as described above in Part B(ii) of Section II (Electrolyte Preparations).

This cell was charged in constant-voltage mode by applying a voltage of 4.2 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 300 Ω. The charging process was continued thereafter until the charging current had dropped to 0.05 mA. The total charging time from start to finish was about 3.5 hours.

The open circuit voltage after charging was 3.2 V, and the maximum short cut discharging current was 35 mA. The cell was discharged through an adjustable resistor which was set to 3.0 kΩ so that the initial discharging current was 1.0 mA. After about 4.6 hours, the cell output voltage had dropped to 0.3 V.

EXAMPLE #23

For the cells of this Example, the anode consists of a salt mixture, $xNaCl+(1-x)Al_2O_3+0.2BaCl_2$, where $0.5<x<0.7$. The cathode consists of a salt mixture, $xNaOCN+(1-x)Al_2O_3$, where $0.9<x<0.95$. The electrodes are supported on substrates of carbon reinforced with nickel. The electrolyte may consist of either $$AlCl_3+PCl_5+0.3PCl_3+0.02NaAlCl_4+0.025NaAl(OCN)Cl_3 \quad (1)$$

$$AlCl_3+PCl_5+0.3POCl_3+0.02NaAlCl_4+0.025NaAl(OCN)Cl_3 \quad (2)$$

The fabrication procedures and performance characteristics of two representative cells (denoted A and B) using this family of cell component materials are given below.

A. Anode (0.025 g): $0.5NaCl$—$0.25Al_2O_3$—$0.25BaCl_2$
   Cathode (0.025 g): $0.95NaOCN$—$0.05Al_2O_3$
   Substrate: Carbon-on-nickel
   Electrolyte (in excess): $AlCl_3$—$PCl_5$—$0.3PCl_3$—$0.02NaAlCl_4$—$0.025NaAl(OCN)Cl_3$
   Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, $0.5NaCl$—$0.25Al_2O_3$—$0.25BaCl_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

A cathode with the nominal composition given above was prepared as follows. A starting solution of NaOCN and $AlCl_3$ present in a 95:10 molar ratio was prepared by dissolving 6.2 g NaOCn and 1.3 g $AlCl_3$ in 40 ml water at 80° C. This salt mixture was deposited from solution on a carbon-on-nickel substrate using the technique described above in Part A of Section IV (Electrode Coating Preparations). The baking procedure performed after each immersion was the same as that used for the anode, i.e., as described above in Part A(ii) of Section IV (Electrode Coating Preparations). The immersion-baking procedure was repeated as necessary until the total weight of the salt coating was about 0.025 g.

The electrolyte was prepared by dissolving 4.8 g $NaAlCl_4$ and 2.5 g $NaAl(OCN)Cl_3$ into 215 g $AlCl_3$—$PCl_5$—$0.3PCl_3$ at room temperature. The starting $NaAlCl_4$ and $NaAl(OCN)Cl_3$ salts were prepared as described above in Section I (Starting Materials Preparations). The $AlCl_3$—$PCl_5$—$0.3PCl_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.2 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 300 Ω. The charging process was continued thereafter until the charging current had dropped to 0.05 mA. The total charging time from start to finish was about 3.5 hours.

The open circuit voltage after charging was 3.4 V, and the maximum short cut discharging current was 35 mA. The cell was discharged through an adjustable resistor which was set to 3.0 kΩ so that the initial discharging current was 1.0 mA. After about 4.6 hours, the cell output voltage had dropped to 0.3 V.

B. Anode (0.025 g): $0.5NaCl$—$0.25Al_2O_3$—$0.25BaCl_2$
   Cathode (0.025 g): $0.95NaOCN$—$0.05Al_2O_3$
   Substrate: Carbon-on-nickel Electrolyte (in excess): $AlCl_3$—$PCl_5$—$0.3POCl_3$—$0.02NaAlCl_4$—$0.025NaAl(OCN)Cl_3$
Size: 4×10 mm This cell was prepared from start to finish using the same procedures as described above for Cell A of this Example except that $POCl_3$ was substituted for $PCl_3$ in the electrolyte. The electrolyte for this cell was prepared by dissolving 4.8 g $NaAlCl_4$ and 2.5 g $NaAl(OCN)Cl_3$ into 230 g $AlCl_3$—$PCl_5$—$0.3POCl_3$ at room temperature. The $AlCl_3$—$PCl_5$—$0.3POCl_3$ solvent was prepared as described above in Part B(ii) of Section II (Electrolyte Preparations).

This cell was charged in constant-voltage mode by applying a voltage of 4.2 V across the cell in series with an adjustable resistor which was initially set to 2.0 k$\Omega$ so that the charging current was 2.0 mA. As charging progressed, this resistor was manually lowered step by step to keep the charging current at about 2.0 mA until it had reached a value of about 200 $\Omega$. The charging process was continued thereafter until the charging current had dropped to 0.05 mA. The total charging time from start to finish was about 3.5 hours.

The open circuit voltage after charging was 3.4 V, and the maximum short cut discharging current was 35 mA. The cell was discharged through an adjustable resistor which was set to 3.0 k$\Omega$ so that the initial discharging current was 1.0 mA. After about 4.2 hours, the cell output voltage had dropped to 0.3 V.

EXAMPLE #24

For the cells of this Example, the anode consists of a salt mixture, $xNaCl+(1-x)Al_2O_3+0.2BaCl_2$, where $0.5<x<0.7$. The cathode consists of a salt mixture, $xNaSCN+(1-x)Al_2O_3$, where $0.9<x<0.95$. The electrodes are supported on substrates of carbon reinforced with nickel. The electrolyte may consist of either

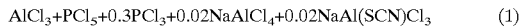

$AlCl_3+PCl_5+0.3PCl_3+0.02NaAlCl_4+0.02NaAl(SCN)Cl_3$ (1)

$AlCl_3+PCl_5+0.3POCl_3+0.02NaAlCl_4+0.025NaAl(SCN)Cl_3$ (2)

The fabrication procedures and performance characteristics of two representative cells (denoted A and B) using this family of cell component materials are given below.

A. Anode (0.025 g): $0.5NaCl$—$0.25Al_2O_3$—$0.25BaCl_2$
   Cathode (0.025 g): $0.95NaSCN$—$0.05Al_2O_3$
   Substrate: Carbon-on-nickel
   Electrolyte (in excess): $AlCl_3$—$PCl_5$—$0.3PCl_3$—$0.02NaAlCl_4$—$0.02NaAl(SCN)Cl_3$
   Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, $0.5NaCl$—$0.25Al_2O_3$—$0.25BaCl_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

A cathode with the nominal composition given above was prepared as follows. A starting solution of NaSCN and $AlCl_3$ present in a 95:10 molar ratio was prepared by dissolving 7.8 g NaSCN and 1.3 g $AlCl_3$ in 40 ml water at 80° C. This salt mixture was deposited from solution on a carbon-on-nickel substrate using the technique described above in Part A of Section IV (Electrode Coating Preparations). The baking procedure performed after each immersion was the same as that used for the anode, i.e., as described above in Part A(ii) of Section IV (Electrode Coating Preparations). The immersion-baking procedure was repeated as necessary until the total weight of the salt coating was about 0.025 g.

The electrolyte was prepared by dissolving 4.8 g $NaAlCl_4$ and 2.5 g $NaAl(SCN)Cl_3$ into 215 g $AlCl_3$—$PCl_5$—$0.3PCl_3$. The starting $NaAlCl_4$ and $NaAl(SCN)Cl_3$ salts were prepared as described above in Section I (Starting Materials Preparations). The $AlCl_3$—$PCl_5$—$0.3PCl_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.2 V across the cell in series with an adjustable resistor which was initially set to 2.0 k$\Omega$ so that the charging current was 2.0 mA. As charging progressed, this resistor was manually lowered step by step to keep the charging current at about 2.0 mA until it had reached a value of about 200 $\Omega$. The charging process was continued thereafter until the charging current had dropped to 0.05 mA. The total charging time from start to finish was about 3.5 hours.

The open circuit voltage after charging was 3.3 V, and the maximum short cut discharging current was 35 mA. The cell was discharged through an adjustable resistor which was set to 3.0 k$\Omega$ so that the initial discharging current was 1.0 mA. After about 4.5 hours, the cell output voltage had dropped to 0.3 V.

B. Anode (0.025 g): $0.5NaCl$—$0.25Al_2O_3$—$0.25BaCl_2$
   Cathode (0.025 g): $0.95NaSCN$—$0.05Al_2O_3$
   Substrate: Carbon-on-nickel
   Electrolyte (in excess): $AlCl_3$—$PCl_5$—$0.3POCl_3$—$0.02NaAlCl_4$—$0.025NaAl(SCN)Cl_3$
   Size: 4×10 mm This cell was prepared from start to finish using the same procedures as described above for Cell A of this Example except that $POCl_3$ was substituted for $PCl_3$ in the electrolyte. The electrolyte for this cell was prepared by dissolving 4.8 g $NaAlCl_4$ and 2.5 g $NaAl(SCN)Cl_3$ into 230 g $AlCl_3$—$PCl_5$—$0.3POCl_3$. The $AlCl_3$—$PCl_5$—$0.3POCl_3$ solvent was prepared as described above in Part B(ii) of Section II (Electrolyte Preparations).

This cell was charged in constant-voltage mode by applying a voltage of 4.2 V across the cell in series with an adjustable resistor which was initially set to 2.0 k$\Omega$ so that the charging current was 2.0 mA. As charging progressed, this resistor was manually lowered step by step to keep the charging current at about 2.0 mA until it had reached a value of about 200 $\Omega$. The charging process was continued thereafter until the charging current had dropped to 0.05 mA. The total charging time from start to finish was about 3.5 hours.

The open circuit voltage after charging was 3.3 V, and the maximum short cut discharging current was 35 mA. The cell was discharged through an adjustable resistor which was set to 3.0 k$\Omega$ so that the initial discharging current was 1.0 mA. After about 4.2 hours, the cell output voltage had dropped to 0.3 V.

EXAMPLE #25

Anode (0.025 g): $0.5NaCl$—$0.25Al_2O_3$—$0.25BaCl_2$
Cathode (0.025 g): $0.6Na_2O$—$0.4Na_2CO_3$ Substrate: Carbon-on-nickel Electrolyte (in excess): $AlCl_3$—$PCl_5$—$0.3PCl_3$—$0.1NaAlCl_4$ Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, $0.5NaCl$—$0.25Al_2O_3$—$0.25BaCl_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

The electrolyte was prepared by dissolving 9.6 g $NaAlCl_4$ into 195 g $AlCl_3$—$PCl_5$—$0.3PCl_3$ at room temperature. The $AlCl_3$—$PCl_5$—$0.3PCl_3$ solvent was prepared as described above in Part B(i) of Section II (Electrolyte Preparations).

A cathode with the nominal composition given above was prepared as follows. A starting saturated solution of $Na_2CO_3$ was prepared by dissolving 50 g $Na_2CO_3$ in 100 ml water at 100° C., cooling to room temperature, and separating the undissolved $Na_2CO_3$ from the solution. About 0.043 g $Na_2CO_3$ was deposited from solution as a coating on a carbon-on-nickel substrate using the technique described above in Part A of Section IV (Electrode Coating Preparations). After the final baking at 250° C., the coated substrate was cooled to room temperature, inserted into a quartz tube, and vacuum-sealed. This assemblage was heated from 100° C. to 1000° C. at 20° C./minute and held for a total annealing time of 30 minutes. At this temperature, the rate of decomposition of $Na_2CO_3$ to $Na_2O$ and $CO_3$ is sufficiently high, and the amount of $CO_2$ driven off as a function of heating time determines the relative amounts of $Na_2O$ and $Na_2CO_3$ present in the mixture. The total time at which the cathode for this cell was held at 1000° C. (i.e., 30 minutes) was such that the final coating weight was about 0.025 g, corresponding to a mixture calculated from the weight loss at 0.015 g $Na_2O$ and 0.01 g $Na_2CO_3$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.2 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 200 Ω. The charging process was continued thereafter until the charging current had dropped to 0.05 mA. The total charging time from start to finish was about 3.5 hours.

The open circuit voltage after charging was 3.3 V, and the maximum short cut discharging current was 35 mA. The cell was discharged through an adjustable resistor which was set to 3.0 kΩ so that the initial discharging current was 1.0 mA. After about 4.6 hours, the cell output voltage had dropped to 0.3 V.

EXAMPLE #26

For the cells of this Example, the anode consists of a salt mixture, $xNaCl+(1-x)Al_2O_3+0.2BaCl_2$, where $0.5<x<0.7$. The cathode consists of a salt mixture, $xNaCl+(1-x)NaF$, where $0.6<x<0.95$. The electrodes are supported on substrates on either carbon fibers or substrates of carbon reinforced with nickel. The electrolyte may consist of either

   (1)

   (2)

The fabrication procedures and performance characteristics of two representative cells (denoted A through C) using this family of cell component materials are given below.

A. Anode (0.006 g): $0.5NaCl$—$0.25Al_2O_3$—$0.25BaCl_2$
   Cathode (0.006 g): $0.85NaCl$—$0.15NaF$
   Substrate: Carbon
   Electrolyte (0.01 g): $SOCl_2$—$0.1NaAlCl_4$
   Size: 1.2×10 mm For this cell, the Tiny Cell design was used which is described above in Part A of Section V (Cell Assembly). The materials and preparations procedures for the carbon fiber cluster substrate-lead assemblages used in this test cell design are also given therein.

Electrode active material salt mixtures with nominal compositions as given above were deposited from solution on the carbon fiber cluster substrates using the technique described above in Part A of Section IV (Electrode Coating Preparations). About 0.006 g of salt was deposited on each electrode substrate. The anode starting solution was made by dissolving 5.8 g NaCl, 13.3 g $AlCl_3$, and 10.4 g $BaCl_2$ in water as a saturated solution at 40° C. by adding water to the salt mixture while stirring until all the solids had dissolved. The cathode starting solution was made by dissolving 4.90 g NaCl and 1.62 g $NaBF_4$ in water as a saturated solution at 40° C. by adding water to the salt mixture while stirring until all the solids had dissolved. For both electrodes, the baking procedure performed between immersions and the final baking and annealing steps were the same as those described for the electrode type $0.5NaCl$—$0.25Al_2O_3$—$0.25BaCl_2$, 4×10 mm, carbon-on-nickel, given in Part A(ii) of Section IV (Electrode Coating Preparations).

The electrolyte was prepared in a dry box by dissolving 19.2 g $NaAlCl_4$ into 120 g $SOCl_2$. It was estimated that 0.01 g effective electrolyte was inserted between the electrodes and other electrolytes were set a bottom of the glass tube.

The cell was charged in constant-voltage mode at a voltage of 4.4 V. A 4.0 Ω resistor was connected in series to limit the charging current to about 2.0 mA. The cell was discharged in constant-current mode at a current of 0.1 mA. The cell charging and discharging processes were both computer-controlled.

Figure 13:
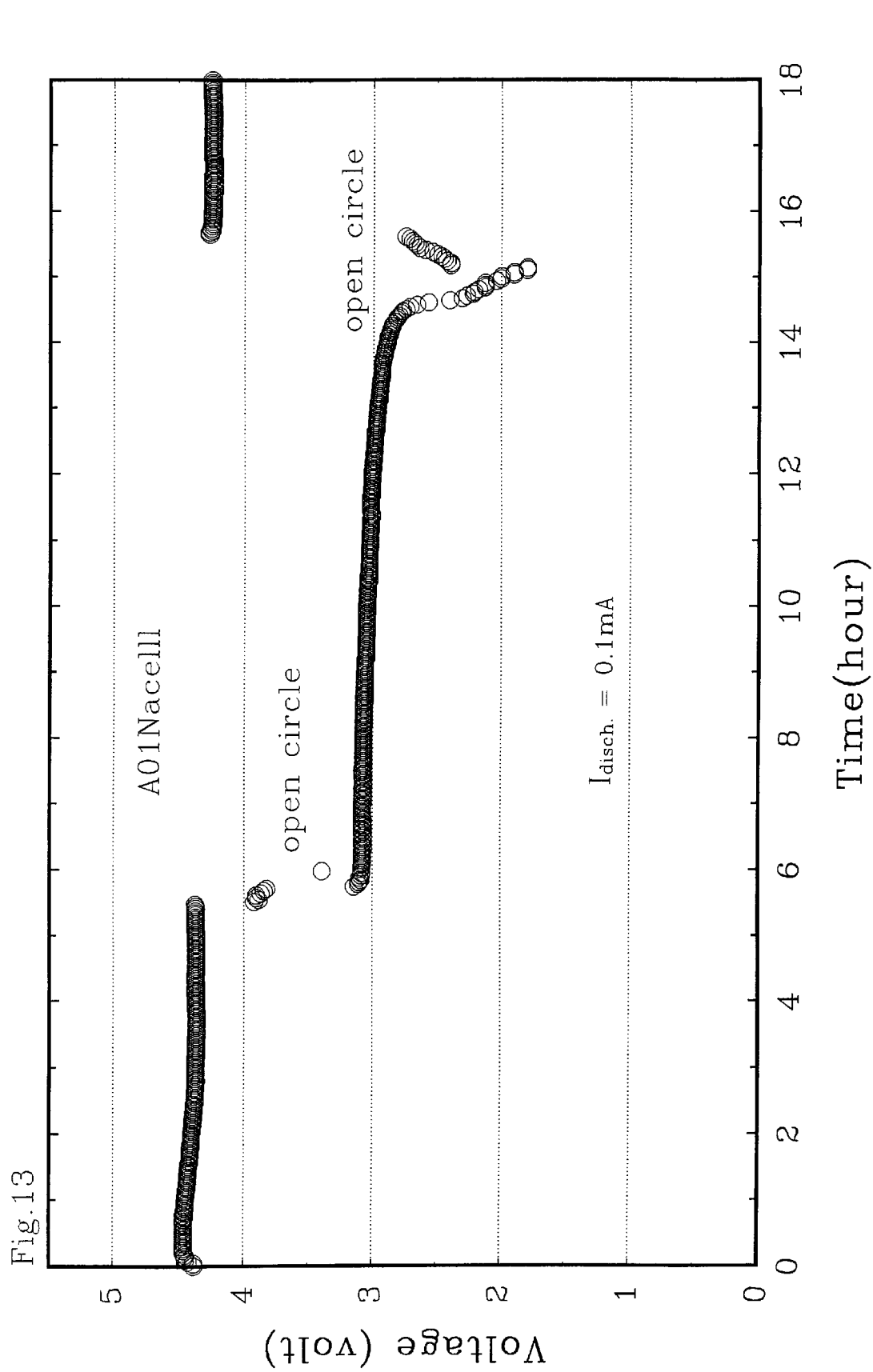
FIG. 13 is a plot of the charging-discharging curve for Cell A of Example #26.

FIG. 13 shows the cell voltage versus time during charging and discharging. The discharging Coulombic capacity of the cell was determined from the current, time, and weight of the total working electrode active material, i.e., 0.1 mA) (9.5 h)/(0.003 g+0.003 g)=158 mAh/g, where 0.003 g is the amount of working electrode active material on each electrode. The cathode discharging Coulombic capacity was determined from the current, time, and weight of the total working cathode active material, i.e., (0.1 mA) (9.5 h)/(0.003 g)=317 mAh/g.

B. Anode (0.025 g): $0.5NaCl$—$0.25Al_2O_3$—$0.25BaCl_2$
   Cathode (0.025 g): $0.85NaCl$—$0.15NaF$
   Substrate: Carbon-on-nickel
   Electrolyte (in excess): $SO_2Cl_2$—$0.1NaAlCl_4$
   Size: 4×10 mm For this cell, carbon-on-nickel substrates, 4×10 mm, Type III (carbon-PPO paste) were used for both electrodes. The materials and preparation procedures for this substrate design are described above in Part D of Section III (Electrode Substrate Preparations).

An electrode of the type, $0.5\text{NaCl}—0.25\text{Al}_2\text{O}_3—0.25\text{BaCl}_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

The cathode was prepared as follows. NaCl and $\text{NaBF}_4$ were combined in an 85:15 molar ratio by dissolving 4.90 g NaCl and 1.62 g $\text{NaBF}_4$ in water as a saturated solution at 40° C. (To make this solution, water was added to the salt mixture while stirring with a magnetic stirrer on a hot plate until all the solids had dissolved.) This salt mixture was deposited from solution as a coating on a carbon-on-nickel substrate using the technique described above in Part A of Section IV (Electrode Coating Preparations). The baking procedure performed after each immersion was the same as that used for the anode, i.e., as described above in Part A(ii) of Section IV (Electrode Coating Preparations). This baking procedure served to drive off all the water and also insured the complete conversion of $\text{NaBF}_4$ to NaF by inducing the decomposition of $\text{NaBF}_4$ to NaF and gaseous $\text{BF}_3$. The immersion-baking procedure was repeated as necessary until the total weight of the salt coating was about 0.025 g.

The electrolyte was prepared by dissolving 19.2 g $\text{NaAlCl}_4$ into 135 g $\text{SO}_2\text{Cl}_2$.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged on constant-voltage mode by applying a voltage of 4.2 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 200 Ω. The charging process was continued thereafter until the charging current had dropped to 0.05 mA. The total charging time from start to finish was about 3.5 hours.

The open circuit voltage after charging was 3.3 V, and the maximum short cut discharging current was 45 mA. The cell was discharged through an adjustable resistor which was set to 3.0 kΩ so that the initial discharging current was 1.0 mA. After about 4.8 hours, the cell output voltage had dropped to 0.3 V.

C. Anode (0.03 g): $0.5\text{NaCl}—0.25\text{Al}_2\text{O}_3—0.25\text{BaCl}_2$
Cathode (0.03 g): $0.85\text{NaCl}—0.15\text{NaF}$
Substrate: Carbon-on-nickel
Electrolyte (in excess): $\text{SOCl}_2—0.1\text{NaAlCl}_4$
Size: 4×10 mm This cell was prepared from start to finish using the same materials and procedures as those of Cell B of this Example, but with the following medications. For the electrodes, the amounts of electrode active materials deposited on the substrates were slightly larger (i.e., 0.03 rather than 0.025 g). Also, $\text{SOCl}_2$ was substituted for $\text{SO}_2\text{Cl}_2$ in the electrolyte which, for this cell, was prepared by dissolving 19.2 g $\text{NaAlCl}_4$ into 120 g $\text{SOCl}_2$.

This cell was charged by a DC power source in constant-current mode at 2.0 mA. The charging voltage started at 1.0 V and increased to 4.0 V after about 45 minutes. The charging process was continued until the charging voltage reached its upper limit of 4.5 V. At that point, a constant current could not be maintained and the charging current gradually decreased to 1.0 mA over a four hour period, at which point, the charging process was stopped. The open circuit voltage after charging was 3.8 V.

The cell was discharged through an adjustable resistor with a resistance of about 450 Ω for a discharging current value of about 0.7 mA. The discharging process was continued for about 8.7 hours at which point, the cell output voltage had dropped to 1.0 V with an output current of 0.2 mA. At that point, the cell open circuit voltage was measured at about 2.8 V.

Figure 14A:
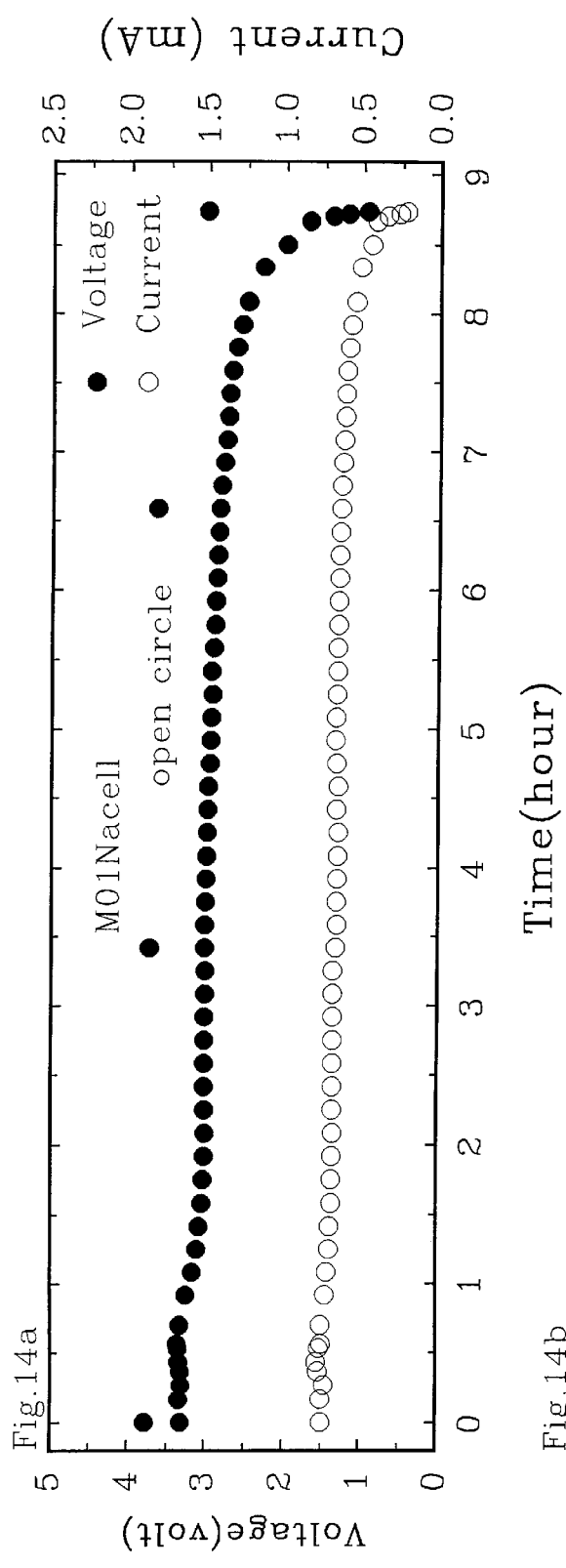
FIG. 14a shows the cell voltage and current versus time during discharging for Cell C of Example #26.
Figure 14B:
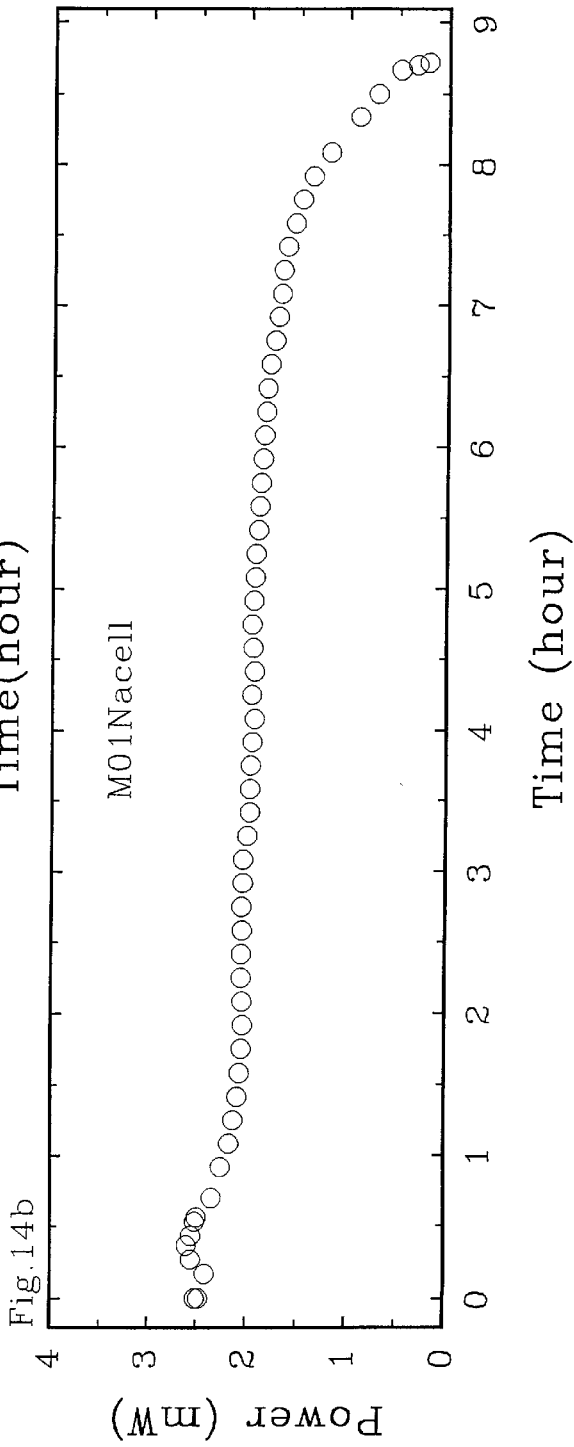
FIG. 14b shows the cell output power versus time during discharging for the same cell.

FIG. 14a shows the cell voltage and current versus time during discharging. FIG. 14b shows the cell output power versus time during discharging. The discharging Coulombic capacity of the cell was determined from the current, time, and weight of the total working electrode active material, i.e., (0.65 mA) (8.7 h)/(0.015 g+0.015 g)=189 mAh/g, where 0.015 g as the amount of working electrode active material on each electrode. The discharging Coulombic capacity for each electrode was determined from the current, time, and weight of the total working electrode active material for each electrode, i.e., (0.65 mA) (8.7 h)/(0.015 g)=377 mAh/g.

EXAMPLE #27

For the cells of this Example, the anode consists of a salt mixture, $x\text{NaCl}+(1-x)\text{Al}_2\text{O}_3+0.2\text{BaCl}_2$, where $0.5<x<0.7$. The cathode consists of a salt mixture, $x\text{NaCl}+(1-x)\text{Na}_2\text{O}$, where $0.4<x<0.9$. The electrodes are supported on substrates of carbon reinforced with nickel. The electrolyte may consist of either

$$\text{SOCl}_2+0.1\text{NaAlCl}_4 \tag{1}$$

$$\text{SO}_2\text{Cl}_2 0.1\text{NaAlCl}_4 \tag{2}$$

The fabrication procedures and performance characteristics of two representative cells (denoted A and B) using this family of cell component materials are given below.

A. Anode (0.025 g): $0.5\text{NaCl}—0.25\text{Al}_2\text{O}_3—0.25\text{BaCl}_2$
Cathode (0.025 g): $0.6\text{NaCl}—0.4\text{Na}_2\text{O}$
Substrate: Carbon-on-nickel
Electrolyte (in excess): $\text{SOCl}_2—0.1\text{NaAlCl}_4$
Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, $0.5\text{NaCl}—0.25\text{Al}_2\text{O}_3—0.25\text{BaCl}_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

The cathode was prepared as follows. NaCl and NaOH were combined in a 3:4 molar ratio by dissolving 4.90 g NaCl and 4.47 g NaOH in water as a saturated solution at room temperature. (To make this solution, water was added to the salt mixture while stirring with a magnetic stirrer until all the solids had dissolved.) This salt mixture was deposited from solution as a coating on a carbon-on-nickel substrate using the technique described above in Part A of Section IV (Electrode Coating Preparations). The baking procedure performed after each immersion consisted of first drying the coated substrate by heating in air at a rate of about 5° C./minute from 50° C. to 100° C. and holding for one hour.

Then, the coated substrate was heated to 190°0 C., held for two hours, heated thereafter at a rate of 10° C./minute to 500° C. and held for about 10 hours. This baking procedure served to drive off all the water and also insured the complete conversion of NaOH to $Na_3O$ by inducing the decomposition of NaOH to $Na_2O$ and $H_2O$. The immersion-baking procedure was repeated as necessary until the weight of the salt coating was about 0.025 g.

The electrolyte was prepared by dissolving 19.2 g $NaAlCl_4$ into 120 g $SOCl_2$.

a cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.5 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 200 Ω. The charging process was continued thereafter until the charging current had dropped to 0.05 mA. The total charging time from start to finish was about 3.5 hours.

The open circuit voltage after charging was 3.6 V, and the maximum short cut discharging current was 60 mA. The cell was discharged through an adjustable resistor which was set to 3.0 kΩ so that the initial discharging current was 1.0 mA. After about 4.8 hours, the cell output voltage had dropped to 0.3 V.

B. Anode (0.016 g): 0.5NaCl—0.25$Al_2O_3$—0.25$BaCl_2$
   Cathode (0.154 g): 0.6NaCl—0.4$Na_2O$
   Substrate: Carbon-on-nickel
   Electrolyte (20 g): $SO_2Cl_2$—0.1$NaAlCl_4$
   Size: 50×70 mm For this cell, carbon-on-nickel substrates, 50×70 mm, Type II (carbon-acetonitrile-PPO slurry) were used for both electrodes. The materials and preparation procedures for this substrate design are described above in Part E of Section III (Electrode Substrate Preparations).

The anode was prepared by applying a salt coating with the above nominal composition using a solution deposition technique as described above in Part A of Section IV (Electrode Coating Preparations). The total amount of salt deposited on the anode substrate was about 0.16 g. The anode starting solution was made by dissolving 5.8 g NaCl, 13.3 g $AlCl_3$, and 10.4 g $BaCl_2$ in water as a saturated solution at 40° C. by adding water to the salt mixture while stirring until all the solids had dissolved. The baking procedure performed between immersions and the final baking and annealing steps were the same as those described for the electrode type 0.5NaCl—0.25$Al_2O_3$—0.25$BaCl_2$, 4×10 mm, carbon-on-nickel, given in Part A(ii) of Section IV (Electrode Coating Preparations).

The cathode was prepared using the same procedures as those of Cell A of this Example except that the total amount of salt applied to the substrate was 0.154 g rather than 0.025 g due to the larger substrate size.

The electrolyte was prepared by dissolving 19.2 g $NaAlCl_4$ into 135 g $SO_2Cl_2$.

A cell was assembled from the above-described cell component materials using the Jelly-roll test cell design. The materials and preparation procedures for this test cell design are described in Part D of Section V (Cell Assembly).

Figure 15:
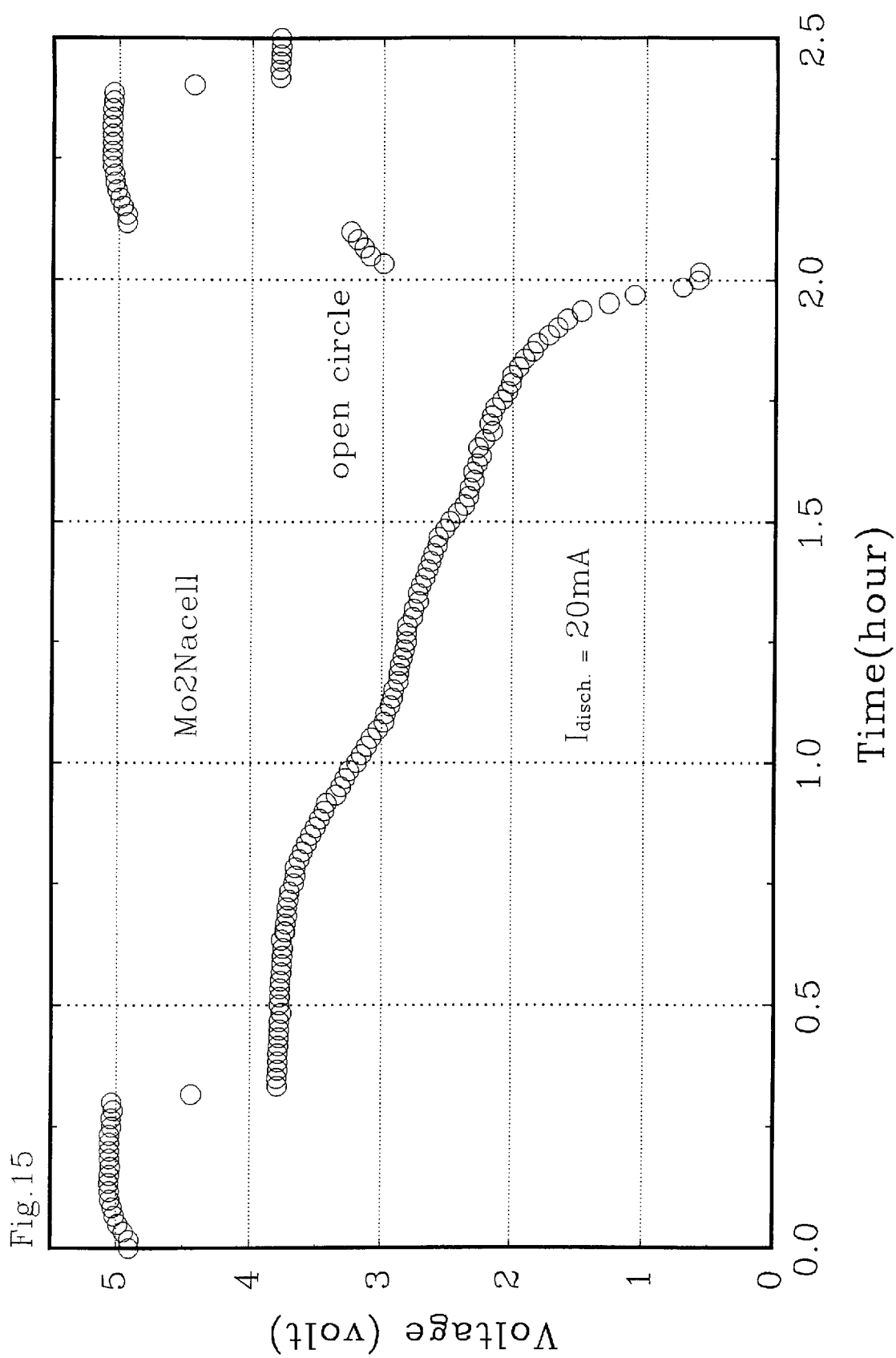
FIG. 15 shows the cell voltage versus time during discharging for Cell B of Example #27.

The cell was charged in constant-current mode at a high rate for 30 minutes. The cell was discharged in constant-current mode at 20 mA for about 1.7 hours. FIG. 15 shows the cell voltage versus time during discharging.

The discharging Coulombic capacity of the cell was determined from the current, time, and weight of the total working electrode active material, i.e., (20 mA) (1.7 h)/(0.16 g+0.154 g)=108 mAh/g. The cathode discharging Coulombic capacity was determined from the current, time, and weight of the total working cathode active material, i.e., (20 mA) (1.7 h)/(0.154 g)=221 mAh/g. For this jelly-roll test cell design, the total working electrode active material included the material on both sides of the substrates.

EXAMPLE #28

For the cells of this Example, the anode consists of a salt mixture, $xNaCl+(1-x)Al_2O_3+0.2BaCl_2$, where 0.5<x<0.7. The cathode consists of a salt mixture, $xNa_2O+(1-x)Na_2CO_3$, where x>0.6. The electrodes are supported on substrates of carbon reinforced with nickel. The electrolyte may consist of either

  (1)

  (2)

The fabrication procedures and performance characteristics of two representative cells (denoted A and B) using this family of cell component materials are given below.

A. Anode (0.025 g): 0.5NaCl—0.25$Al_2O_3$—0.25$BaCl_2$
   Cathode (0.025 g): 0.6$Na_2O$—0.4$Na_2CO_3$
   Substrate: Carbon-on-nickel
   Electrolyte (in excess): $SOCl_2$—0.1$NaAlCl_4$
   Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, 0.5NaCl—0.25$Al_2O_3$—0.25$BaCl_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

The cathode was prepared as follows. A starting solution of $Na_2CO_3$ was prepared by dissolving 50 g $Na_2CO_3$ in 100 ml water at 100° C., cooling to room temperature, and separating the undissolved $Na_2CO_3$ from the solution. About 0.043 g $Na_2CO_3$ was deposited from solution on a carbon-on-nickel substrate using the technique described above in Part A of Section IV (Electrode Coating Preparations). After the final baking at 250° C., the coated substrate was cooled to room temperature, inserted into a quartz tube, and vacuum-sealed. This assemblage was heated from 100° C. to 1000° C. at 20° C./minute and held for a total annealing time of 30 minutes so that the $Na_2CO_3$ would undergo partial decomposition to $Na_2O$ and $CO_2$. the total time at which the cathode was held at 1000° C. (i.e., 30 minutes) was such that the final coating weight was about 0.025 g, corresponding to a mixture calculated from the weight loss at 0.015 g $Na_2O$ and 0.01 g $Na_2CO_3$.

The electrolyte was prepared by dissolving 19.2 g $NaAlCl_4$ into 120 g $SOCl_2$.

A cell was assembled from the above-described cell component materials using a parallel plate design, i.e., Parallel Plate, 4×10 mm. The materials and preparation procedures for this cell design are described in Part B of Section V (Cell Assembly).

This cell was charged in constant-voltage mode by applying a voltage of 4.5 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 200 Ω. The charging process was continued thereafter until the charging current had dropped to 0.05 mA. The total charging time from start to finish was about 3.5 hours.

The open circuit voltage after charging was 3.6 V, and the maximum short cut discharging current was 60 mA. The cell was discharged through an adjustable resistor which was set to 3.0 kΩ so that the initial discharging current was 1.0 mA. After about 5.8 hours, the cell output voltage had dropped to 0.3 V.

B. Anode (0.15 g): $0.5NaCl$—$0.25Al_2O_3$—$0.25BaCl_2$
  Cathode (0.154 g): $0.6Na_2O$—$0.4Na_2CO_3$
  Substrate: Carbon-on-nickel
  Electrolyte (20 g): $SO_2Cl_2$—$0.1NaAlCl_4$
  Size: 40×50 mm For this cell, the carbon-on-nickel substrates were prepared from start to finish using the same materials and procedures as those of the carbon-on-nickel substrate, 50×70 mm, Type IV (carbon-acetonitrile-PPO slurry) described above in Part E of Section III (Electrode Substrate Preparations) with the following modifications: i) the substrate size was 40×50 mm rather than 50×70 mm and ii) seven nickel wires were evenly distributed along the entire length of one of the 40 mm edges from one end to the other (i.e., rather than five wires along one of the 50 mm edges, as in the 50×70 mm substrate).

The anode was prepared by applying a salt coating with the above nominal composition using a solution deposition technique as described above in Part A of Section IV (Electrode Coating Preparations). The total amount of salt deposited on the anode substrate was about 0.15 g. The anode starting solution was made by dissolving 5.8 g NaCl, 13.3 g $AlCl_3$, and 10.4 g $BaCl_2$ in water as a saturated solution at 40° C. by adding water to the salt mixture while stirring until all the solids had dissolved. The baking procedure performed between immersions and the final baking and annealing steps were the same as those described for the electrode type $0.5NaCl$—$0.25Al_2O_3$—$0.25BaCl_2$, 4×10 mm, carbon-on-nickel, given in Part A(ii) of Section IV (Electrode Coating Preparations).

The cathode was prepared using the same procedures as those of Cell A of this Example except that the total amount of salt applied to the substrate was 0.154 g rather than 0.025 g due to the larger substrate size.

The electrolyte was prepared by dissolving 19.2 g $NaAlCl_4$ into 135 g $SO_2Cl_2$.

A cell was assembled from the above-described cell component materials using the Jelly-roll test cell design. The materials and preparation procedures for this test cell design are described in Part D of Section V (Cell Assembly). For the cell described herein, the jelly-roll was formed by winding the electrode sandwich around the glass center rod which was affixed along one of the 50 mm edges.

Figure 16:
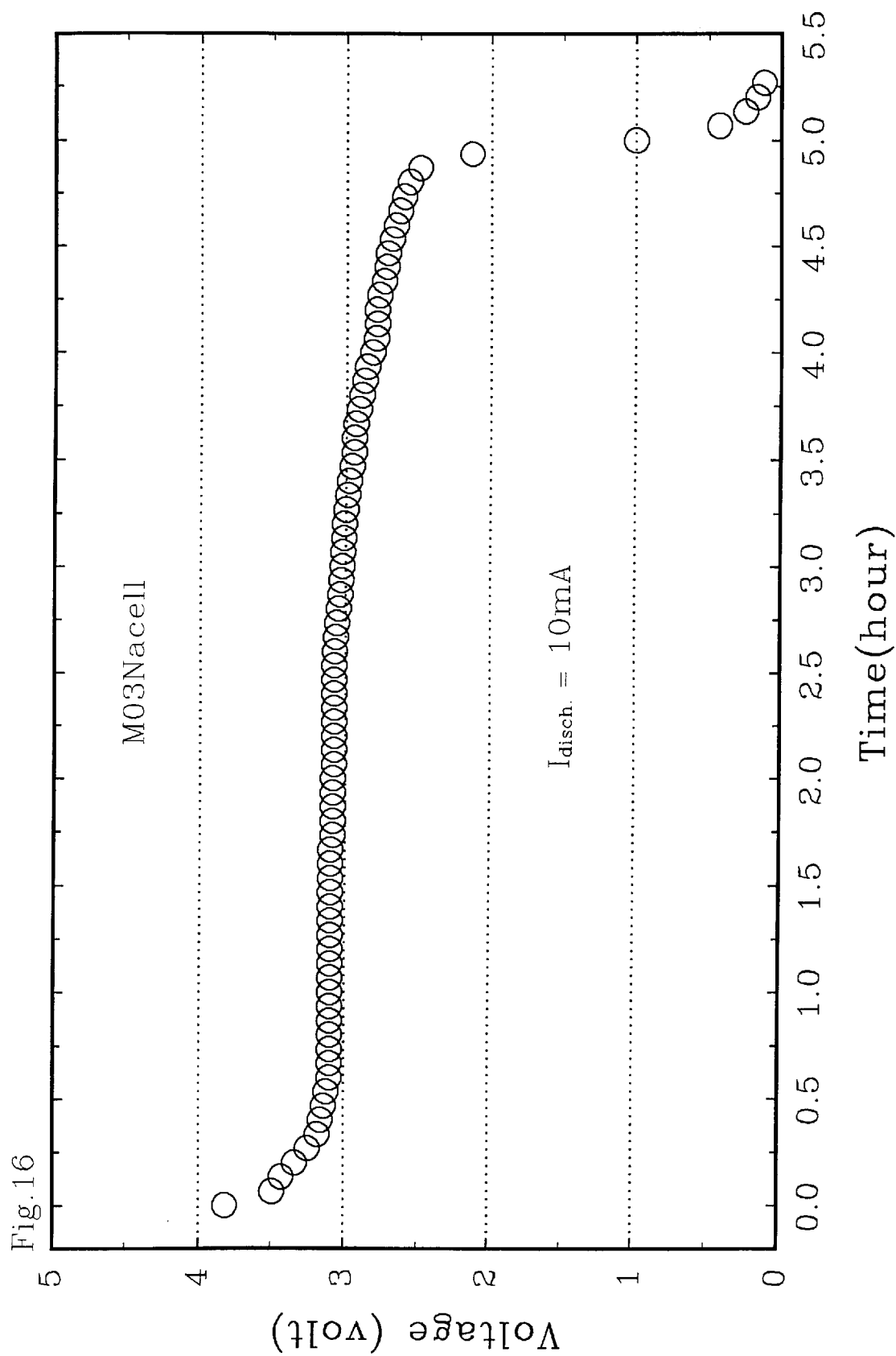
FIG. 16 shows the cell voltage versus time during discharging for Cell B of Example #28.

The cell was charged in constant-current mode at a high rate for 30 minutes. The cell was discharged in constant-current mode at 10 mA for about 5.0 hours. FIG. 16 shows the cell voltage versus time during discharging.

The discharging Coulombic capacity of the cell was determined from the current, time, and weight of the total working electrode active material, i.e., (10 mA) (5.0 h)/(0.15 g+0.154 g)=165 mAh/g. The cathode discharging Coulombic capacity was determined from the current, time, and weight of the total working cathode active material, i.e., (10 mA) (5.0 h)/(0.154 g)=325 mAh/g. For this jelly roll design, the total working electrode active material included the material on both sides of the substrates.

EXAMPLE #29

Anode (0.025 g): $0.5NaCl$—$0.25Al_2O_3$—$0.25BaCl_2$
Cathode (0.025 g): $0.95NaOCN$—$0.05Al_2O_3$
Substrate: Carbon-on-nickel
Electrolyte (in excess): $SO_2Cl_2$—$0.1NaAlCl_4$
Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, $0.5NaCl$—$0.25Al_2O_3$—$0.25BaCl_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

The cathode was prepared as follows. A starting solution of was made by dissolving 6.2 g NaOCN and 1.3 g $AlCl_3$ in 40 ml water at 80° C. This salt mixture was deposited from solution on a carbon-on-nickel substrate using the technique described above in Part A of Section IV (Electrode Coating Preparations). The baking procedure performed after each immersion was the same as that used for the anode, i.e., as described above in Part A(ii) of Section IV (Electrode Coating Preparations). The immersion-baking procedure was repeated as necessary until the total weight of the salt coating was about 0.025 g.

The electrolyte was prepared by dissolving 19.2 g $NaAlCl_4$ into 135 g $SO_2Cl_2$.

A cell was assembled from the above-described cell component materials using a parallel plate design, i.e., Parallel Plate, 4×10 mm. The materials and preparation procedures for this cell design are described in Part B of Section V (Cell Assembly).

This cell was charged in constant-voltage mode by applying a voltage of 4.5 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 200 Ω. The charging process was continued thereafter until the charging current had dropped to 0.05 mA. The total charging time from start to finish was about 3.5 hours.

The open circuit voltage after charging was 3.6 V, and the maximum short cut discharging current was 25 mA. The cell was discharged through an adjustable resistor which was set to 3.0 kΩ so that the initial discharging current was 1.0 mA. After about 5.1 hours, the cell output voltage had dropped to 0.3 V.

EXAMPLE #30

Anode (0.025 g): $0.5NaCl$—$0.25Al_2O_3$—$0.25BaCl_2$
Cathode (0.025 g): $0.95NaSCN$—$0.05Al_2O_3$
Substrate: Carbon-on-nickel
Electrolyte (in excess): $SO_2Cl_2$—$0.1NaAlCl_4$
Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, $0.5NaCl-0.25Al_2O_3-0.25BaCl_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

The cathode was prepared as follows. A starting solution of was made by dissolving 7.8 g NaSCN and 1.3 g $AlCl_3$ in 40 ml water at 80° C. This salt mixture was deposited from solution on a carbon-on-nickel substrate using the technique described above in Part A of Section IV (Electrode Coating Preparations). The baking procedure performed after each immersion was the same as that used for the anode, i.e., as described above in Part A(ii) of Section IV (Electrode Coating Preparations). The immersion-baking procedure was repeated as necessary until the total weight of the salt coating was about 0.025 g.

The electrolyte was prepared by dissolving 19.2 g $NaAlCl_4$ into 135 g $SO_2Cl_2$.

A cell was assembled from the above-described cell component materials using a parallel plate design, i.e., Parallel Plate, 4×10 mm. The materials and preparation procedures for this cell design are described in Part B of Section V (Cell Assembly).

This cell was charged in constant-voltage mode by applying a voltage of 4.5 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 200 Ω. The charging process was continued thereafter until the charging current had dropped to 0.05 mA. The total charging time from start to finish was about 3.5 hours.

The open circuit voltage after charging was 3.7 V, and the maximum short cut discharging current was 25 mA. The cell was discharged through an adjustable resistor which was set to 3.0 kΩ so that the initial discharging current was 1.0 mA. After about 4.8 hours, the cell output voltage had dropped to 0.3 V.

EXAMPLE #31

Anode (0.025 g): $0.5NaCl-0.25Al_2O_3-0.25BaCl_2$
Cathode (0.025 g): $Na_2S-C$
Substrate: Carbon-on-nickel
Electrolyte (in excess): $SO_2Cl_2-0.1NaAlCl_4$
Size: 4×10 mm For this cell, the carbon-on-nickel substrates were prepared from start to finish using the same materials and procedures as those of the carbon-on-nickel substrate, 4×10 mm, Type II (carbon-Teflon paste) described above in Part C of Section III (Electrode Substrate Preparations) with one modification: the carbon was combined with 0.4 g Teflon-water paste rather than 0.2 g as originally specified.

An electrode of the type, $0.5NaCl-0.25Al_2O_3-0.25BaCl_2$, 4×10 mm, carbon-on-nickel, prepared by a solution deposition technique, constituted the anode for this cell. The materials and preparation procedures for this electrode are described above in detail in Part A(ii) of Section IV (Electrode Coating Preparations).

The cathode containing a mixture of well dried $Na_2S$ and carbon as electrode active materials was prepared as follows. The starting $Na_2S$ was ground to a fine powder with a mortar and pestle. A paste was made by combining 4.6 g $Na_2S$ with 2.0 g polypropylene oxide-acetonitrile binder. This binder was made in 100 g lots by combining 50 g polypropylene oxide with a molecular weight of about 4,000 g/mole (i.e., $PPO_{4,000}$) and 50 g acetonitrile. About 0.012–0.013 g of this $Na_2S-PPO_{4,000}$ paste was applied evenly to each side of a carbon-nickel substrate which was then squeezed between a glass roller and a glass plate. The cathode assemblage was placed into a Pyrex glass tube, heated to 150° C. in air, and held for two hours. The tube containing the assemblage was then cooled to room temperature, vacuum-sealed, reheated to 600° C., held for two hours, and cooled slowly to room temperature.

The electrolyte was prepared by dissolving 19.2 g $NaAlCl_4$ into 135 g $SO_2Cl_2$.

A cell was assembled from the above-described cell component materials using a parallel plate design, i.e., Parallel Plate, 4×10 mm. The materials and preparation procedures for this cell design are described in Part B of Section V (Cell Assembly).

This cell was charged in constant-voltage mode by applying a voltage of 4.0 V across the cell in series with an adjustable resistor which was initially set to 2.0 kΩ so that the charging current was 2.0 mA. As charging progressed, this resistor was manually lowered step by step to keep the charging current at about 2.0 mA until it had reached a value of about 200 Ω. The charging process was continued thereafter until the charging current had dropped to 0.05 mA. The total charging time from start to finish was about 3.5 hours.

The open circuit voltage after charging was 2.9 V, and the maximum short cut discharging current was 25 mA. The cell was discharged through an adjustable resistor which was set to 2.6 kΩ so that the initial discharging current was 1.0 mA. After about 6.5 hours, the cell output voltage had dropped to 0.3 V.

EXAMPLE #32

Anode (0.2 g): Carbon
Cathode (0.05 g): $0.4MgCl_2-0.6Mg(ClO_4)_2$
Substrate: Carbon-on-nickel
Electrolyte (in excess): $SO_2Cl_2-0.02MgCl_2-0.06AlCl_3$
Size: 4×10 mm For this cell, carbon-on-nickel substrates, Type I (wound carbon fibers) were used for both electrodes. The materials and preparation procedures for this substrate design are described above in Part C of Section III (Electrode Substrate Preparations).

For the anode, excess carbon electrode active material was applied by winding a nearly ten-fold excess of carbon fibers around the carbon-on-nickel substrate so that the total weight of carbon on the nickel net was about 0.2 g.

The cathode was made as follows. A mixture of 3.6 g $MgCl_2$ and 7.4 g $Mg(ClO_4)_2$ was dried by heating it in air to 250° C. and holding it for 10 hours. After cooling it to room temperature, the mixture was dissolved in 50 g anhydrous acetonitrile which was then driven off by heating to 90° C. This acetonitrile dissolution-evaporation procedure was repeated three times to rid the powder mixture of any last traces of water. It was found to be extremely important to prepare the materials in as anhydrous a state as possible using techniques such as those described herein, because small amounts of water in combination with metal perchlorates such as $Mg(ClO_4)_2$ can be explosive even during mild heat treatments (e.g., 100–200° C.).

A coating of $MgCl_2-Mg(ClO_4)_2$ with the above nominal composition was applied to the substrate using a solution deposition technique as described above in Part A of Section IV (Electrode Coating Preparations). the anhydrous powders prepared as described above were dissolved in 50 g acetonitrile, and a coating of 0.05 g was built up on the substrate by repeated immersion-baking steps. The baking procedure in this case consisted of heating the cathode assemblage in vacuum to 150° C. and holding it for 5 hours. This procedure served to drive off any last traces of acetonitrile and water.

The electrolyte was prepared by first dissolving 8.0 g $AlCl_3$ into 135 g $SO_2Cl_2$ at room temperature. After that reaction had proceeded to completion, 1.9 $MgCl_2$ was then dissolved into the mixture at 50° C.

A cell was assembled from the above-described cell component materials using a parallel plate design, i.e., Parallel Plate, 4×10 mm. The materials and preparation procedures for this test design are described in Part B of Section V (Cell Assembly).

This cell was charged in constant-voltage mode by applying a voltage of 3.8 V across the cell in series with an adjustable resistor which was initially set to 2.0 k$\Omega$ so that the charging current was 2.0 mA. As charging progressed, this resistor was manually lowered step by step to keep the charging current at about 2.0 mA until it had reached a value of about 250 $\Omega$. The charging process was continued thereafter until the charging current had dropped to 0.05 mA. The total charging time from state to finish was about 4.5 hours.

The open circuit voltage after charging was 2.8 V. The cell was discharged through an adjustable resistor which was set to 2.5 k$\Omega$ so that the initial discharging current was 1.0 mA. After about 7.5 hours, the cell output voltage had dropped to 0.5 V.

EXAMPLE #33

Anode (0.2 g): Carbon
Cathode (0.05 g): $0.4MgO—0.6MgCO_3$
Substrate: Carbon-on-nickel
Electrolyte (in excess): $SOCl_2—0.02MgCl_2—0.06AlCl_3$
Size: 4×10 mm For this cell, carbon-on-nickel substrates, Type I (wound carbon fibers) were used for both electrodes. The materials and preparation procedures for this substrate design are described above in Part C of Section III (Electrode Substrate Preparations).

For the anode, excess carbon electrode active material was applied by winding a nearly ten-fold excess of carbon fibers around the carbon-on-nickel substrate so that the total weight of carbon on the nickel net was about 0.2 g.

The cathode was prepared as follows. First, $MgCO_3$ was prepared by an ion exchange process from aqueous solutions of $Na_2CO_3$ and $Mg(NO_3)_2$. The $Na_2CO_3$ aqueous solution was prepared by dissolving 8.3 g $Na_2CO_3$ into 100 ml water. The $Mg(NO_3)_2$ aqueous solution was prepared by dissolving 14.8 g $Mg(NO_3)_2$ into 100 ml water. The two solutions were mixed together and allowed to sit for two hours under ambient conditions to enable the complete exchange between Na and Mg to occur on the nitrate and carbonate. Once the $MgCO_3$ had precipitated out of solution, it was washed thoroughly and allowed to dry in air under ambient conditions. A binder was made by dissolving 0.5 g polyethylene oxide with a molecular weight of 1,000,000 (i.e., $PEO_{1000000}$) into 20 ml water and then allowing most of the water to evaporate until only about 5 ml remained. The entire $MgCO_3$ precipitate was added, and all ingredients were thoroughly combined to form a paste. About 0.025 g of this paste was evenly applied to each side of the carbon-on-nickel substrate and then smoothed by squeezing between a glass roller and glass plate. The cathode assemblage was transferred to a vacuum oven preset to 200° C., held for two hours, cooled to room temperature, and transferred to a quartz tube which was then vacuum-sealed. This assemblage was heated from 100° C. to 800° C. at 10° C./minute and held for one hour. This final heat treatment served to induce partial decomposition of $MgCO_3$ to MgO and $CO_2$, and the desired molar ratio of MgO and $MgCO_3$ was obtained by adjusting the total heat treatment time at 800° C. After this heat treatment was complete, a weight check was performed to confirm that the total weight of the $0.4MgO—0.6MgCO_3$ was about 0.05 g.

The electrolyte was prepared by first dissolving 8.0 g $AlCl_3$ into 120 g $SOCl_2$ at room temperature. After that reaction had proceeded to completion, 19 g $MgCl_2$ was then dissolved into the mixture at 50° C.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.0 V across the cell in series with an adjustable resistor which was initially set to 2.0 k$\Omega$ so that the charging current was 4.0 mA. As charging progressed, this resistor was manually lowered step by step to keep the charging current at about 4.0 mA until it had reached a value of about 150$\Omega$. The charging process was continued thereafter until the charging current had dropped to 0.05 mA. The total charging time from start to finish was about 5.5 hours.

The open circuit voltage after charging was 2.8 V. The cell was discharged through an adjustable resistor which was set to 1.5 k$\Omega$ so that the initial discharging current was 1.0 mA. After about 7.0 hours, the cell output voltage had dropped to 0.5 V.

EXAMPLE #34

Anode (0.2 g): Carbon
Cathode (0.02 g): $CaCl_2$
Substrate: Carbon-on-nickel
Electrolyte (in excess): $AlCl_3—PCl_5—0.3PCl_3—0.02CaCl_2$
Size: 4×10 mm For this cell, carbon-on-nickel substrates, Type I (wound carbon fibers) were used for both electrodes. The materials and preparation procedures for this substrate design are described above in Part C of Section III (Electrode Substrate Preparations).

For the anode, excess carbon electrode active material was applied by winding a nearly ten-fold excess of carbon fibers around the carbon-on-nickel substrate so that the total weight of carbon on the nickel net was about 0.2 g.

For the cathode, a $CaCl_2$ coating was deposited on the substrate using the technique described above in Part A of Section IV (Electrode Coating Preparations). A total of about 0.02 g of $CaCl_2$ was deposited on the cathode substrate. The starting solution was 20 ml of water saturated with $CaCl_2$. The baking procedure performed between immersions and the final baking and annealing steps are above given in Part A(i) of Section IV (Electrode Coating Preparations).

The electrolyte was made by dissolving 1.1 g $CaCl_2$ into 192 g $AlCl_3—PCl_5—0.3PCl_3$ at 50° C. The starting $AlCl_3—PCl_5—0.3PCl_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.9 V across the cell in series with an adjustable resistor which was initially set to 5.0 k$\Omega$ so that the charging current was 2.0 mA. As charging progressed, this resistor was manually lowered step by step to keep the charging current at about 2.0 mA until it had reached a value of about 150$\Omega$. The charging process was continued thereafter until the charging current had dropped to 0.05 mA. The total charging time from start to finish was about 1.5 hours.

The open circuit voltage after charging was 3.5 V. The cell was discharged through an adjustable resistor which was set to 3.1 k$\Omega$ so that the initial discharging current was 1.0 mA. After about 2.5 hours, the cell output voltage had dropped to 0.5 V.

EXAMPLE #35

Anode (0.2 g): Carbon
Cathode (0.02 g): $CaCl_2$
Substrate: Carbon-on-nickel
Electrolyte (in excess): $SOCl_2$—$0.02CaCl_2$—$0.06AlCl_3$
Size: 4×10 mm For this cell, carbon-on-nickel substrates, Type I (wound carbon fibers) were used for both electrodes. The materials and preparation procedures for this substrate design are described above in Part C of Section III (Electrode Substrate Preparations).

For the anode, excess carbon electrode active material was applied by winding a nearly ten-fold excess of carbon fibers around the carbon-on-nickel substrate so that the total weight of carbon on the nickel net was about 0.2 g.

For the cathode, a $CaCl_2$ coating was deposited on the substrate using the technique described above in Part A of Section IV (Electrode Coating Preparations). A total of about 0.022 g $CaCl_2$ was deposited on the cathode substrate. The starting solution was 20 ml of water saturated with $CaCl_2$. The baking procedure performed between immersions and the final baking and annealing steps are above given in Part A(i) of Section IV (Electrode Coating Preparations).

The electrolyte was prepared by dissolving 8.0 g $AlCl_3$ into 120 g $SOCl_2$ at room temperature, and after that reaction had proceeded to completion, 2.2 g $CaCl_2$ was dissolved into the mixture at 50° C.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.9 V across the cell in series with an adjustable resistor which was initially set to 5.0 k$\Omega$ so that the charging current was 2.0 mA. As charging progressed, this resistor was manually lowered step by step to keep the charging current at about 2.0 mA until it had reached a value of about 150$\Omega$. The charging process was continued thereafter until the charging current had dropped to 0.05 mA. The total charging time from start to finish was about 2.0 hours.

The open circuit voltage after charging was 3.7 V. The cell was discharged through an adjustable resistor which was set to 3.1 k$\Omega$ so that the initial discharging current was 1.0 mA. After about 2.7 hours, the cell output voltage had dropped to 0.5 V.

EXAMPLE #36

Anode (0.2 g): Carbon
Cathode (0.05 g): $0.6CaS$—$0.4CaCl_2$
Substrate: Carbon-on-nickel
Electrolyte (in excess): $AlCl_3$—$PCl_5$—$0.3PCl_3$—$0.02CaCl_2$ For this cell, carbon-on-nickel substrates, Type I (wound carbon fibers) were used for both electrodes. The materials and preparation procedures for this substrate design are described above in Part C of Section III (Electrode Substrate Preparations).

For the anode, excess carbon electrode active material was applied by winding a nearly ten-fold excess of carbon fibers around the carbon-on-nickel substrate so that the total weight of carbon on the nickel net was about 0.2 g.

The cathode was made as follows. 4.3 g CaS and 11.1 g $CaCl_2$ were combined in a quartz tube which was then vacuum-sealed, heated to 850° C., and held for two hours. After this mixture had cooled to room temperature, it was crushed to a fine powder using a mortar and pestle. This powder mixture was made into a paste by mixing it with 5 ml water and 0.5 g polyethylene oxide with a molecular weight of 1,000,000 (i.e., $PEO_{1000000}$). About 0.025 g of this paste was evenly applied to each side of the carbon-on-nickel substrate and then smoothed by squeezing between a glass roller and glass plate. The cathode assemblage was dried under vacuum at 200° C. for two hours, cooled to room temperature, and transferred to a quartz tube which was then vacuum sealed. This assemblage was heated from 100° C. to 800° C. at 10° C./minute and held for two hours. After this heat treatment was complete, a weight check was performed to confirm that the total weight of the $0.6CaS$—$0.4CaCl_2$ was about 0.05 g.

The electrolyte was made by dissolving 1.1 g $CaCl_2$ into 192 g $AlCl_3$—$PCl_5$—$0.3PCl_3$ at 50° C. The starting $AlCl_3$—$PCl_5$—$0.3PCl_3$ solvent was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.5 V across the cell in series with an adjustable resistor which was initially set to 5.0 k$\Omega$ so that the charging current was 2.0 mA. As charging progressed, this resistor was manually lowered step by step to keep the charging current at about 2.0 mA until it had reached a value of about 150$\Omega$. The charging process was continued thereafter until the charging current had dropped to 0.05 mA. The total charging time from start to finish was about 2.0 hours.

The open circuit voltage after charging was 3.2 V. The cell was discharged through an adjustable resistor which was set to 3.1 k$\Omega$ so that the initial discharging current was 1.0 mA. After about 3.2 hours, the cell output voltage had dropped to 0.5 V.

EXAMPLE #37

Anode (0.2 g): Carbon
Cathode (0.05 g): $0.6CaS$—$0.4CaCl_2$
Substrate: Carbon-on-nickel
Electrolyte (in excess): $SOCl_2$—$0.02CaCl_2$—$0.06AlCl_3$
Size: 4×10 mm For this cell, carbon-on-nickel substrates, Type I (wound carbon fibers) were used for both electrodes. The materials and preparation procedures for this substrate design are described above in Part C of Section III (Electrode Substrate Preparations).

For the anode, excess carbon electrode active material was applied by winding a nearly ten-fold excess of carbon fibers around the carbon-on-nickel substrate so that the total weight of carbon on the nickel net was about 0.2 g.

The cathode was made as follows. 4.3 g CaS and 11.1 g $CaCl_2$ were combined in a quartz tube which was then vacuum-sealed, heated to 850° C., and held for two hours. After this mixture had cooled to room temperature, it was crushed to a fine powder using a mortar and pestle. This powder mixture was made into a paste by mixing it with 5 ml water and 0.5 g polyethylene oxide with a molecular weight of 1,000,000 (i.e., $PEO_{1000000}$). About 0.025 g of this paste was evenly applied to each side of the carbon-on-nickel substrate and then smoothed by squeezing between a glass roller and glass plate. The cathode assemblage was dried under vacuum at 200° C. for two hours, cooled to room temperature, and transferred to a quartz tube which was then vacuum sealed. This assemblage was heated from 100° C. to 800° C. at 10° C./minute and held for two hours. After this heat treatment was complete, a weight check was performed to confirm that the total weight of the $0.6CaS—0.4CaCl_2$ was about 0.05 g.

The electrolyte was made by dissolving 8.0 g $AlCl_3$ into 120 g $SOCl_2$ at room temperature, and after that reaction had proceeded to completion, 2.2 g $CaCl_2$ was dissolved into the mixture at 50° C.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 4.5 V across the cell in series with an adjustable resistor which was initially set to 5.0 kΩ so that the charging current was 2.0 mA. As charging progressed, this resistor was manually lowered step by step to keep the charging current at about 2.0 mA until it had reached a value of about 150Ω. The charging process was continued thereafter until the charging current had dropped to 0.05 mA. The total charging time from start to finish was about 2.0 hours.

The open circuit voltage after charging was 3.3 V. The cell was discharged through an adjustable resistor which was set to 3.1 kΩ so that the initial discharging current was 1.0 mA. After about 3.5 hours, the cell output voltage had dropped to 0.5 V.

EXAMPLE #38

Anode (0.2 g): Carbon
Cathode (0.05 g): Carbon
Substrate: Carbon-on-nickel
Electrolyte (in excess): $2.5AlCl_3—PCl_5—0.5PCl_3$
Size: 4×10 mm For this cell, both the anode and cathode were prepared by winding about 0.2 g of carbon fibers around 4×10 mm nickel nets. The materials and procedures for preparation of these electrodes where otherwise the same as those of the carbon-on-nickel substrate, 4×10 mm, Type I (wound carbon fiber cluster).

The electrolyte was prepared as follows. A molten salt mixture with the above nominal composition was made as follows. Small lots (47.4 g) were prepared by combining 26.6 g $AlCl_3$ with 20.8 g $PCl_5$ in a covered glass bottle and heating to 170° C. using a hot plate until the mixture became homogeneous. This mixture was then cooled to about 40° C. and 50 g $PCl_3$ and 6.7 g $AlCl_3$ were added. These ingredients were mixed, heated to 50° C., and held for two hours. After this mixture was allowed to equilibrate, it was found that a liquid consisting of two distinct phases had formed. The top liquid consisted mostly of undissolved $PCl_3$ and was removed entirely by skimming it off the top. The liquid that had settled to the bottom consisted of $AlCl_3$ and $PCl_5$ present at a 2.5:1 molar ratio in which $PCl_3$ was present at saturation, giving a molar ratio of $AlCl_3$, $PCl_5$, and $PCl_3$ estimated at about 10:10:5 based on the amount of $PCl_3$ in the top liquid. This bottom liquid consisted the $AlCl_3—PCl_5—0.5PCl_3$ solvent.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 3.5 V across the cell in series with an adjustable resistor which was initially set to 5.0 kΩ so that the charging current was 2.0 mA. As charging progressed, this resistor was manually lowered step by step to keep the charging current at about 2.0 mA until it had reached a value of about 150Ω. The charging process was continued thereafter until the charging current had dropped to 0.05 mA. The total charging time from start to finish was about 2.0 hours.

The open circuit voltage after charging was 2.2 V. The cell was discharged through an adjustable resistor which was set to 2.0 kΩ so that the initial discharging current was 1.0 mA. After about 3.5 hours, the cell output voltage had dropped to 0.1 V.

EXAMPLE #39

Anode (0.2 g): Carbon
Cathode (0.05 g): $0.25Al_2S_3—0.75C$
Substrate: Carbon-on-nickel
Electrolyte (in excess): $AlCl_3—PCl_5—0.3PCl_3$
Size: 4×10 mm For this cell, the anode were prepared by winding about 0.2 g of carbon fibers around 4×10 mm nickel net. The materials and procedures for preparation of this electrode were otherwise the same as those of the carbon-on-nickel substrate, 4×10 mm, Type I (wound carbon fiber cluster).

The cathode was prepared as follows. A mixture of $Al_2S_3$ and carbon with the above nominal composition was made by first combining 6.0 g $Al_2S_3$ powder and 0.8 g polypropylene oxide with a molecular weight of 400 (i.e., $PPO_{400}$). This mixture, which had the consistency of a paste, was put into a quartz test tube, heated in air at a rate of 5° C./minute from 100° C. to 400° C., held for two hours, cooled to room temperature, vacuum-sealed, heated to 950° C., held for five hours, and cooled back to room temperature. This hard solid mixture of $Al_2S_3$ and carbon was ground to a fine powder with a mortar and pestle and mixed with 0.1 $PPO_{400}$ to form a paste. Each side of 4×10 mm nickel net was coated with 0.025 g $Al_2S_3$-carbon paste which was smoothed by squeezing between a glass roller and glass plate. This cathode assemblage was placed in a large glass test tube with the open end stuffed with glass paste paper, heated in argon at 5° C./minute from 100° C. to 250° C., and held for four hours in argon. This assemblage was heated thereafter in argon at 5° C./minute to 500° C. and held for four hours.

The electrolyte, i.e., $AlCl_3—PCl_5—0.3PCl_3$, was prepared as described above in Part B(i) of Section II (Electrolyte Preparations).

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 3.5 V across the cell in series with an adjustable resistor which was initially set to 5.0 kΩ so that the charging current was 2.0 mA. As charging progressed, this resistor was manually lowered step by step to keep the charging current at about 2.0 mA until it had reached a value of about 150Ω. The charging process was continued thereafter until the charging current had dropped to 0.05 mA. The total charging time from start to finish was about 2.0 hours.

The open circuit voltage after charging was 2.3 V. The cell was discharged through an adjustable resistor which was set to 2.2 kΩ so that the initial discharging current was 1.0 mA. After about 4.2 hours, the cell output voltage had dropped to 0.1 V.

EXAMPLE #40

Anode (0.2 g): Carbon

Cathode (0.2 g): Carbon

Substrate: Carbon-on-nickel

Electrolyte (in excess): $SOCl_2$—$1.5AlCl_3$

Size: 4×10 mm

For this cell, both the anode and cathode were prepared by winding about 0.2 g of carbon fibers around 4×10 mm nickel nets. The materials and procedures for preparation of these electrodes where otherwise the same as those of the carbon-on-nickel substrate, 4×10 mm, Type I (wound carbon fiber cluster).

The electrolyte was a saturated solution of $AlCl_3$ in $SOCl_2$ in which $AlCl_3$ and $SOCl_2$ are present in a 3:2 molar ratio. This electrolyte was prepared by adding 200 g $AlCl_3$ to 119 g $SOCl_2$ at room temperature.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 3.7 V across the cell in series with an adjustable resistor which was initially set to 5.0 kΩ so that the charging current was 2.0 mA. As charging progressed, this resistor was manually lowered step by step to keep the charging current at about 2.0 mA until it had reached a value of about 150Ω. The charging process was continued thereafter until the charging current had dropped to 0.05 mA. The total charging time from start to finish was about 2.0 hours.

The open circuit voltage after charging was 2.3 V. The cell was discharged through an adjustable resistor which was set to 2.2 kΩ so that the initial discharging current was 1.0 mA. After about 2.5 hours, the cell output voltage had dropped to 0.5 V.

EXAMPLE #41

Anode (0.2 g): Carbon

Cathode (0.05 g): $0.25Al_2S_3$—$0.75C$

Substrate: Carbon-on-nickel

Electrolyte (in excess): $SO_2Cl_2$—$1.5AlCl_3$

Size: 4×10 mm

For this cell, the anode were prepared by winding about 0.2 g of carbon fibers around 4×10 mm nickel net. The materials and procedures for preparation of this electrode were otherwise the same as those of the carbon-on-nickel substrate, 4×10 mm, Type I (wound carbon fiber cluster).

The cathode was prepared as follows. A mixture of $Al_2S_3$ and carbon with the above nominal composition was made by first combining 6.0 g $Al_2S_3$ powder and 0.8 g polypropylene oxide with a molecular weight of 400 (i.e., $PPO_{400}$). This mixture, which had the consistency of a paste, was put into a quartz test tube, heated in air at a rate of 5° C./minute from 100° C. to 400° C., held for two hours, cooled to room temperature, vacuum-sealed, heated to 950° C., held for five hours, and cooled back to room temperature. This hard solid mixture of $Al_2S_3$ and carbon was ground to a fine powder with a mortar and pestle and mixed with 0.1 $PPO_{400}$ to form a paste. Each side of 4×10 mm nickel net was coated with 0.025 g $Al_2S_3$-carbon paste which was smoothed by squeezing between a glass roller and glass plate. This cathode assemblage was placed in a large glass test tube with the open end stuffed with glass paste paper, heated in argon at 5° C./minute from 100° C. to 250° C., and held for four hours in argon. This assemblage was heated thereafter in argon at 5° C./minute to 500° C. and held for four hours.

The electrolyte was a saturated solution of $AlCl_3$ in $SOCl_2$ in which $AlCl_3$ and $SO_2Cl_2$ are present in a 3:2 molar ratio. This electrolyte was prepared by adding 200 g $AlCl_3$ to 134 g $SO_2Cl_2$ at room temperature.

A cell was assembled from the above-described cell component materials using a parallel plate design, i.e., Parallel Plate, 4×10 mm. The materials and preparation procedures for this test cell design are described in Part B of Section V (Cell Assembly).

This cell was charged in constant-voltage mode by applying a voltage of 3.5 V across the cell in series with an adjustable resistor which was initially set to 5.0 kΩ so that the charging current was 2.0 mA. As charging progressed, this resistor was manually lowered step by step to keep the charging current at about 2.0 mA until it had reached a value of about 150Ω. The charging process was continued thereafter until the charging current had dropped to 0.05 mA. The total charging time from start to finish was about 2.0 hours.

The open circuit voltage after charging was 2.3 V. The cell was discharged through an adjustable resistor which was set to 2.2 kΩ so that the initial discharging current was 1.0 mA. After about 3.5 hours, the cell output voltage had dropped to 0.5 V.

What is claimed is:

1. A rechargeable battery or cell in which the electrode active material consists of at least one nonmetallic compound or salt of the electropositive species on which the cell is based wherein
    a) at least one solid electrode phase before charging consists of a nonmetallic compound or salt of the electropositive species of the cell, and
    b) an electrolyte or electrolyte solvent consists predominantly of one or more halogen- and/or chalcogen-bearing covalent compounds and/or salts such that the electrolyte is a liquid or has a gelatinous consistency at ambient temperature.

2. A battery or cell as given in claim 1 in which the electropositive species is one of ammonium, aluminum, boron, calcium, lithium, magnesium, phosphonium, phosphorus, potassium, sodium, or strontium.

3. A battery or cell as given in claim 2 in which said solid electrode phase(s) consists of one or more halide, pseudohalide, oxide, sulfide, carbonate, perchlorate, sulfate, phosphate, nitrate, or nitrite compounds, said electrode solid phase(s), and a substrate, constituting the solid portion or structure of at least one electrode, either by themselves or as a mixture with other solid phases, said other phases including metals, nonmetals, and compounds having a cation species that differs from that of the electropositive species of the cell.

4. A battery or cell as given in claim 3 in which for at least one electrode, said other phases include at least one of ZnO, CuO, Cu$_2$O, SnO, SnO$_2$, or a transition metal chalcogenide including CoO, FeO, MnO, V$_2$O$_5$, TiS$_2$, and FeS$_2$.

5. A battery or cell as given in claim 3 in which for at least one electrode, said other phases include at least one of ZnX$_2$, CuX$_2$, SnX$_2$, SnX$_4$, or a transition metal halide including CoX$_2$, FeX$_2$, or MnX$_2$, wherein X is F or Cl.

6. A battery or cell as given in claim 3 in which for at least one electrode, said other phases include at least one of carbon, silicon, boron, phosphorus, or any compound or alloy containing at least two of carbon, silicon, boron, phosphorus, or nitrogen.

7. A battery or cell as given in claim 3 in which for at least one electrode, said other phases include at least one of Cu, Ni, Zn, or Fe.

8. A battery or cell as given in claim 3 in which for at least one electrode, said other phases include at least one aliovalent metal halide, i.e., wherein the metal valence or oxidation state is different from that of the electropositive species of the cell.

9. A battery or cell as given in claim 3 in which for at least one electrode, said other phases include at least one refractory metal oxide including Al$_2$O$_3$ ZrO$_2$, TiO$_2$, MgO, or CaO.

10. A battery or cell as given in claim 3 in which the electrode substrates each consist of a metal support or lead which is either uncovered or covered with a solid phase which consists of one or more of carbon, silicon, boron, phosphorus, or any compound or alloy containing at least two of carbon, silicon, boron, phosphorus, or nitrogen.

11. A battery or cell as given in claim 10 in which the substrate support or lead metal is aluminum, copper, nickel, iron, stainless steel, or platinum.

12. A battery or cell as given in claim 3 in which the electrolyte or electrolyte solvent consists predominantly of one or more of the sulfur oxides, the binary sulfur halides, the ternary sulfur halides, the oxyhalides, the interhalogens, or the covalent metal and nonmetal halides, MX$_n$, wherein M is either Al, B, C, Ca, Cr, Mg, P, Si, Sn, Sr, Ti, or V, X is a halogen, and n represents a possible valence or oxidation state of M.

13. A battery or cell as given in claim 12 in which the electrolyte or electrolyte solvent consists predominantly of one of SOCl$_2$, SO$_2$Cl$_2$, PCl$_3$, POCl$_3$, or PSCl$_3$.

14. A battery or cell as given in claim 12 in which the electrolyte or electrolyte solvent consists predominantly of a mixture of halides which is liquid at ambient temperature, said mixture consisting of at least two different compounds with the general formula, MX$_n$, wherein M is either Al, B, C, Ca, Cr, Mg, P, Si, Sn, Sr, Ti, or V, X is a halogen, and n represents a possible valence or oxidation state of M.

15. A battery or cell as given in claim 14 in which the electrolyte or electrolyte solvent consists predominantly of any composition within the binary system, AlCl$_3$—PCl$_3$, or within the ternary systems, AlCl$_3$—PC$_5$—PCl$_3$, AlCl$_3$—PCl$_5$—POCl$_3$, and AlCl$_3$—PCl$_5$—PSCl$_3$, that forms a liquid at ambient temperature.

16. A rechargeable battery or cell in which the electrode active material consists of at least one nonmetallic compound or salt of the electropositive species on which the cell is based wherein a) the electrode solid phase(s), not including the substrate metal lead, consist entirely of at least one primarily covalent solid of a nonmetallic element, or a covalent compound thereof, which form a part of a substrate, and b) an electrolyte or electrolyte solvent consists predominantly of one or more halogen- and/or chalcogen-bearing covalent compounds and/or salts wherein at least one component is a nonmetallic compound or salt of the electropositive species of the cell, such that the electrolyte is a liquid or has a gelatinous consistency at ambient temperature.

17. A battery or cell as given in claim 16 in which the electropositive species is one of aluminum, boron, calcium, magnesium, phosphorus, or strontium.

18. A battery or cell as given in claim 17 in which solid phase(s) consist of one or more of carbon, silicon, boron, phosphorus, or any compound or alloy containing at least two of carbon, silicon, boron, phosphorus, or nitrogen.

19. A battery or cell as given in claim 18 in which the substrate support or lead metal is aluminum, copper, nickel, iron, stainless steel, or platinum.

20. A battery or cell as given in claim 18 in which the electrolyte or electrolyte solvent contains one or more halides of the cell electropositive species, MX$_n$, wherein M is the cell electropositive species, X is a halogen, and n represents a possible valence or oxidation state of M, said halides constituting the electrolyte or electrolyte solvent, either by themselves or as a mixture with other compounds, said other compounds including the sulfur oxides, the binary sulfur halides, the ternary sulfur halides, the oxyhalides, the interhalogens, and other covalent metal and nonmetal halides, M'X$_n$, wherein M' is either Al, B, C, Ca, Cr, Mg, P, Si, Sn, Sr, Ti, or V, and is different from M, X is a halogen, and n represents a possible valence or oxidation state of M'.

21. A battery or cell as given in claim 20 in which the electrolyte or electrolyte solvent, said other compounds include at least one of SOCl$_2$, SO$_2$Cl$_2$, PCl$_3$, POCl$_3$, or PSCl$_3$.

22. A battery or cell as given in claim 20 in which the electrolyte or electrolyte solvent consists predominantly of a mixture of halides which is liquid at ambient temperature, said mixture consisting of at least two components, MX$_n$ and M'X$_n$ wherein M is the cell electropositive species, M' is either Al, B, C, Ca, Cr, Mg, P, Si, Sn, Sr, Ti, or V, and is different from M, X is a halogen, an n represents a possible valence or oxidation state of M'.

23. A battery or cell as given in claim 22 in which the electrolyte or electrolyte solvent consists predominantly of any composition within the binary system, AlCl$_3$—PCl$_5$, or within the ternary systems, AlCl$_3$—PCl$_5$—PCl$_3$, AlCl$_3$—PCl$_5$—POCl$_3$, and AlCl$_3$—PCl$_5$—PSCl$_3$, that forms a liquid at ambient temperature.

24. An electrode for use in an electrochemical cell in which the electrode solid phases consist of one or more halide, pseudohalide, oxide, sulfide, carbonate, perchlorate, sulfate, phosphate, nitrate, or nitrite compounds wherein the cation is one of ammonium, aluminum, boron, calcium, lithium, magnesium, phosphonium, phosphorous, potassium, sodium, or strontium, said electrode solid phases, and a substrate, constitute the solid portion or structure of the electrode, either by themselves or as a mixture with other solid phases, said other phases including metals, nonmetals, and compounds having a cation species that differs from that of the main electropositive species of the cell, and in which the electrode solid phases are applied as a coating to a substrate as a paste, said paste consisting of a homogeneous mixture of powders of the electrode solid phases and a binder or vehicle consisting of either an organic polymer dissolved in a solvent or an organic polymer that is liquid at ambient temperature.

25. An electrode as given in claim 24 in which the binder or vehicle consists of a polypropylene oxide polymer dissolved in an organic solvent including acetonitrile.

26. An electrode as given in claim 25 in which the coated substrate is heat treated to effect a chemical change within the coating, said chemical change including the conversion of the polymer to carbon.

27. An electrode as given in claim 24 in which the binder or vehicle is a polypropylene oxide polymer that is liquid at ambient temperature.

28. An electrode as given in claim 27 in which the coated substrate is heat treated to effect a chemical change within the coating, said chemical change include the conversion of the polymer to carbon.

29. An electrode as given in claim 24 in which the binder or vehicle consists of a polypropylene oxide polymer dissolved in water.

30. An electrode as given in claim 29 in which the coated substrate is heat treated to effect a chemical change within the coating, said chemical change include the conversion of the polymer to carbon.

31. An electrode or substrate for use in an electrochemical cell in which carbon is the predominant solid phase and is applied to a metal substrate support as a paste, said paste consisting of a carbon powder and a binder or vehicle consisting of a solvent and a polymer, said carbon powder being produced by soaking carbon fibers in a LiCl aqueous solution, driving the mixture, heat treating the mixture, grinding the product to a powder, and removing the excess LiCl.

32. An electrode or substrate as given in claim 31 in which the carbon powder paste is applied to a substrate support metal consisting or either nickel or stainless steel.

33. An electrode or substrate as given in claim 32 in which the binder or vehicle consists of polytetrafluoroethylene in water.

34. An electrode or substrate as given in claim 32 in which the binder or vehicle consists of polypropylene oxide in an organic solvent including acetonitrile.

35. An electrode or substrate for use in an electrochemical cell in which carbon is the predominant solid phase and is applied to a substrate support metal as a slurry, said slurry consisting of either carbon powder or carbon fibers and a binder consisting of an organic solvent and an organic polymer, and in which the solvent is acetonitrile, the polymer is polypropylene oxide, and the substrate support metal consists of either nickel or stainless steel.

36. An electrode or substrate as given in claim 35 in which the carbon powder is produced by soaking carbon fibers in a LiCl aqueous solution, drying the mixture, heat treating it at a high temperature, grinding the product to a powder, and removing the excess LiCl.

37. An electrode or substrate as given in claim 35 in which the carbon is in the form of fibers less than 2 mm long.

38. A gel electrolyte for use in an electrochemical cell which consists predominately of either $SOCl_2$, $SO_2Cl_2$, $PCl_3$, $POCl_3$, or $PSCl_3$, and that contains between about 0.5 to 5m % of MF or $MBF_4$, wherein M is one of Li or Na.

39. An electrolyte as given in claim 38 further including one or more compounds from the group consisting of $LiAlCl_4$ and the complexes, $LiR.AlCl_3$, wherein R is SCN, OCN, or CN.

40. An electrolyte as given in claim 38 further including a Lewis acid and one or more salts of lithium.

41. An electrolyte as given in claim 40 in which said Lewis acid is $AlCl_3$, and said lithium salts include LiX, wherein X is a halogen, LiSCN, LiOCN, and LiCN.

42. An electrolyte as given in claim 38 further including one or more of $NaAlCl_4$, and the complexes, $NaR.AlCl_3$, wherein R is SCN, OCN, or CN.

43. An electrolyte as given in claim 38 that also contains a Lewis acid and one or more salts of sodium.

44. An electrolyte as given in claim 43 in which said Lewis acid is $AlCl_3$, and said sodium salts include NaX, wherein X is a halogen, NaSCN, NaOCN, and NaCN.

45. An electrolyte or electrolyte solvent for use in an electrochemical cell that consists predominately of any composition within the ternary system, $AlCl_3$—$PCl_5$—$PCl_3$, $AlCl_3$—$PCl_5$—$POCl_3$, and $AlCl_3$—$PCl_5$—$PSCl_3$, that forms a liquid at ambient temperature.

46. An electrolyte or electrolyte solvent as given in claim 45 that contains between about 0.5 to 5% of LiF or LiBF.

47. An electrolyte or electrolyte solvent as given in claim 45 that contains between about 0.5 to 5m % of NaF or NaBF.

48. An electrolyte as given in claim 45 that contains one or more alkali metal salts wherein the alkali metal species is the same for all salts added.

49. An electrolyte as given in claim 45 that contains one or more of LiX, wherein X is a halogen, LiSCN, LiOCN, LiCN, $LiAlCl_4$, and the complexes, $LiR.AlCl_3$, wherein R is SCN, OCN, or CN.

50. An electrolyte as given in claim 48 that contains one or more of NaX, wherein X is a halogen, NaSCN, NaOCN, NaCN, $NaAlCl_4$, and the complexes, $NaR.AlCl_3$, wherein R is SCN, OCN, or CN.

51. An electrolyte as given in claim 45 that contains one or more alkaline earth salts wherein the alkaline earth metal species is the same for all salts added.

52. An electrolyte as given in claim 51 that contains one or more of $CaX_2$, wherein X is a halogen, $Ca(SCN)_2$, $Ca(OCN)_2$, $Ca(CN)_2$, and the complexes, $CaR.AlCl_3$, wherein R is SCN, OCN, or CN.

53. An electrolyte as given in claim 51 that contains one or more of $MgX_2$, wherein X is a halogen, $Mg(SCN)_2$, $Mg(OCN)_2$, $Mg(CN)_2$, and the complexes, $MgR.AlCl_3$, wherein R is SCN, OCN, or CN.

54. An electrolyte or electrolyte solvent for use in an electrochemical cell that consists predominately of any composition within the binary system $AlCl_3$—$PCl_5$, or within ternary system, $AlCl_3$—$PCl_5$—$PCl_3$, $AlCl_3$—$PCl_5$—$POCl_3$, and $AlCl_3$—$PCl_5$—$PSCl_3$, that forms a liquid at ambient temperature, and contains one or more alkaline earth salts wherein the alkaline earth metal species is the same for all salts added.

55. An electrolyte as is given in claim 54 that contains one or more of $CaX_2$, wherein X is a halogen, $Ca(SCN)_2$, $Ca(OCN)_2$, $Ca(CN)_2$, and the complexes, $CaR.AlCl_3$, wherein R is SCN, OCN, or CN.

56. An electrolyte as is given in claim 54 that contains one or more of $MgX_2$, wherein X is a halogen, $Mg(SCN)_2$, $Mg(OCN)_2$, $Mg(CN)_2$, and the complexes, $MgR_2.AlCl_3$, wherein R is SCN, OCN, or CN.

57. An electrolyte as is given in claim 54 that contains one or more of $CaX_2$, wherein X is a halogen, $Ca(SCN)_2$, $Ca(OCN)_2$, $Ca(CN)_2$, and the complexes, $CaR_2.AlCl_3$, wherein R is SCN, OCN, or CN.

58. An electrolyte as is given in claim 54 that contains one or more of $MgX_2$, wherein X is a halogen, $Mg(SCN)_2$, $Mg(OCN)_2$, $Mg(CN)_2$, and the complexes, $MgR.AlCl_3$, wherein R is SCN, OCN, or CN.

59. An electrolyte or electrolyte solvent for use in an electrochemical cell that consists predominately of any composition within the binary system $AlCl_3$—$PCl_5$, or within the ternary system, $AlCl_3$—$PCl_5$—$PCl_3$, $AlCl_3$—$PCl_5$—$POCl_3$, and $AlCl_3$—$PCl_5$—$PSCl_3$, that forms a liquid at ambient temperature, that contains between about 0.5 to 5 m % of LiF or $LiBF_4$.

60. An electrolyte or electrolyte solvent for use in an electrochemical cell that consists predominately of any composition within the binary system $AlCl_3$—$PCl_5$, or within ternary system, $AlCl_3$—$PCl_5$—$PCl_3$, $AlCl_3$—$PCl_5$—$POCl_3$, and $AlCl_3$—$PCl_5$—$PSCl_3$, that forms a liquid at ambient temperature, that contains between about 0.5 to 5 m % of NaF or $NaBF_4$.

61. An electrolyte or electrolyte solvent for use in an electrochemical cell that consists predominately of any composition within the binary system $AlCl_3$—$PCl_5$, or within ternary system, $AlCl_3$—$PCl_5$—$PCl_3$, $AlCl_3$—$PCl_5$—$POCl_3$, and $AlCl_3$—$PCl_5$—$PSCl_3$, that forms a liquid at ambient temperature, and contains one or more alkali metal salts wherein the alkali metal species is the same for all salts added.

62. An electrolyte as is given in claim 61 that contains one or more of LiX, wherein X is a halogen, LiSCN, LiOCN, LiCN, $LiAlCl_4$, and the complexes, $LiR.AlCl_3$, wherein R is SCN, OCN, or CN.

63. An electrolyte as is given in claim 61 that contains one or more of NaX, wherein X is a halogen, NaSCN, NaOCN, NaCN, $NaAlCl_4$, and the complexes, $NaR.AlCl_3$, wherein R is SCN, OCN, or CN.

64. An electrolyte as given in claim 61 that contains one or more of LiX, wherein X is a halogen, LiSCN, LiOCN, LiCN, $LiAlCl_4$, and the complexes, $LiR.AlCl_3$, wherein R is SCN, OCN, or CN.

65. An electrolyte as given in claim 61 that contains one or more of NaX, wherein X is a halogen, NaSCN, NaOCN, NaCN, $NaAlCl_4$, and the complexes, $NaR.AlCl_3$, wherein R is SCN, OCN, or CN.

* * * * *